(12) United States Patent
Roth et al.

(10) Patent No.: US 10,469,330 B1
(45) Date of Patent: Nov. 5, 2019

(54) CLIENT ACCOUNT VERSIONING METADATA MANAGER FOR CLOUD COMPUTING ENVIRONMENTS

(75) Inventors: Gregory B. Roth, Seattle, WA (US); James E. Scharf, Jr., Seattle, WA (US); Rajiv Ramachandran, Seattle, WA (US); Anders Samuelsson, Seattle, WA (US); Keith A. Carlson, Bainbridge Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/524,982

(22) Filed: Jun. 15, 2012

(51) Int. Cl.
*H04L 12/24* (2006.01)

(52) U.S. Cl.
CPC ................ *H04L 41/22* (2013.01)

(58) Field of Classification Search
CPC ........................................... H04L 41/22
USPC ........................................... 709/226
See application file for complete search history.

(56) References Cited

U.S. PATENT DOCUMENTS

| | | | |
|---|---|---|---|
| 6,460,141 | B1 | 10/2002 | Olden |
| 6,978,232 | B1 | 12/2005 | Tobler |
| 7,886,038 | B2 | 2/2011 | Ferris |
| 8,175,863 | B1* | 5/2012 | Ostermeyer ........ G06F 17/5009 703/13 |
| 8,190,569 | B2 | 5/2012 | Aranwala et al. |
| 8,694,906 | B2* | 4/2014 | Cole ..................... G06F 3/0482 715/771 |
| 8,745,705 | B2 | 6/2014 | Hitchcock et al. |
| 2005/0188329 | A1* | 8/2005 | Cutler .................. G06F 3/0481 715/804 |
| 2006/0059071 | A1 | 3/2006 | Maitret et al. |
| 2008/0046349 | A1 | 2/2008 | Elbert et al. |
| 2008/0104393 | A1 | 5/2008 | Glasser et al. |
| 2009/0144183 | A1 | 6/2009 | Gatchell et al. |
| 2009/0228967 | A1 | 9/2009 | Gbadegesin et al. |
| 2009/0276771 | A1 | 11/2009 | Nickolov et al. |
| 2009/0319609 | A1 | 12/2009 | Ferraro |
| 2010/0088150 | A1 | 4/2010 | Mazhar et al. |

(Continued)

OTHER PUBLICATIONS

VMware, "Lab Manager User's Guide," vCenter Lab Manager 4.0, 2006-2011 VMware, Inc., 180 pages.

(Continued)

*Primary Examiner* — SM A Rahman
*Assistant Examiner* — Emad Siddiqi
(74) *Attorney, Agent, or Firm* — Robert C. Kowert; Meyertons, Hood, Kivlin, Kowert & Goetzel, P.C.

(57) ABSTRACT

Methods and apparatus for a client account versioning metadata manager for cloud computing environments are disclosed. A system includes a plurality of resources, a plurality of service managers coordinating respective multi-tenant network-accessible services, and a metadata manager. The metadata manager receives a multi-service account state view request. The metadata manager generates a representation of an administrative state of a client account indicated by the request with respect a plurality of services accessible by the client account, as of a time indicated in the request. The administrative state with respect to a particular service comprises an indication of an assignment to the client account of resources participating in implementation of the particular service.

25 Claims, 28 Drawing Sheets

(56) References Cited

U.S. PATENT DOCUMENTS

| | | | |
|---|---|---|---|
| 2010/0125612 A1* | 5/2010 | Amradkar | H04L 63/0807 707/802 |
| 2010/0131949 A1* | 5/2010 | Ferris | G06F 9/5027 718/1 |
| 2010/0132016 A1 | 5/2010 | Ferris | |
| 2010/0235831 A1 | 9/2010 | Dittmer | |
| 2010/0275250 A1 | 10/2010 | Devadoss et al. | |
| 2010/0313250 A1 | 12/2010 | Chow | |
| 2011/0010339 A1 | 1/2011 | Wipfel et al. | |
| 2011/0072486 A1 | 3/2011 | Hadar et al. | |
| 2011/0072487 A1 | 3/2011 | Hadar et al. | |
| 2011/0137947 A1 | 6/2011 | Dawson et al. | |
| 2011/0218849 A1 | 9/2011 | Rutigliano et al. | |
| 2011/0225233 A1 | 9/2011 | Casalaina et al. | |
| 2011/0225640 A1 | 9/2011 | Ganapathy et al. | |
| 2011/0264906 A1 | 10/2011 | Pourzandi et al. | |
| 2011/0276674 A1 | 11/2011 | Jensen-Horne et al. | |
| 2011/0283181 A1 | 11/2011 | Waite et al. | |
| 2012/0042061 A1 | 2/2012 | Ayala | |
| 2012/0072579 A1 | 3/2012 | Teather | |
| 2012/0072597 A1 | 3/2012 | Teather et al. | |
| 2012/0072728 A1 | 3/2012 | Teather et al. | |
| 2012/0110636 A1 | 5/2012 | Van Biljon et al. | |
| 2012/0110650 A1 | 5/2012 | Van Biljon et al. | |
| 2013/0132556 A1* | 5/2013 | DeLuca | H04L 43/08 709/224 |
| 2013/0298155 A1 | 11/2013 | Stepanov | |
| 2014/0012846 A1 | 1/2014 | Snell et al. | |

OTHER PUBLICATIONS

VMware, "VMware and Cloud Computing: An Evolutionary Approach to an IT Revolution," 2010, 20 pages.

U.S. Appl. No. 13/524,975, filed Jun. 15, 2012, Gregory B. Roth, et al.

U.S. Appl. No. 13/524,952, filed Jun. 15, 2012, Gregory B. Roth, et al.

U.S. Appl. No. 13/524,945, filed Jun. 15, 2012, Gregory B. Roth, et al.

U.S. Appl. No. 13/524,933, filed Jun. 15, 2012, Gregory B. Roth, et al.

* cited by examiner

CLIENT ACCOUNT VERSIONING METADATA MANAGER FOR CLOUD COMPUTING ENVIRONMENTS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources and services to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse service needs, allowing various computing resources and services to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

In many environments, various layered distributed applications may be implemented using virtualized compute and storage resources that may span large numbers of devices potentially spread across multiple data centers. For example, one core infrastructure service may allocate hundreds or thousands of virtual compute servers to a client organization, and the client may be able to access various higher-level distributed services (such as a relational database service or a queued messaging service, also managed and implemented within the same provider network). As more and more of the clients' computing environment is moved to the cloud, a given client organization may end up using dozens of different distributed services, each with its own resource model and data model, and each using independently configurable implementation modules on potentially overlapping sets of resources. Especially for large client accounts (e.g., accounts that provide cloud access to hundreds or thousands of users, and may have fast-changing set of interrelated service subscriptions and resource allocations for those users), it may become increasingly difficult for administrators to comprehend the state of the client's cloud environment in sufficient detail to efficiently perform tasks like debugging problem states whose root causes may cross service and/or resource boundaries.

Figure 1:
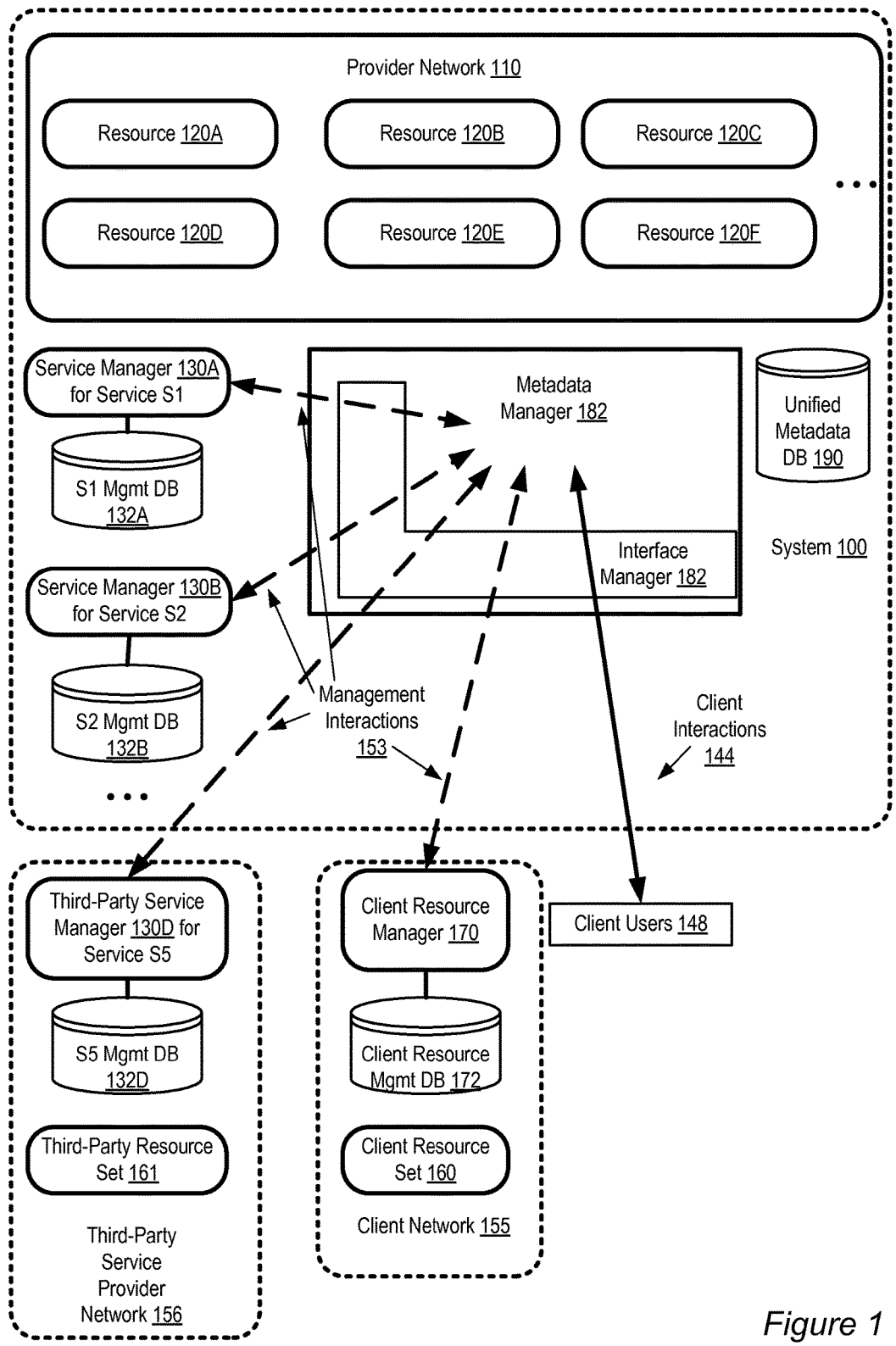
FIG. 1 illustrates an example system environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and apparatus for a client account versioning metadata manager for cloud computing environments are described. Networks set up by an entity such as a company or a public sector organization to provide one or more distributed services accessible via the Internet and/or other networks to a geographically distributed set of clients may be termed "provider networks" in this document. The term "web-accessible service" may be used herein to refer to services accessible over the Internet. The services may include a core set of infrastructure-related services such as cloud computing or storage platforms, as well as more advanced services that are built using the core services, such as for example database services, load balancing services, application deployment services, search services and the like. A provider network may include numerous data centers, each comprising potentially large numbers of computing platforms, such as collections of physical and/or virtualized computer servers, storage devices, networking equipment and the like, needed to implement and distribute services offered by the provider. In some provider networks, resources configured on the platforms may in some embodiments be offered for reservation by (and allocation to) clients in units called "instances," such as virtual or physical compute instances or storage instances. A virtual compute instance may, for example, comprise one or more servers with a specified computational capacity (which may be specified by indicating the type and number of CPUs, the main memory size, storage device number and size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices and the like.

In at least some embodiments, some or all of the distributed, network-accessible services may have respective service managers responsible for overall administration and coordination of the corresponding service. Each service may have a respective resource model (i.e., the different types of resources used for the administering and implementing the service, and how they relate to one another) and a respective data model specifying how the service's data is stored and accessed; the service manager may be responsible for maintaining metadata describing the resource model and the data model. For some services, a service manager may itself be implemented using resources of the provider network—e.g., program instructions implementing service manager functionality for a particular service may be executed on one or more compute servers of the provider network. In some cases, a service manager for a given service S1 may acquire resources from another service S2, for service administration and/or to implement service functionality. For example, a database management service manager DBSM may in one embodiment acquire two sets CI1 and CI2 of virtual compute instances from a core infrastructure service manager CISM. Instances CI1 may be used to administer the database functionality, while instances CI2 may be assigned to clients to implement back-end database operations and store the client data. The client's front-end processes (such as web servers or application servers) may utilize a third set of compute instances CI3 to access the back-end database functionality. For some services, at least a portion of a service manager may be implemented outside the provider network—e.g., an entity such as a third-party content management service provider may use computing devices in an external data center to host a service manager for a service that uses content management service modules running on resources within the provider network. Each service may be provided using a combination of a potentially large set of resources in some embodiments—including, for example, physical or virtual compute/storage/networking resources or instances implemented on platforms distributed across devices of one or more data centers, as well as logical resources implemented as data structures or objects within various types of volatile and/or persistent storage in the provider network.

At least some of the services may be multitenant in one embodiment. The term "multitenant" service, as used herein, refers to a service that provides each of a plurality of clients or users a respective secure and exclusive virtual computing environment, such that for any given application supported by the service, each client is provided a customizable virtual application instance. A given client account may have a number of users and/or groups affiliated with it in some embodiments—e.g., a single client account may be set up for a corporation or a department of a corporation, and a hierarchy of authorization groups and users may be set up for individuals of the corporation or department to utilize various services of the provider network. In some embodiments, some or all of the services provided may be independently billable—e.g., a client that subscribes to or uses two services managed by respective service managers, such as a database service and a load balancing service, may be presented with distinct billing line items for each service. In some implementations, some independently billed services may depend on other independently billed services—e.g., a data set import/export service may rely on a compute instance service and/or a block storage service, resulting in the possibility of "service stacks" comprising multiple services reliant upon, or used by, other services. In one such implementation, clients may be billed separately for each service of a service stack that they use, even if some core service is only used indirectly as a result of a dependency of a high-level service on that core service. In other implementations, billing for at least some core services may be consolidated with the billing for higher-level services.

In at least some embodiments, the provider network may include a metadata manager configured to aggregate information about the various resources and services used by a given client account (e.g., by the various users affiliated with the client account) to provide a unified view of the state of the client account. The responsibilities of the metadata manager may include collecting service state metadata (such as records of various configuration change operations or data manipulation operations) from the various service managers of the services to which the users associated with the client account have access in some embodiments. In one embodiment, the metadata manager may implement a programmatic interface (such an application programming interface (API), a web page or another graphical user interface (GUI), or a command-line interface) allowing a submission of a multi-service account state view request, specifying (or implicitly indicating) a client account and an optional timing descriptor. The requester (e.g., an administrative user associated with the client account) may desire a unified or "big-picture" view with respect to a plurality of services and a plurality of resources in use by, or accessible by, users affiliated with the client account. The timing descriptor may allow the requester to directly or indirectly specify a time for which the unified state view is desired. A direct time specification may for example comprise the logical equivalent of "please provide a view of the state of client account C as of 8:00 AM EDT on Jun. 1, 2011." An indirect time specification may refer to some operation or event in the past, without specifying a time; the metadata manager may have to determine the time of occurrence or completion of the operation or event, and provide a view of the client account state as of that time. If no timing descriptor is specified, the metadata manager may provide the latest available account state view in some implementations. In some implementations, the view request may indicate a preferred time for which the account state view is to be generated, but the actual time for which the state view is generated may differ from the preferred time for any of a number of reasons. For example, it may be impracticable to generate account state views for arbitrary points in time, and the metadata manager may make a best effort to obtain an account state as of a time as close to the preferred time as possible; or, the metadata manager may update its records from various data sources at designated intervals such as once an hour, so account state views may only be generated at discrete scheduled times. In some embodiments the metadata manager may inform clients about the timing constraints regarding account state views—e.g., by indicating the minimum acceptable timing granularity, by indicating that a best effort may be made to generate account state as of the desired time, and so on.

In response to a state view request with a timing descriptor, the metadata manager may generate a representation of an administrative state of the client account with respect to each service of a plurality of services accessible by the client account as of a time determined based at least in part on the timing descriptor. With respect to at least some embodiments where each client account has a plurality of affiliated users or user accounts, the term "accessible by the client account" may serve as the logical equivalent of "accessible by users affiliated with the client account" or "accessible from user accounts affiliated with the client account". Similarly, when describing an entity sending a request or receiving a response, the terms "client user", "user affiliated with a client account", and "client" may be used interchangeably herein. The set of services to which a given client account has access may be governed, for example, by service agreements entered into by the client and the provider network; e.g., a given user U1 affiliated with a client account C may have access to services S1 and S2 because respective service agreements SA1 and SA2 are in effect for those services, while U1 may not have access to service S4 for which no service agreement has been established. The administrative state of the particular client account with respect to a particular service may include several different types of information in various embodiments: for example, in one embodiment the state of account A1 with respect to a service S1 may include any combination of (a) an enumeration of the resources such as compute and/or storage instances that are assigned to A1 (e.g., to any user affiliated with A1) and are participating in the implementation of the particular service (b) various configuration setting values, either at the service level, the resource level, or both (c) authorization information specifying which users/groups of account A1 had access to various features of service S1, and so forth. In some embodiments, a snapshot of the service's user-level data (e.g., statistics about, or even the actual contents of, various user database tables and indexes in the case of a database management service) may also be considered part of the administrative state of the client account with respect to the service. In other embodiments, depending for example on the nature of the service and the amount of user-level data generated, the metadata manager may support different types of state view requests, such as administrative state view requests (for configuration information, resource allocation information, and authorization-related information) and separate data state view requests. In response to a request for a data state view, for example, the metadata manager may in some embodiments provide metadata for storage objects modified by application running on behalf of the client account, such as the number and sizes of various files, file systems, key-value storage objects and the like. In some embodiments the actual contents of at least some application-modified data objects may be included in the data state of the client account.

The metadata manager may be able to provide the representation of the administrative state of the client account to the requester in several different formats in various embodiments, e.g., in response to a view display preference indicated by the requester. In some embodiments, the state may be displayed in a graphical format, where for example services are represented by one type of icon or image, resources by another type of icon or image, users by a third type of icon or image, and relationships between these various types of entities carrying state information is displayed by connectors between the icons, or by the relative positions of the various icons. The graphical view may be provided, for example, via one or more web pages, or by a custom graphical user interface (GUI). In one implementation, the graphical view may include a timing control element, such as a slider control, allowing a view of a state as of a different point in time. The user may be allowed to zoom in and out of various elements of the display to obtain greater or lesser detail regarding the account state in some implementations—e.g., at the most abstract level, just the service names of various subscribed services may be displayed, and by zooming in on a particular service icon, additional details may be made visible. In some embodiments, the unified account state view may be provided in other formats, such as in accordance with an extensible markup language (XML) specification, or in plain text.

In addition to simply providing views of the unified account state at a desired point in time, in some embodiments the metadata manager may also support versioned storage of account state. A requester may specify that a representation of client account state as of a specified time (or as close to the specified time as possible) should be saved, e.g., for future review (and/or to be used as input for other features supported by the metadata manager such as the cloning-related functionality described below) in such an embodiment. In response, the metadata manager may store the representation in a persistent store such as a unified metadata database. In some embodiments each such state representation may be assigned a unique version number (e.g., using a timestamp or a universally-unique identifier (UUID)). The representation may be saved in various formats in different implementations, e.g., in a custom binary format or compressed format supported by the metadata manager, or in a text format. The saved state representation may later be retrieved, e.g., using its version identifier or creation time as a search attribute, at request of a user. The terms "snapshot" or "snapshot version" may also be used herein to refer to a saved representation of a client account state as of a specified time. In some embodiments, a metadata manager may support separate API calls for snapshot version creation and account state view displays, while in other embodiments, the same API may be usable to request both a view display and the generation and storage of a corresponding snapshot version.

In at least some embodiments, the metadata manager may support filtering of the amount and types of metadata to be included in a state view or saved state version. For example, a given view request or version snapshot request in such an embodiment may specify a services descriptor indicating a set of services whose information is to be included in the view or saved version. In addition to filtering out entire services that may not be of interest, a services descriptor may also include, at least in some implementations, an enumeration of the specific attributes of the services that are of interest. For example, with respect to a replicated service with a primary and a standby replica, in some situations an administrator may not wish to have all the details of the standby replica included in a state view. Similarly, in some implementations, a services descriptor may also refer to or include resource descriptors specifying attributes of interest with respect to various types of resources (e.g., compute instances, storage instances, or network interfaces) involved in providing the service. In such an implementation, a services descriptor associated with a view or version snapshot request may reference several individual service descriptors, each of which may in turn reference one or more resource descriptors. In a different implementation, resource descriptors may be referenced or included in the view or version requests directly, i.e., resource filtering may be implemented independently of service filtering. In some embodiments, if a view request or version request does not specify a services descriptor, a default services descriptor may be applied to the request, indicating for example that metadata information for all the services to which the specified client account has access should be included in the account state representation. In such embodiments, if the request does not directly or indirectly specify resource descriptors limiting the resource attributes for which values should be included in the state representation, the metadata manager may apply a default resource descriptor for each resource category, with a default set of resource attributes to be included in the account state for each resource category.

As noted above, in some embodiments the metadata manager may collect operation records or logs from the various service managers to help in the generation of the unified client account state views and versions. With respect to compute instances, for example, such operation records may include instance reservation requests, activation requests, shutdown and startup requests, termination requests, and so on. The records may in some implementations include indications of the success or failure of a given request, the time at which the request was submitted, various request parameters (e.g., the user identifier of the user requesting an instance shutdown), and so on. In addition to the operation records, values of various service and/or resource attributes (such as configuration settings) that may not explicitly be indicated in the operation records may also be stored by the metadata manager in some embodiments. Depending on the granularity of the data gathered for various services and resources, and how frequently it is collected, the combined collection of service and resource information may grow quite rapidly, especially for client accounts that use hundreds or thousands of resources. In some embodiments, the metadata manager may limit the time for which operation records and/or various attribute values are stored. For example, for each service, resource or operation type, a retention window may be enforced in some embodiments, indicating for how long the corresponding data should be retained by the metadata manager before it is archived or discarded. Such retention windows may be specified by the clients at various granularities in different embodiments—e.g., at a client account level, at a service level, at a resource level, or at an attribute level.

In some embodiments, the metadata manager may include a causal analysis capability that may be used by administrators to analyze and/or debug problem situations or errors. For example, in one embodiment, an operation record collected by the metadata manager for a client account C1 may indicate a failure of an operation O1 requested from service manager SM1 at time T1 by user U1. An administrator may wish to determine the root cause or causes of the failure, and may submit a cause analysis request to the metadata manager, specifying the unexpected operation result. In response, the metadata manager may analyze its database of saved time-stamped operation records and configuration changes for a plurality of services accessible by users of the account C1. Using its aggregated records, the metadata manager may be able to identify candidate prerequisite operations performed earlier than the O1 request, at either the same service manager SM1 or at some other related service SM2, that could have led to the unexpected result. The candidate causal operations may be identified using any desired combination of a variety of techniques in different embodiments: e.g., by timestamp correlation, by replaying or simulation of a sequence of operations from a known well-functioning state, or by pattern matching against a knowledge base of previous cause analysis attempts.

According to one embodiment, the metadata manager may also implement account cloning functionality, allowing "clone accounts" to be created based on a specified original or "source" client account. Clients may wish to create clones of their accounts for various reasons in different embodiments—e.g., one client may wish to replicate a production environment in which a particular set of services are being implemented using a particular set of resources, so that a set of tests may be run on the cloned environment, while a different client may wish to create a clone account simply to examine the account's state as of a specified version or date. A number of different cloning modes may be implemented in some embodiments, such as a "deep" cloning mode and/or a "copy-on-write" cloning mode. In some implementations, one of the cloning modes may be considered a default mode, such that if no specific cloning mode is specified in a cloning request, that default made may be assumed.

In response to receiving an account cloning request specifying a particular source client account, a (default or explicitly specified) "deep" cloning mode and a particular version descriptor, the metadata manager may in one embodiment first identify a source version of a state of the particular source client account that is to be cloned. That is, the metadata manager may identify (e.g., by searching within its database of saved account version states or snapshots) a representation of an administrative state of the particular source client account with respect to each of a set of services in use by the client at a time indicated by the particular version descriptor. The representation may include, for example, a first set of configuration settings of an original set of resources configured to provide at least a portion of the functionality of the set of services to the particular source client account. Having identified the source version, the metadata manager may in such an embodiment create a clone account of the source client account, and grant ownership of the clone to the client that requested the clone. The metadata manager may, in at least some embodiments, proceed to initiate the acquisition of one or more additional resources of the provider network on behalf of the clone account, to enable a replication of the first set of configuration settings on the one or more additional resources. So, for example, if in the source version, a client account C1 was allocated compute instance CI1 with a configuration setting CS1 for service S1, the metadata manager in such an embodiment may, in response to a deep cloning request, generate a clone account CC1 and initiate the acquisition of compute instance CCI1 for service S1. To initiate the acquisition of a resource, in some embodiments the metadata manager may send a resource request to a service manager responsible for providing the resource, such as a request for a compute instance allocation to a compute instance service manager. After the resource is acquired, its configuration may be modified to match the configuration settings of the corresponding original resource: e.g., in the above example, the configuration of instance CCI1 may be set to CS1.

If a client requests a "copy-on-write" clone rather than a deep clone, the metadata manager may perform a different set of operations. Instead of initiating the acquisition of additional resources immediately, in some embodiments, the metadata manager may simply store a reference to a source account state version that includes information or pointers identifying the resources allocated to the source client account. In addition, the metadata manager may also mark or designate the clone account as a "copy-on-write" or "COW" clone, indicating that an acquisition of a resource on behalf of the copy-on-write clone account is not to be initiated until a request to mutate some attribute of the referenced source account version is received, such as a change to a configuration setting or to a resource allocation included in the source version. Copy-on-write account cloning may be very helpful if, for example, a client wishes to set up a logical replica of a large original computing environment and run a suite of tests on the replica which may only change a small subset of the resources used in the computing environment. By using a COW clone instead of a deep clone in such a scenario, the client may be able to achieve significant cost savings, as only those resources whose state is modified in the suite of tests may have to be acquired.

In at least some embodiments, the metadata manager may support a hybrid mode of account cloning, in which a first subset of the client's resources may be cloned in deep cloning mode (i.e., acquisition of corresponding resources for the cloned account may be initiated as soon as the clone account is created) and the remainder of the client's resources may be cloned in COW mode (i.e., acquisition of corresponding resources for the clone account may be deferred until a mutation is attempted). In one such embodiment, the client may specify, e.g., in the account cloning request, which of its resources should belong to the deep-cloned subset, and which should belong to the COW remainder. In another embodiment, the metadata manager may classify the resources into the two categories, for example based on budget constraints specified by the client. For example, the client may submit a request equivalent to "Generate the best clone account possible, given my budget constraints of $X", and the metadata manager may determine how that budget can be used to acquire some resources in deep-cloning or immediate-acquisition mode for the client while leaving other resources cloned in COW mode. The client may also specify preferences or criteria to help the metadata manager with the classification—e.g., some resources may be indicated as belonging to a preferred-for-deep-cloning category, while others may be indicated as belonging to a preferred-for-COW-cloning category. In response to the account state cloning request for such a hybrid cloning mode, the metadata manager may initiate acquisition of the resources to be deep-cloned, and defer acquisition of the COW-cloned resources until a mutation request is received.

The metadata manager may support restore and/or replay operations on clone accounts in some embodiments. For example, in one scenario, a deep clone account DCA1 of a source account SA1 as of a time T1 may have been created. If an account state restoration request is received by the metadata manager, indicating a target restore time T2 prior to T1, the metadata manager may initiate various configuration changes on DCA1's resource set to undo a set of operations that were performed on the SAT's resources between T2 and T1. In this example, if undoable or reversible operations O1, O2 and O3 were performed in that order between T2 and T1 on SA1's original resource RO, and corresponding resource RC had been acquired for the clone account DCA1, the metadata manager may perform the respective "undo" operations of O3, O2 and O1 in that order on DCA1'a corresponding resource RC in response to the restoration request. Instead of specifying restoration times explicitly in a restoration request, in some implementations a client may specify a restoration version identifier instead—e.g., instead of requesting the equivalent of "restore the state of account DCA1 to the state of SA1 as of time T2", the request may indicate the equivalent of "restore the state of account DCA1 to the state of SA1 as of the version with version ID V-2012-May-15". In some embodiments, the metadata manager may also or instead support restore operations to specified restoration versions or restoration times on the original client account (as opposed to performing the restore operations on clone accounts).

In at least some embodiments, the metadata manager may support replay or redo operations on clone client accounts. After a deep clone account DCA2 is created in one such embodiment, so that the state of source account SA1 is replicated as of a time T1, the client may send an account state change replay request to the metadata manager, comprising a reference or pointer to an original set of operations performed on the resources of SA1 after T1. In response to the state change replay request, the metadata manager may initiate corresponding operations on DCA2's resources, so as to replicate effects of the original set of operations on the resources of the clone account. For either replay operations, restoration operations, or both, in some embodiments the metadata manager may implement breakpoint functionality, allowing the requester to pause the replay or restoration at various stages, e.g., to inspect the intermediate changes in state of the account's resources, as described below in further detail.

In some scenarios a client may wish to determine the likelihood of success of a desired set of configuration changes or of some other operations, before attempting to actually perform those operations. The metadata manager may in some embodiments support simulations of such operations. In one such embodiment, a client may submit an account state change simulation request to the metadata manager, comprising (a) an indication of an initial account state of the client account, including for example a plurality of service attribute values of a set of services in use by the particular client account and (b) a collection of operations to be simulated on behalf of the client account. The operations may be directed towards a plurality of service managers, e.g., one operation may be formatted in accordance with a supported operations specification (such as a set of APIs) of a particular service manager, and a second operation may be formatted in accordance with a different operations specification supported by a second service manager. The metadata manager may generate a response to the simulation request comprising at least one of (a) a representation of an expected end state of the client account reachable as a result of performing the collection of operations or (b) an indication of an expected failure of one or more of the operations. In some implementations, the metadata manager may provide an expected probability of success for the collection of operations to the requester. To implement the simulation, in some embodiments the metadata manager may utilize a rules engine that defines valid states of the client account, and is capable of determining, based on a set of rules, whether a given account state change operation is likely to succeed (i.e., how likely the account state is to remain in a valid state, if the operation is performed). In some implementations the metadata manager may generate snapshot versions of intermediate account states reached as various operations are simulated. Given the results of the simulation, the requester may be able to make a more informed decision about proceeding with the operations, based on the feasibility of success indicated by the simulation results. The simulation functionality supported by the metadata manager may be used by clients to investigate various "what-if" scenarios in some embodiments; for example, in one implementation where the state information includes performance metrics of various compute instances being used for a service, a simulation of a replacement of one resource instance by another instance of a different size and cost may allow the client to make more informed cost/performance tradeoffs.

As described above, at least in some embodiments the metadata manager may be configured to collect metadata such as configuration settings and operation records about the services being provided within the provider network, and about the resources of the provider network. The metadata manager may organize and store the collected metadata in the form of a baseline provider network schema in some embodiments. The baseline schema may include a plurality of schema entity types (including for example resource types such as "compute instances" or "storage instances" and service types such as "load balancer service" or "database service"), with a respective set of attributes and/or relationships defined for each entity type. The schema itself, as well as the data values collected for each of the attributes of the various attribute sets, may be stored within a unified metadata database maintained by the metadata manager in such embodiments. In some environments, clients may wish to add additional types of information to the metadata manager's baseline schema, such as, for example, client-defined labels indicating the business purpose of a given application, or configuration information for a resource that is resident within a client network or in a client data center and is being used together with provider network resources and services to achieve a client business objective. In order to allow clients to add such information to the provider network-specific metadata, in some embodiments the metadata manager may support schema extension functionality. In one such embodiment, a client may submit a schema extension request that identifies the client's account, and specifies a client attribute set (e.g., for one or more client-defined entity types) and a client data source from which values of the client attributes may be obtained. In response, the metadata manager may generate and store a composite schema customized for the client account comprising the client attribute set as well as provider network attribute sets for the services and/or resources being used by the client account.

After the composite customized schema has been generated, when the client submits an account state view request, the metadata manager may include values for both the client attributes and the provider network attributes in the account state view provided to the client. When requesting the schema extension, in some embodiments the client may provide details of the update protocol to be used to obtain the client attribute values—e.g., whether the metadata manager should "pull" the data from the client data source or whether the client data source is configured to "push" the data to the metadata manager; the frequency of data updates, whether the client attribute values are to be stored in an encrypted format, and so on. In some embodiments the metadata manager may support inclusion of third-party attribute sets in the composite schema as well—e.g., the client may specify a set of entities and/or attributes of a service or resource being provided to the client by a third-party external to the provider network, and the metadata manager may include the third-party information in the unified account state views provided to the client. The metadata manager may update the composite schema over time, e.g., if a client account obtains access to a previously-unsubscribed service, the metadata manager may add an attribute set for that service (and/or additional attribute sets for resources used for that service) to the composite schema.

Depending on the design and implementation of the various services being provided in the provider network, the techniques being used to control user access to various resources may vary in different embodiments. In some embodiments, for example, the various services may have been implemented by different development groups or even by different acquired companies, and as a result different authorization APIs and models may be used by the different service managers. In some cases authorization information may be associated with individual resources—e.g., separate access control lists (ACLs) may be set up for each storage object in some implementations. In addition, in some embodiments at least one identity manager may be implemented within the provider network, allowing client administrators to specify group and user hierarchies with associated roles and/or capabilities for various applications and/or services. For example, with respect to a content management service, a particular user X may be assigned a "content contributor" role with capabilities such as "add content", "modify content" and so on. In some embodiments the set of distributed services of the provider network may include an identity service, i.e., the identity manager may comprise the service manager of one of the provider network's services. Environments in which a variety of authorization models are used for various services and resources, including for example both identity-based authorization models and ACL-based authorization models, may be referred to herein as "mixed-mode" authorization environments.

Given the numerous authorization policies that may be in effect for the various services and resources of the provider network, identifying exactly what authorization permissions a given user has at a given point in time may be non-trivial. In some embodiments, therefore, the metadata manager may be configured to provide a number of cross-service authorization functions. For example, a client may submit a composite authorization metadata request identifying a particular authorization entity (e.g., a user or a group) affiliated with a client account to the metadata manager. In response, the metadata manager may identify a set of provider network services accessible to the client account. The metadata manager may in some embodiments generate a representation of the composite authorization metadata of the user or group, using data collected from at least two types of sources: service authentication data collected from a plurality of service managers coordinating the set of services (e.g., resource-specific ACLs for resources being used to provide the services), as well as identity-based authorization information (such as roles or capabilities) obtained from an identity manager. The metadata manager may also support queries regarding the set of steps to take to allow a specified user to attain the permissions needed for a particular future set of operations in some embodiments. For example, in response to a query identifying a particular user and a target operation, the metadata manager may use the composite authorization metadata for that user to determine whether the user is already authorized to perform the target operation. If the user is not currently authorized, the metadata manager may provide an enumeration of recommended authorization requests to be submitted (e.g., to one or more service managers or to the identity manager) to obtain authorization for the specified user for the target operation.

Additional details regarding the functionality of the metadata manager in various embodiments with respect to providing client account state views and versions, clone accounts, account state change simulations, schema extensions, and composite authorization metadata, are provided below in conjunction with the descriptions of FIGS. 1 through 28.

Example System Environment

FIG. 1 illustrates an example system environment, according to at least some embodiments. The system 100 comprises a provider network 110 with a plurality of resources 120, such as resource 120A, 120B, 120C, 120D, 120E and 120F. Resources 120 may include, for example, physical or virtual compute resources, storage resources, networking resources, and logical resources. System 100 also includes a plurality of service managers 130 (such as service manager 130A for service S1, and service manager 130B for service S2). Each service manager 130 may be responsible for coordinating a respective network-accessible distributed service implemented at least in part using some of the resources 120, and made accessible to client users 148 affiliated with various client accounts. Examples of the different types of services that may be supported in various embodiments will be discussed below in conjunction with the description of FIG. 2. A given service manager may store metadata such as operation log records and configuration settings about its service within a respective service management database 132 in the depicted embodiment—e.g., service management database 132A for service S1 and service management database 132B for service S2.

A metadata manager 180 may be responsible for handling various types of requests and queries regarding client account state from various client users 148 in the embodiment shown in FIG. 1. To help provide the requested information regarding client account state, and/or to initiate operations to implement requested changes to client account state, the metadata manager 180 may collect account information from a variety of data sources. For example, the metadata manager 180 may collect metadata associated with the various services from their respective service managers 132, and store the collected metadata in unified metadata database 190. In some embodiments, the metadata manager 190 may collect at least some resource-specific metadata directly from the resources 120. Further details regarding the kinds of metadata that may be collected for client accounts, such as authorization entity metadata, service metadata, and resource metadata, are provided below in conjunction with the description of FIG. 3.

In one embodiment, the metadata manager 180 may be able to provide a unified view of the state of a client account with respect to the different services and resources accessible by the users 148 affiliated with the client account, and may also be configured to store versions or snapshots of client account states. A client may submit a request for a multi-service view (e.g., covering either a specified set of services, or all the services to which the client account has access) of the account state as of a particular point in time, and may receive a response that indicates the resources allocated to the client account for each of the services, configuration settings at the service or resource level, and so on. At client request the metadata manager 180 may store representations of the unified multi-service account state, e.g., within database 190, as time-stamped or named versions. Various other details and features of the unified multi-service view and version functionality are described below.

The metadata manager 180 may support client account cloning in one or more cloning modes in some embodiments. In response to a request to clone a particular client account in a "deep" cloning mode as of a specified time, for example, the metadata manager 180 may in one such embodiment first identify or generate a source version (representing the state of the account at the specified time). The metadata manager may generate a new "clone" account to which the client is granted ownership or other rights, and then initiate acquisition of resources on behalf of the clone account, so that the state of the original account can be replicated for the clone account. The metadata manager 180 may also support a "copy-on-write" cloning mode in some embodiments, in which a new clone account may be created with a reference to a version of the original account's state, but resource acquisition may be deferred until the client wishes to make a change to the clone account (e.g., a new resource may be allocated to the clone account when and if the client changes a configuration setting of a corresponding resource that was allocated to the original account). The metadata may support replay (redo) and/or restore (undo) operations using versioning and cloning in some embodiments, as also described below in further detail.

To help clients try out "what-if" scenarios or estimate the likelihood of success of a set of intended operations, metadata manager 180 may support simulation of account state changes in some embodiments. Given a specified initial account state, and a set of operations that may be targeted at a number of different service managers or resources, the metadata manager 180 may respond with either a representation of an end state reachable if the set of operations succeeds, or with an indication that at least some of the operations are likely to fail. Simulating the operations before attempting them may help prevent the clients from incurring unnecessary costs and/or having to debug complicated error situations.

In order to provide an even more comprehensive view of client account state than can be obtained from the service managers and/or resources of the provider network itself, in some embodiments the metadata manager 180 may allow clients to specify additional sources of account metadata. For example, a client 148 may submit a schema extension request to the metadata manager, specifying a set of client-defined entities and/or client-defined attributes and a client data source from which to obtain values for the attributes for inclusion in a client account state representation. The client attributes may, for example, include configuration settings of a client resource set 160 within a client network 155 external to provider network 110. The metadata manager may add the client entities and attributes to the provider-network-specific baseline schema for the client account, and generate a composite customized schema for the client. Possible client data sources may include a client resource manager 170 that stores metadata for the client resource set 160 within a client resource management database 172; this client-side resource metadata may be provided to the metadata manager 180 in accordance with an update protocol selected by the client user 148. In some embodiments the client may be allowed to request the inclusion, within the composite or customized account schema, of metadata attributes from a third-party service manager 130D configured to provide a service S5 that may be in used by the client. The metadata manager may collect values of attributes of third-party resource sets 161 from the service manager 130D implemented within the third-party service provider network 156. Metadata for the service S5 may be stored by service manager 130D in database 132D, and may be retrieved from database 132D for transmission to the metadata manager 180.

In one embodiment, the authorization models (e.g., the rules used to decide the types of permissions required to perform various types of operations, the authorization API calls supported, and the way that the permissions are stored and managed) in use may differ from service to service. In addition, the authorization picture for a client account as a whole may be further complicated by the use of an identity manager (which may be one of the service managers 130) responsible for maintaining user and group roles and capabilities for the various users 148 of different client accounts. Accordingly, in such an embodiment the metadata manager 180 may provide composite authorization metadata for a specified user 148, using both identity-based authorization metadata collected from the identity manager, and service-related authorization metadata collected from other service managers 130. The metadata collected may include logs of authorization configuration operations (e.g., modifications to a user's group membership, roles/capabilities granted to users, or access control lists.) In some embodiments the service managers may include the identity manager—i.e., one of the services coordinated by the service managers may include an identity management service.

The metadata manager 180 may include a number of subcomponents in some embodiments. For example, interface manager subcomponent 182 may be responsible for implementing programmatic interfaces, such as APIs or web pages, allowing client interactions 144 (such as submissions of account state view or version snapshot requests), and service manager interactions 153 (such as collection of service or resource metadata from service managers 130). Other subcomponents of the metadata manager 180 (not shown in FIG. 1) may be responsible for specific portions of the account state management functionality in some embodiments, e.g., a simulation engine subcomponent may be responsible for account state change simulations, a pricing engine subcomponent may be responsible for estimating the costs of various operations, a causal analysis engine subcomponent may be responsible for determining root causes of unexpected operation results, and so on.

Example Catalog of Supported Services

Figure 2:
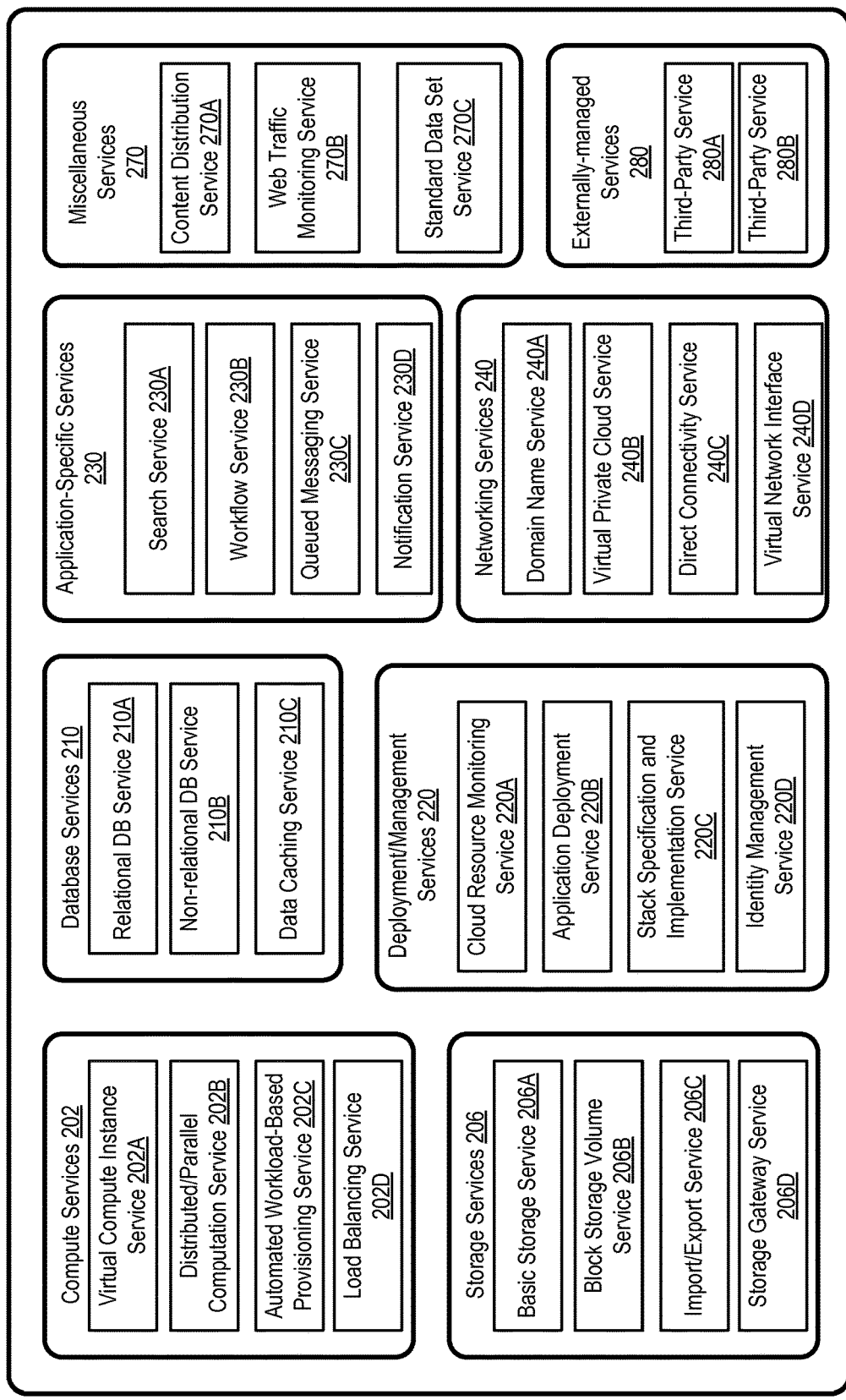
FIG. 2 illustrates an example set of distributed services that may be available to clients of a provider network, according to at least one embodiment.

FIG. 2 illustrates an example set of distributed services that may be available to clients of a provider network 110, according to at least one embodiment. As shown, service catalog 200 may include various compute services 202, storage services 206, database services 210, deployment/management services 220, application-specific services 230, networking services 240, and miscellaneous services 270. Each service may have its own service manager 130, and each service may utilize one or more resources of the provider network to implement and/or provide access to the service functionality over the Internet and/or other networks external to or included within the provider network. It is noted that although some or all of the services may be accessible to clients via the Internet, the Internet or other external networks may not be required for clients to access the services, at least in some embodiments. For example, the clients may themselves be running portions of their applications on compute resources within the provider network, and some of the services may be accessible to the client applications using networking infrastructure of the provider network, without having to access the Internet or any other network outside the provider network. Each service may be separately billable in some embodiments—e.g., a given client may be billed one amount for usage of block storage volumes (provided by service 206B), and a different amount for resource monitoring (provided by cloud resource monitoring service 220A), even if the block storage volumes were among the resources monitored.

In the illustrated example, the majority of services shown are internally managed within the provider network 110—e.g., the service managers for the majority of services are implemented entirely within the provider network. As shown, the service catalog 200 may also include a set of externally-managed services 280, including various third-party services such as 280A and 280B that are managed or provided at least in part using resources outside the provider network, e.g., the third-party resource set 161 shown in FIG. 1.

Various services of the service catalog 200 may rely upon, or be dependent upon, other services of the catalog in some embodiments. For example, the virtual compute instance service 202A may provide compute instances that may be used to implement distributed/parallel computation services 202B (e.g., services based on the Map-Reduce data processing paradigm or on various other distributed computing techniques). Similarly, an automated workload-based provisioning service 202C may allow clients 148 to automatically scale up (or scale down) their computing capacity as the workload level changes, e.g., by commissioning additional virtual compute instances from compute instance service 202A (or decommissioning existing virtual compute instances). A load balancing service 202D may allow clients to automatically distribute incoming application traffic across multiple virtual compute instances provided by service 202D.

Supported storage-related services may include a basic storage service 206A providing a fully redundant data storage infrastructure in some embodiments, allowing clients 148 (or other service managers) to reliably store and retrieve data for various applications. A block storage volume service 206B may cater to the storage needs for applications requiring block-level storage that may need to be persisted independently of the compute instances that generate or process the stored data. Import/export service 206C may allow clients 148 or other services to move large amounts (e.g., terabytes or petabytes) of data into and out of the provider network 11, e.g., using portable storage devices. Using storage gateway service 206D, a client may be able to connect a storage appliance located in the client's own data center with provider network storage (e.g., block storage volumes from service 206B), e.g., to provide seamless and secure integration between the client organization's on-premises environment and the provider network storage infrastructure.

In the illustrated embodiment, the service catalog 200 may include several types of database-related services 210, including a network-accessible relational database service 210A, a non-relational database service 210B (such as a "NoSQL" database, or an object oriented database), and a caching service 210C that provides a scalable in-memory cache. Some or all of the database-related services 210 may use computational resources provided by virtual compute instance service 202A and/or storage resources obtained from services 206A or 206B.

Cloud resource monitoring service 220A may provide performance and other metrics for various resources of the provider network 110, including for example virtual compute instances obtained from service 202A and storage obtained from basic storage service 206A or block storage volume service 206B. Application deployment service 220B may automate deployment-related operations for client applications to be deployed to virtual compute instances, such as capacity provisioning, load balancing, automated scaling, and application health monitoring, e.g., using some combination of the other services of the catalog 200. Stack specification and implementation service 220C may allow clients to specify a collection of related resources of the provider network and provision them in an orderly and predictable manner. In some embodiments the stack specification service may support a template language for specifying platform and application configuration, allowing clients to describe a desired set of resources and the operations to be performed to configure the resources for various services. For example, if a client wishes to set up a multi-tier configuration with a back-end database and front-end web server and application server layers, a template specifying the compute, storage and network resources needed to set up the various layers and the configuration steps for setting up each layer may be set up. The template may then be provided to the service manager of service 220C for implementation. Identity management service 220D may allow clients to specify user/group hierarchies affiliated with client accounts, and assign roles and capabilities to the users and groups. The service manager for identity management service 220D may provide identity-based authorization metadata to metadata manager 180 for inclusion in a composite authorization information provided to clients in some embodiments, as described earlier.

Search service 230A may allow fast search capability to be integrated into other services or into client applications. Workflow service 230B may help coordinate processing steps in various client applications and/or services, and manage distributed execution state. Queued messaging service 230C may provided hosted queues for storing messages as they travel between systems. Notification service 230D may allow users to set up, operate and send notifications from the provider network to any specified network-accessible destinations.

Domain name service 240A may support a highly available and scalable implementation of a web-accessible domain name system. Virtual private cloud service 240B may allow the provisioning of a private, isolated network using the resources of the provider network, allowing full control of the network topology configuration within the private network to the owner of the private network. Using the virtual private cloud service, a client 148 may define a virtual network topology that resembles a traditional network that might be implemented at a client data center. Service managers 130 may set up their own virtual private clouds in some embodiments—for example, the relational database service 210A may implement database functionality within one or more virtual private clouds comprising compute instances and storage obtained from services 202A and 206A, and control access to the virtual private cloud using virtual network interface service 240D. Virtual network interface service 240D may support the creation of network interface records (IRs), where each IR has one or more IP addresses and some security settings, and where IRs may be attached to virtual compute instances to enable network traffic to and from the virtual compute instances using the IR's IP addresses. Detaching an IR from a compute instance may prevent network traffic targeted at the IR's IP address from reaching the instance. Direct connectivity service 240C may allow dedicated network links to be set up between client premises and the provider network.

Content distribution service 270A may allow clients to distribute content with low latency to a global network of edge locations. Web traffic monitoring service 270B may monitor web traffic patterns and provide analysis of the traffic to subscribing clients. Standard data set service 270C may provide clients with various typically large data sets (such as data on the human genome, climate data, or census data) that can be analyzed by the client's analysis tools and applications; the data may be supplied using one of the storage services 206. For example, the data set may be provided on a block storage volume obtained from service 206B. Various other services may be implemented and managed internally (within the provider network 110) or externally (e.g., by third party service managers hosted on devices outside the provider network) in different embodiments. The metadata manager 180 may collect various types of data from each of the service managers for all the various services implemented in the provider network 110 in some embodiments, including for example audit logs/results for various API calls and service operations, and configuration settings at the service level or at the resource level.

Constituent Elements of Unified Metadata for Client Accounts

Figure 3:
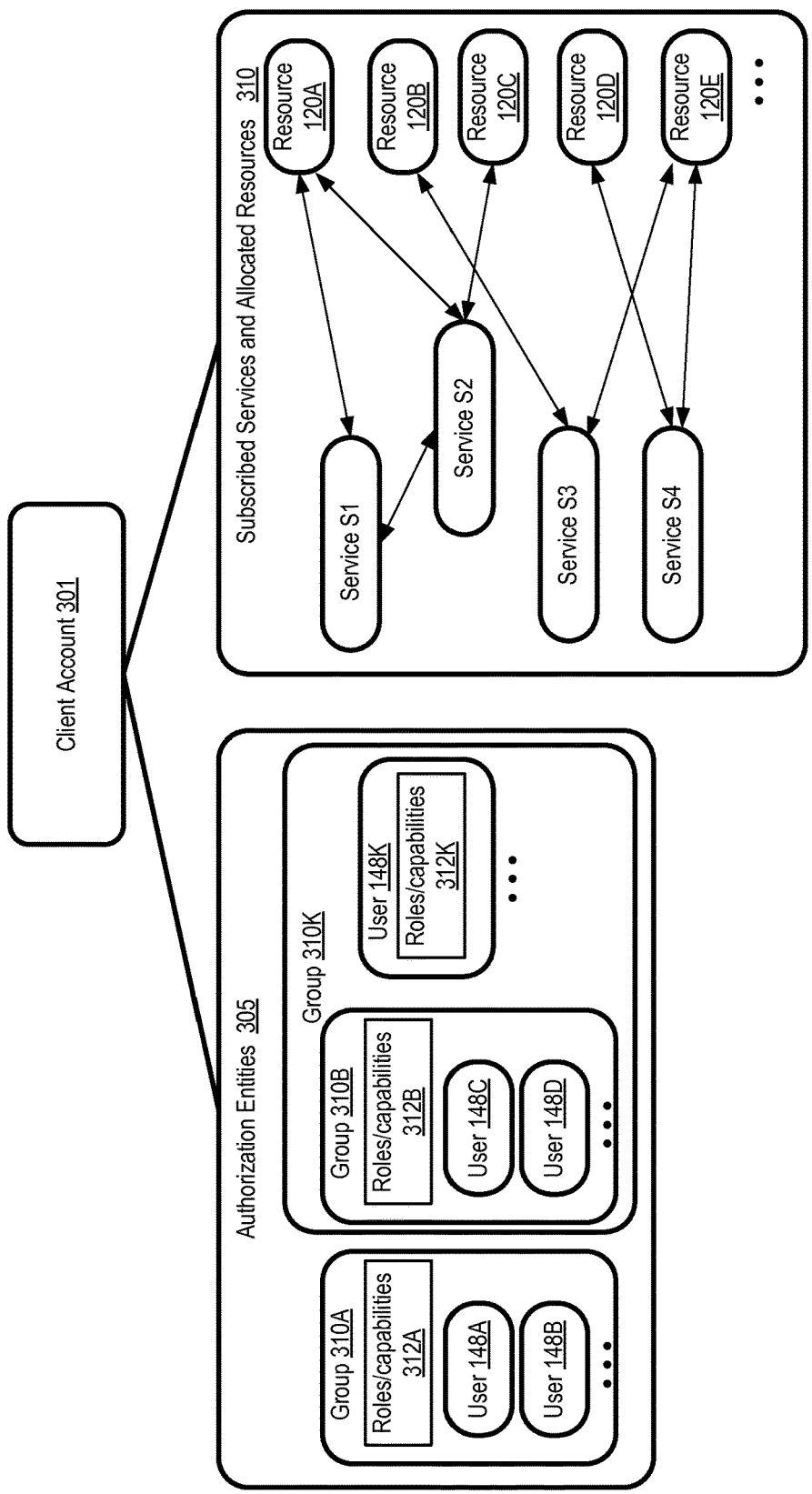
FIG. 3 illustrates examples of the kind of metadata that may be collected for a client account by a metadata manager, according to at least some embodiments.

FIG. 3 illustrates examples of the kind of metadata that may be collected for a client account 301 by metadata manager 180, according to at least some embodiments. In some embodiments, as mentioned earlier, a given client account 301 may have multiple users and/or groups affiliated with it. For example, a software development organization with fifty employees may wish to set up respective groups for software developers, quality assurance engineers, and managers. Each group 301 may include a plurality of users 148—e.g., group 310A includes users 148A and 148B, group 310B includes users 148C and 148D, and so on. A given group (such as group 310B) may belong to another group (such as group 310K). Some users may not belong to any group, while others (such as user 148K) may belong to multiple groups. The various groups and/or individual users may be assigned authorization roles and capabilities: for example, group 310A has roles/capabilities 312A, group 310B has roles/capabilities 312B, and user 148K has roles/capabilities 312K. Roles and capabilities 312 may be termed "identity-based" authorization settings or "identity" authorization settings herein, as they are associated with a user/group hierarchy and may be associated with applications rather than with specific resources. For example, users 148 of a quality assurance group 310 may be granted a "qa" role allowing with an "execute" capability for an automated test application. The complete set of identity-based authorization capabilities of a given user may depend on the combination of roles/capabilities of all the groups to which the user belongs, and on any user-specific roles and capabilities granted to that user alone. The user/group hierarchies for different client accounts 301 may be managed by a service manager 130 of an identity service 220D in some embodiments. In some embodiments, the metadata manager 180 may collect the authorization entity hierarchy information from the identity service manager, including records of requests to add/remove users from various groups, or change roles/capability settings. Some client accounts 301 may at least initially have just one affiliated user 148, and the number of users 148 and/or groups 310 of a given client account 301 may change over time.

The users 148 affiliated of a given client account 301 may have access to a number of different distributed services (such as the types of example services illustrated in FIG. 2). Each service may be implemented using a number of different resources 120 that may be allocated to the users 148 of the client account, and in some cases one service may rely on one or more other services. For example, in FIG. 3, service S1 relies on service S2. Service S1 uses resource 120A directly, and also requires the use of resources 120B and 120C that are used for service S2. A given resource 120 (such as resource 120E) may be implementing portions of the functionality of several different services (e.g., implementation modules for services S3 and S4 may be resident on resource 120E). Metadata manager 180 may communicate with the respective service managers of various services available in the provider network to determine which services are accessible to users 148 of a given client account 301. Further, for a given client account 301, the metadata manager may collect service operation records (e.g., records indicating various API calls made by users 148 using the respective service APIs of the different services) as well as other metadata such as the mappings between services, resources 120 and the users to which the resources are allocated. In some embodiments the metadata manager may gather configuration or administration data as well as application data (e.g., contents of user database tables or data structures).

Dataflow Examples

Figure 4:
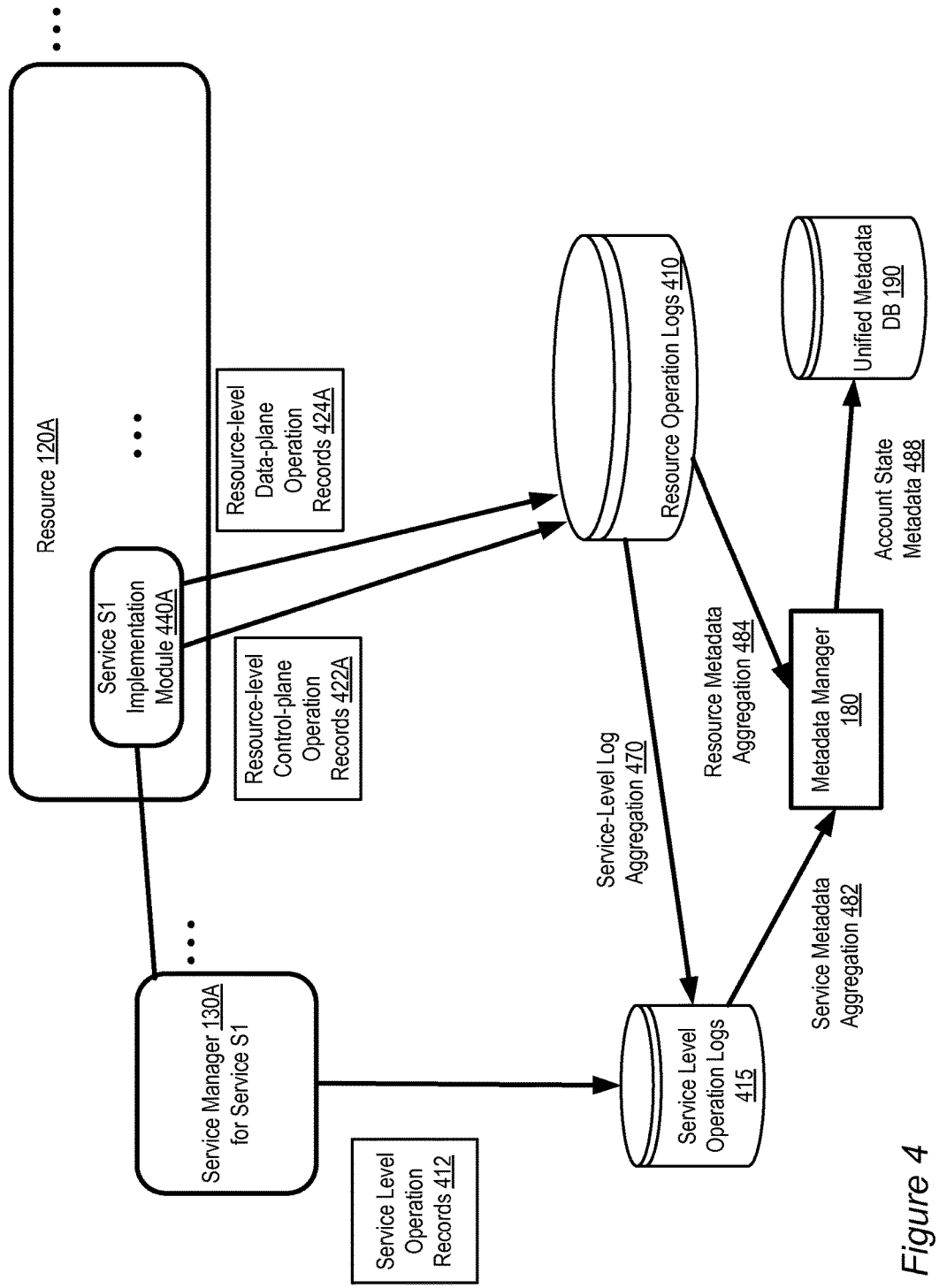
FIG. 4 illustrates examples of the flow of account state metadata from resources and service managers to a metadata manager, according to some embodiments.

FIG. 4 illustrates examples of the flow of account state metadata from resources 120 and service managers 130 to metadata manager 180, according to some embodiments. As shown, one or more service implementation modules may be resident on a resource 120A, including service implementation module 440A implementing a portion of the functionality of service S1. As various administrative and user-level operations are performed by the service implementation modules 440, records of resource-level operations may be saved in resource operation logs 410. In some embodiments the logs 410 may comprise both control-plane operation records (e.g., records of configuration changes that required administrative privileges) such as 422A, as well as data-plane operation records (e.g., records of changes made by non-administrative users to the application data sets of the respective services) such as 424A. In other embodiments, only control plane records may be collected, or only data-plane records may be collected. In some embodiments, the types of operation records collected for resource operation logs 410 may be controllable in response to client requests— for example, some services may support multiple log levels that can be set by the clients such as "error", "info" or "debug" log levels.

In addition to or instead of the resource-level operation records 422 and 424, in some embodiments each service manager 130, such as service manager 130A for service S1, may log its own records 412 of service-level operations in service level operation logs 415 (which may for example be stored in a service management database 132, similar to databases 132A and 132B of FIG. 1). The recorded service level operations may, for example, comprise configuration changes that are not resource-specific. While resource-level operation records 410 may be stored at each of several resources allocated to users 148 for service implementation, and may at least in some embodiments be visible to the users 148, service level operation logs 415 may be stored at resources that are allocated to the service managers 130, and may at least in some embodiments not be visible to users 148. In the embodiment shown in FIG. 4, as shown by the arrow labeled "470", the service manager 130A may collect resource-level operation records from the various resources 120 that have resident implementation modules of service S1, and add them to service level operation logs 415. The metadata manager 180 may collect service-related metadata (including resource-level metadata collected by the service manager 130A) pertaining to a particular client account from the service level operation logs 415 (as indicated by the arrow labeled 482). In some implementations, the metadata manager 180 may also be able to collect at least some resource-level operation logs directly from each resource log 410 (as indicated by the arrow labeled 480). The metadata manager may save account state information gathered from the service-related logs and/or the resource-specific logs into the unified metadata database 190, as indicated by the arrow labeled 488. It is noted that although FIG. 4 displays operation log record transfers, other types of metadata that is not necessarily included in the operation logs may also flow to the metadata along similar pathways in some embodiments—for example, performance metrics collected on various resources and/or at the service level may be collected as part of account state information in one embodiment. The types of data flow illustrated in FIG. 4 for service S1 may be repeated for other services and resources—e.g., if resource 120A comprised a service implementation module for additional different service S2, resource-level operation records for S2 may be collected in analogous logs 410, and/or collected in service-level operation logs for S2 before being obtained by the metadata manager 180.

In some embodiments, each service manager 130 may implement a set of APIs, and records of the API calls (including the results of the API calls) may be included in the metadata collected. For example, in one implementation, the service manager responsible for providing compute instances (e.g., the service manager for service 202A of FIG. 2) may implement at least the following APIs: StartInstances, Stopinstances, ModifyInstanceAttribute, RebootInstances, DescribeInstances, TerminateInstances. A time-stamped API call log record (including an indication of whether the call succeeded or not) may be generated whenever one of these APIs is invoked by any user. Such API call log records for various services may be among the sources of metadata collected by the metadata manager 180 in such an implementation.

Figure 5:
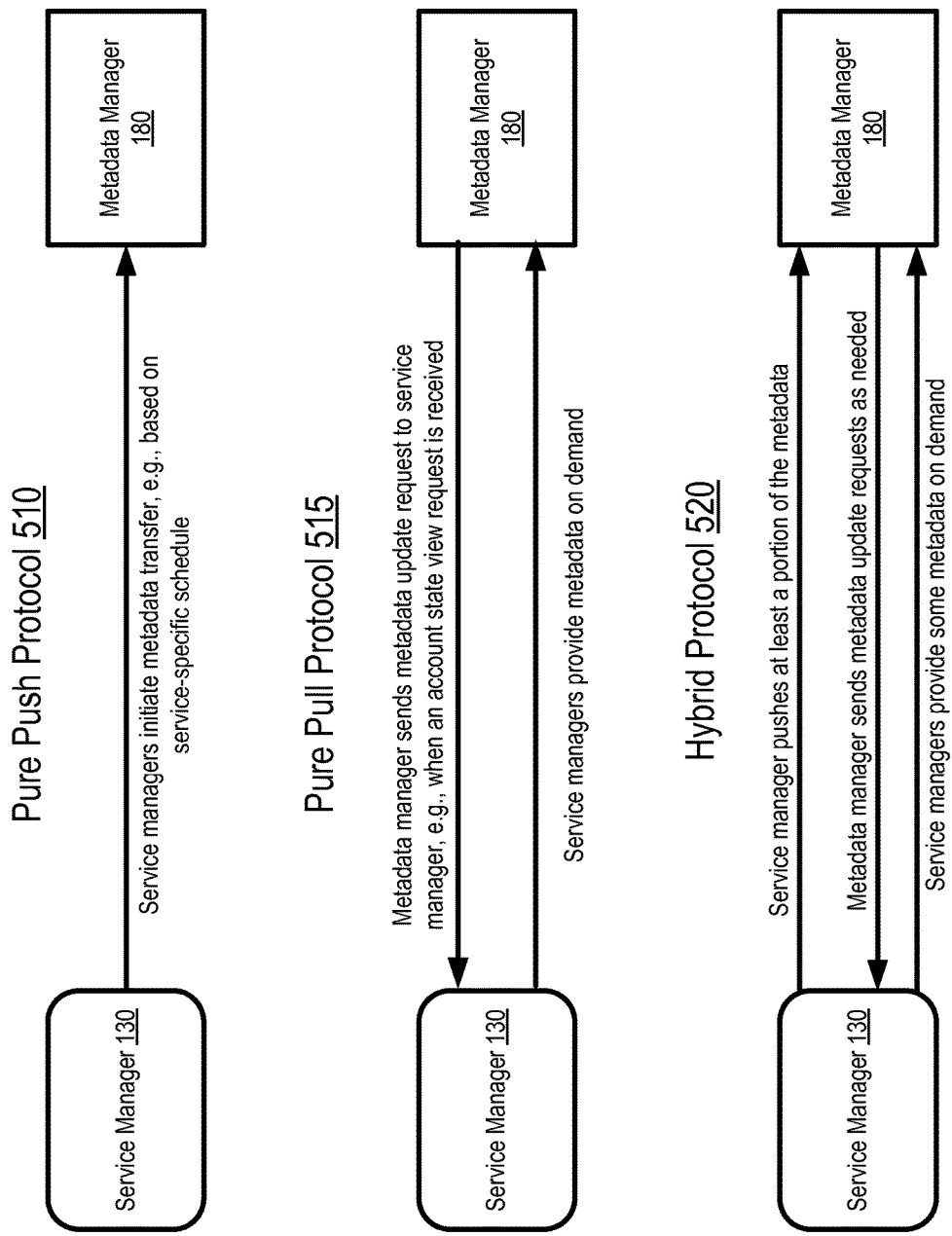
FIG. 5 illustrates three example update protocols that may be used for metadata transfers between service managers and a metadata manager, according to at least some embodiments.

In different embodiments, the service and resource metadata may be obtained by the metadata manager 180 in accordance with respective update protocols that determine when and by whom metadata transfers are initiated. FIG. 5 illustrates three example update protocols that may be used for metadata transfers between service managers 130 and a metadata manager 180, according to at least some embodiments. According to a pure push protocol 510, service managers 130 may be responsible for initiating transfer of metadata such as operation logs 410 and 415 to metadata manager 180. According to a pure pull protocol 515, a metadata manager 180 sends metadata requests to service managers 130, and the service managers respond with the requested metadata. In one embodiment, for example, a metadata request may be sent when an account state view request or version snapshot creation request is received by the metadata manager 180. In some embodiments a hybrid protocol 520 may be used, in which some metadata transfers are initiated by service managers 130, while the metadata manager 180 is also enabled to request metadata as needed. In some embodiments where the metadata manager communicates directly with the resources 120 (e.g., with service implementation modules 440 resident on the resources) to obtain resource-level metadata, similar push, pull or hybrid protocols may be utilized between the resources 120 and the metadata manager 180. In some embodiments, as described below in further detail, additional details regarding metadata transfers, such as how long metadata for a particular resource or service attribute is retained, or whether the metadata is transferred in an encrypted format or in plain text, may be governed by service descriptors and/or resource descriptors maintained by the metadata manager 180.

Unified Account State Views and Version Snapshots

Figure 6:
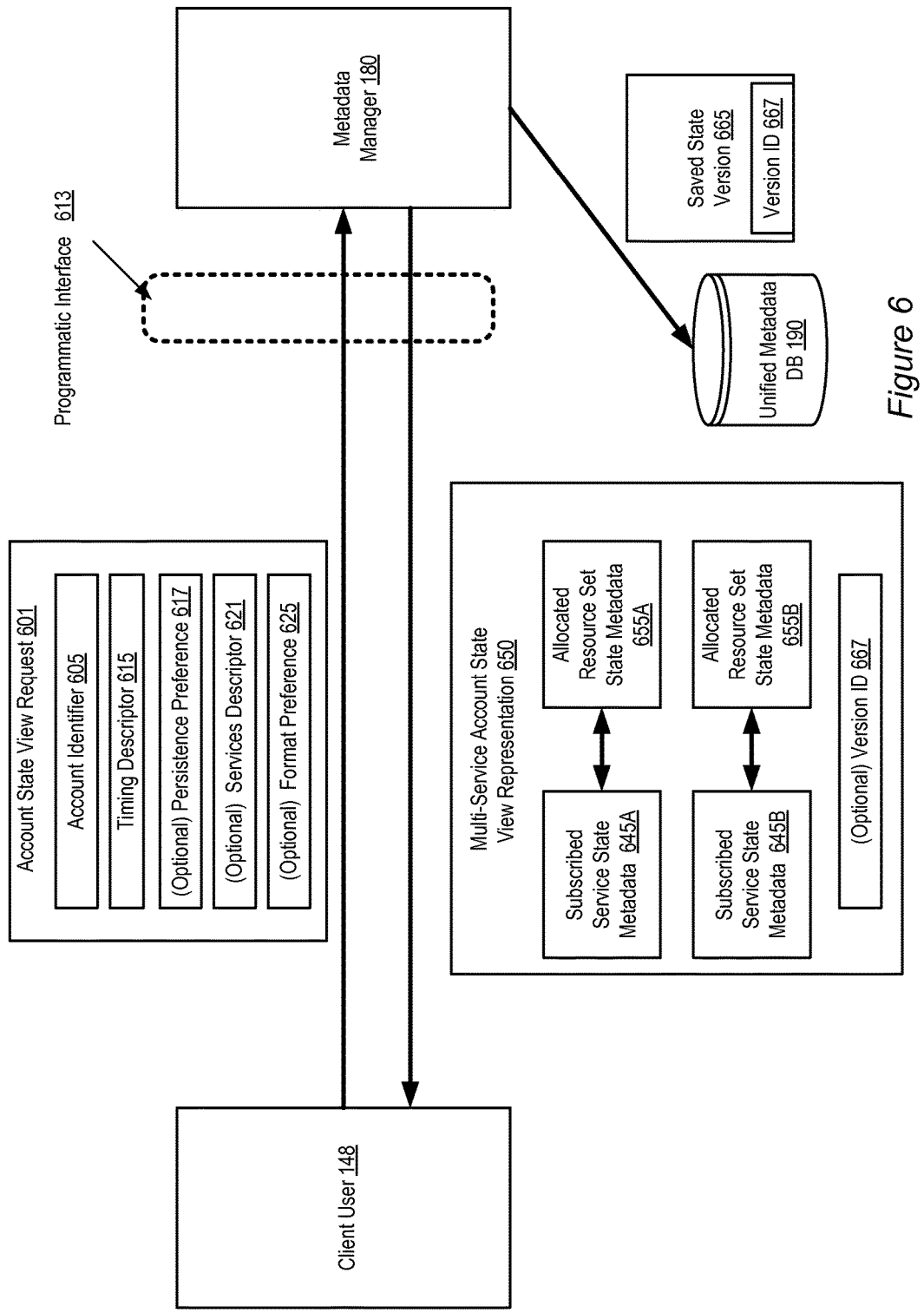
FIG. 6 illustrates example interactions between a user and a metadata manager related to generation of account state views and saved versions, according to at least one embodiment.

FIG. 6 illustrates example interactions between a client user 148 and metadata manager 180 related to generation of account state views and saved versions, according to at least one embodiment. As shown, the client user 148 may send a multi-service account state view request 601 to the metadata manager 180 via a programmatic interface 613 (such as an API or a web page which may be implemented by interface manager 182). The account state view request 601 may include a client account identifier 605 and a timing descriptor 615 which may directly or indirectly indicate the preferred time for which the unified multi-state account view is being requested. For example, in one simple implementation the client user 148 may explicitly specify the target time (e.g., based on the requester's time zone or a specified time zone) for which the state view is being requested—i.e., the request may include the logical equivalent of "please provide a view of the account state for account A1 as of Jan. 6, 2012 at 8:00 AM EST". In other implementations clients 148 may specify the timing based on events or operations—e.g., the logical equivalent of "please provide a view of account state for account A2 as of just before application A on compute instance CI1 ran out of memory" or "please provide a view of account state for account A3 as of the last time any large compute instance was reserved by any user affiliated with A3 for a three-year reservation term". By default, if no specific time or event is indicated in the request, in some embodiments the metadata manager may provide a state representation for the latest (most recent) time for which state metadata is available or can be collected. In some implementations, because of the time it takes to compute account state, there may be a delay before the representation is provided to the client—e.g., even if the client requests the "current" account state, some time may elapse before the state representation is displayed. In at least some implementations, especially for large client accounts, the metadata manager 180 may inform clients about timing constraints associated with generating account state views—e.g., that such views can only be generated once every X minutes or hours, or that while the metadata manager will make a best effort to generate the state view for as close to the requested target time as possible, no guarantees can be provided that the state view will be accurate as of exactly the targeted time.

In some embodiments, the user 148 may indicate, e.g., via a persistence preference 617, that a version snapshot of the unified multi-service account state representation is to be saved for future reference or use. A services descriptor 621 may be used in some implementations to indicate to the metadata manager 180 that information about some services can be excluded from the state view; further details regarding services descriptors are provided in conjunction with the description of FIG. 7. In some embodiments the metadata manager 180 may allow clients to select (e.g., via a format preference 625) from among a plurality of formats for the requested state view, e.g., whether the client wishes to obtain a graphical view, a text view, or a view generated in accordance with an XML schema or some other custom format. In at least some implementations, an account identifier 605 may not be required in the account state view request—for example, the metadata manager 180 may be able to determine the client account for which the state view is being requested based on the identity of the user submitting the request. In at least one implementation, clients may not be allowed to provide account identifiers in state view requests (and/or other requests such as version snapshot requests, cloning requests and the like); the metadata manager in such an implementation may determine the client account based on various factors such as the identity of the submitter of the request, the network address from which the request is received, and so on.

In response to the view request 601, the metadata manager may generate a multi-service account state view representation 650. The view may include various types of metadata, including for example an indication of a plurality of resources being used for a plurality of services accessible to users of the client account with identifier 605. In the illustrated example, the view comprises metadata 655A of a set of resources allocated to the client account (e.g., allocated to various users 148 affiliated with the client account) for implementation of one service, metadata 655B of a set of resources allocated to the client account for another service, and service-level metadata 645A and 645B for each of the corresponding services. In addition to resource allocation information, various other configuration data for the resources and the services may be included in the view in some implementations, such as performance or availability metrics. If the client requested that a version the account state be made persistent, the metadata manager 180 may save a version 665 of the client state as of the time indicated in timing descriptor 615 in unified metadata database 190. The version identifier 667 of the saved version may be included in the response provided to the client. In some embodiments, even if the requesting user 148 does not explicitly request that a version of the state be saved, and simply wishes to view the state of the account as of a specified time, the metadata manager may nevertheless save version 665 in database 190 for future reference and/or as a record of the view request itself. The versions 665 may be stored in a compressed or binary format in some embodiments, e.g., to reduce storage utilization.

Figure 7:
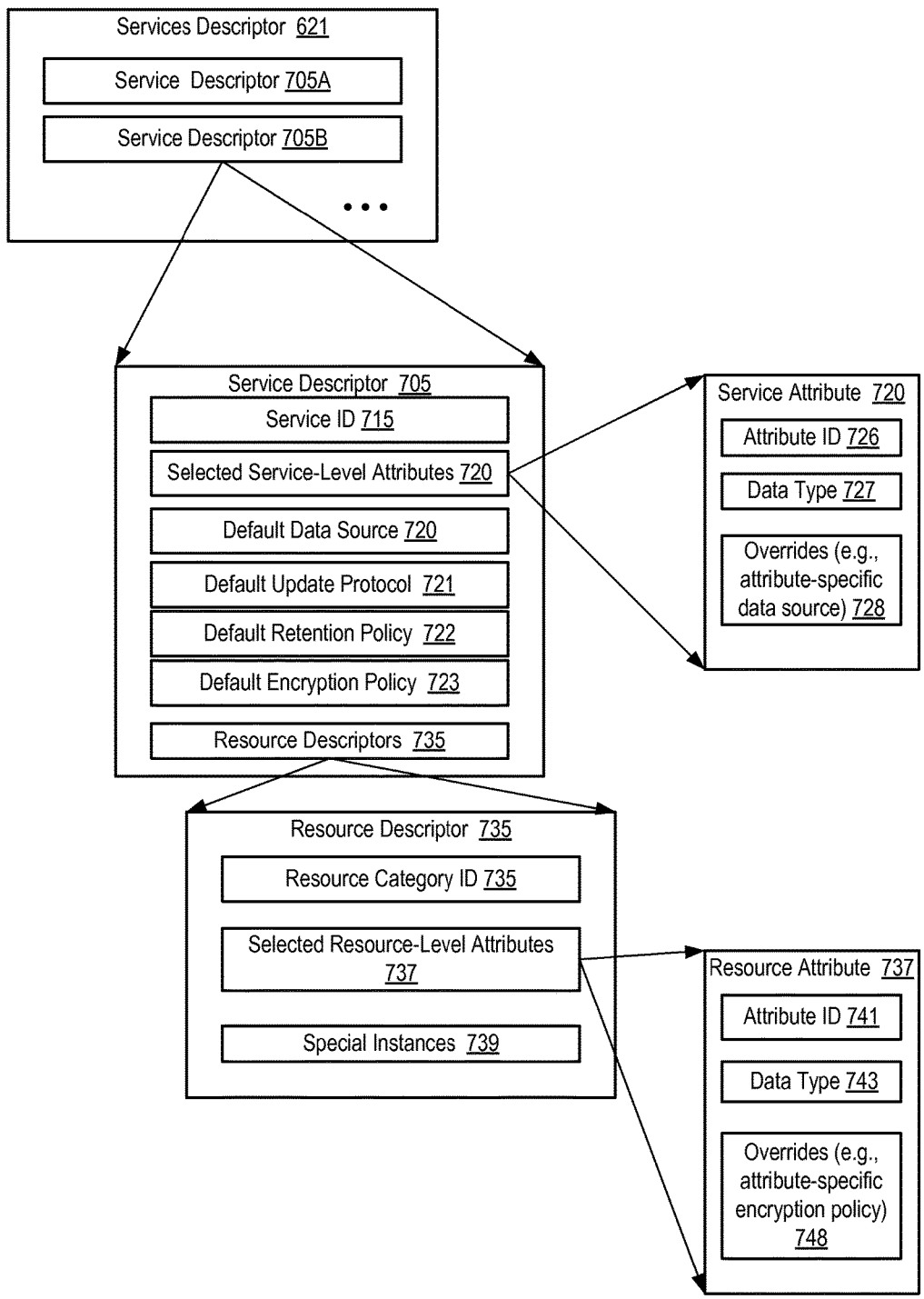
FIG. 7 illustrates example constituent elements of a services descriptor, according to one embodiment.

In at least one embodiment, the type of metadata to be considered for inclusion in the multi-service account state views or versions may be filtered or controlled with the help of services descriptors 621. FIG. 7 illustrates examples of constituent elements of a services descriptor 621, according to one such embodiment. The metadata manager may in some embodiments use a default services descriptor 621 if a particular services descriptor is not specified in a view request or a version request. As shown in FIG. 7, a services descriptor 621 may comprise a plurality of service descriptors 705, such as service descriptors 705A and 705B. Each service descriptor 705 in turn may comprise an indication of a service identifier 715 of one of the distributed services for which metadata is to be included in the state representation, as well as a set of selected service-level attributes 720 whose values are to be included in the state representation. A default data source 720 for the service-level attribute values may be specified in a service descriptor in some embodiments (e.g., an IP address and port to which queries for service-level attribute values in a designated format are to be sent, or from which attribute values are to be received, depending on the update protocol in use). The service descriptor may also include an indication of a default update protocol 721 in one embodiment, indicating, for example, which of the protocols illustrated in FIG. 5 are to be used for attribute value transmission, and/or how frequently the attribute values are to be collected. In some embodiments a default retention policy 722 may be specified for each service, indicating how long the metadata manager is expected to retain attribute values before it is allowed to discard them. A default encryption policy 723 may indicate whether the attribute values are to be encrypted, and if so, the details of the encryption mechanism to be used in some embodiments.

For each service-level attribute 720, the service descriptor may point to or include an attribute identifier 723, the data type of the attribute (e.g., whether the value is numeric, a string, or a binary object), as well as optional overrides information 728. For example, if values for a particular service attribute are to be obtained from a different data source than the default data source 720, an overriding data source may be specified for the attribute. Similarly, if attribute values for a given attribute are sensitive and require stronger encryption than the default, an overriding encryption mechanism may be indicated via overrides 728. In addition, the service descriptor 705 may in some implementations include one or more resource descriptors 735 to govern the types of metadata included for various types of resources.

Each resource descriptor 735 in turn may include a resource category identifier 735 (e.g., respective identifiers for "virtual compute instance", "load balancer instance", "virtual network interface", and so on), and information about selected resource-level attributes 737 whose values are to be included in the requested account state view or version. For example, with respect to the resource category "virtual compute instance", in one implementation the set of attributes may include: MachineImage (indicating the binary image comprising the files of an operating system to be used for the virtual machine for the instance), InstanceType (indicating the performance capabilities and/or pricing model for the instance), LocalHostName (the hostname to be associated with the instance), PrivateIPV4Address (the Internet Protocol (IP) address of the instance visible within the provider network), PublicIPV4Address (the IP address of the instance that is visible outside the provider network, e.g., on the public Internet), MACAddress (the media access control address for the instance), SubnetAddress (the IP subnet address of the instance), ProductCodes (identifiers of various software products installed on the image, usable for billing), AvailabilityZone (an indication of the geographical location of the instance's data center), and so on. For each selected resource-level attribute 737, the resource descriptor may refer to or include a respective attribute identifier 741, a data type field 743, and optional overrides information 748 analogous to the overrides field 728 described above for service-level attributes.

In some embodiments, in addition to filtering resource-level attributes by resource category, a client 148 may wish to identify a set of special resource instances 739 for which more detailed metadata may be desired for inclusion in the account state representation. For example, out of a fleet of fifty compute instances, three or four instances may be running mission-critical applications, and such instances may be identified as special instances 739. For each special instance, additional details of exactly what types of attributes are to be included in the state representation may be provided. In some embodiments, additional information about the service and resource attributes to be included in the state representation may be specified in the service and/or resource descriptors, such as the validity period for each attribute value collected (i.e., how long a given attribute value can be considered valid before it is to be regarded as "stale" and a new value is to be obtained).

The metadata manager 180 may store the services descriptor 621 and/or their constituent elements in database 190 in some embodiments, so that subsequent requests from the same user 148 or from other users of the same client account can use the same services descriptors 621. If no service descriptors or resource descriptors are specified or referenced in a client's view request or version request, the metadata manager may use a default services descriptor in some embodiments, as noted above. In one implementation, for example, the default services descriptor may cover all the services to which the client account has access, and the account state representation may include default sets of service-level attributes and resource-level attributes defined by the respective service managers of the various services. In one embodiment, the types of entities and attributes associated with various services and resources illustrated in FIG. 7 may be included within a baseline provider network metadata schema maintained by the metadata manager 180; further details about such a schema, and how it may be extended in some embodiments, are provided below in conjunction with the description of FIG. 21.

Methods for Account State View Generation and Versioning

Figure 8:
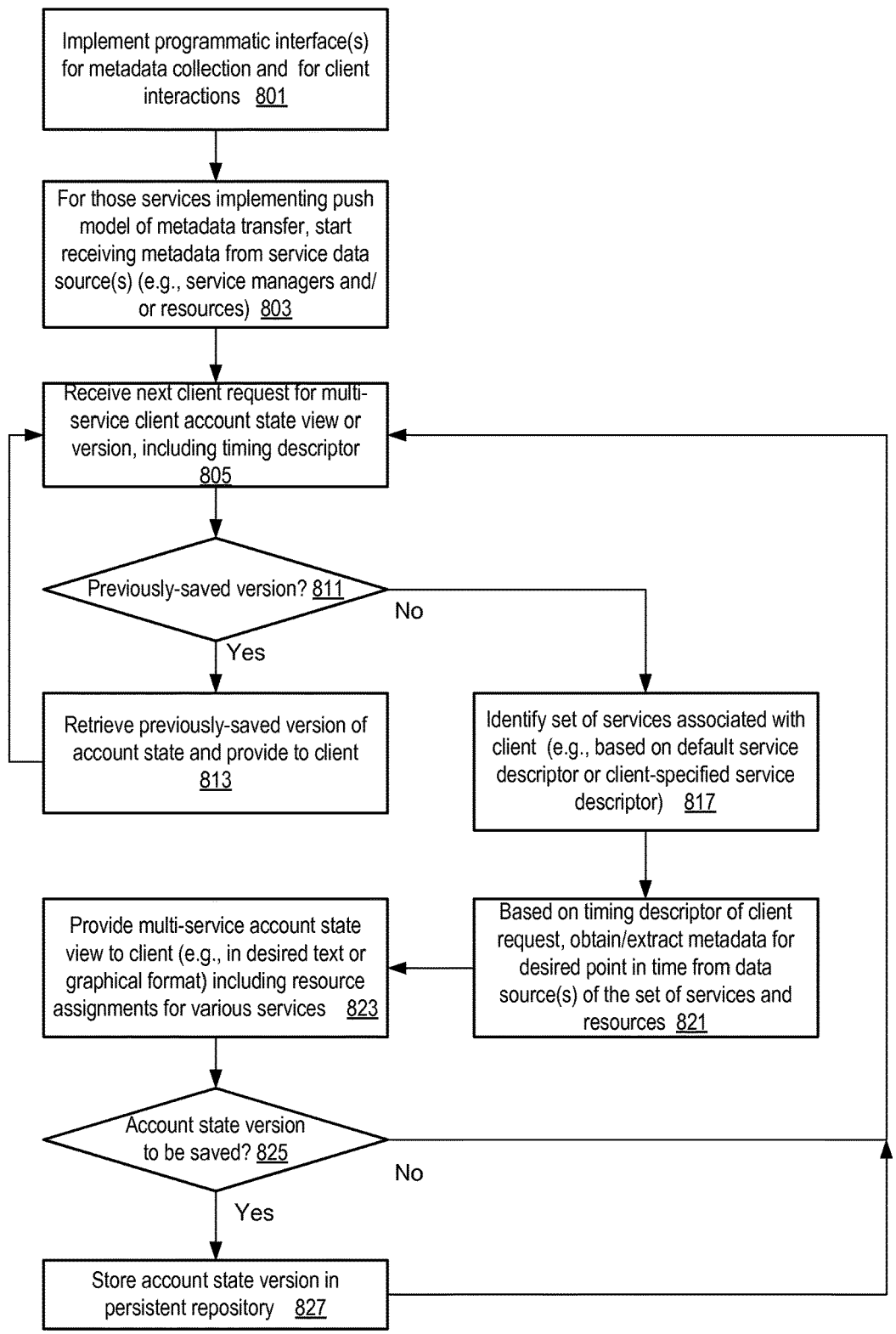
FIG. 8 is a flow diagram illustrating aspects of the operation of a metadata manager configured to generate unified account state views and saved account state versions, according to at least some embodiments.

FIG. 8 is a flow diagram illustrating aspects of the operation of a metadata manager 180 configured to generate unified account state views and saved account state versions, according to at least some embodiments. As shown in element 801, one or more programmatic interfaces may be implemented (e.g., by an interface manager component 182 of a metadata manager 180) for interactions between clients 148 and the metadata manager, and for metadata collection by the metadata manager from various service and/or resource data sources. The metadata manager 180 may start receiving metadata from those data sources (e.g., service managers 130 and/or resources 120) that are configured to push their metadata to the metadata manager (element 803).

When the next client request for a multi-service client account state view or version creation is received (element 805), specifying a particular client account and a timing descriptor, the metadata manager 180 may in some implementations first determine whether the request is for a version of account state that has already been saved in a repository such as unified metadata database 190 (as determined in element 811). For example, a particular client user 148 may wish to review a version that was created earlier, at the request of that same user or another user. In some embodiments, depending on the granularity of the timestamps supported for views and versions, it may be possible to re-use an existing version for several different timing descriptors—e.g., if account state versions are saved no more frequently than every hour, a request for a version as of 11:30 AM on a specified date may be satisfied by displaying a view of a version saved at 11 AM on that date. If the request can be fulfilled by retrieving an existing saved version, the metadata manager may retrieve the appropriate version from the repository and provide a view or display of that version to the client (element 813).

If there is no saved account state version that can be used (as also determined in element 811), the metadata manager 180 may begin the process of extracting/correlating the required account state information. In the depicted embodiment the metadata manager may first identify the set of distributed services whose metadata is to be included (element 817)—e.g., the services indicated in a services descriptor 621 referenced in the request, or in a default or implicit services descriptor if the request did not indicate any specific services descriptor. For example, in one implementation by default the metadata manager 180 may attempt to identify all the different services to which the client account has access by communicating with the respective service managers 130. After the appropriate set of services has been identified, the metadata manager may assemble the metadata for the services and associated resources (element 821). Depending on the update protocols applicable for the various service and/or resource attributes being considered, the metadata manager may either send requests for metadata (if the pull mode of metadata extraction is in effect) or use the most recent data that was pushed by the service data sources or resource data sources. After collecting the appropriate set of attribute values, the metadata manager may generate a multi-service account state representation view that includes, for example, enumerations of the resources allocated to the client account for various services accessible by the client account (element 823). In some embodiments, the account state representation may include a variety of administration information in addition to the resource allocations, such as configuration settings (e.g., modifiable parameters of various services and resources), connectivity information (e.g., network addresses and ports being used for communication by various services and resources), authorization information (e.g., permission settings for various types of operations associated with the services and/or resources), environment variable values, and so on. In at least one embodiment, an account state representation may include data state as well as administration state—e.g., metadata about storage objects being used by applications executing on behalf of the client account, such as files, file systems, key-value store objects, or even the actual contents of various storage objects.

In the depicted embodiment, the metadata manager 180 may then determine whether the account state is to be saved in a persistent store such as unified metadata database 190 (element 825). If the client requested that a version should be saved, or if the metadata manager is configured to save a version for each unique view request, for example, a representation of the state may be stored as a version with a corresponding version identifier in some embodiments (element 827). The saved version may in some implementations comprise pointers to, or identifiers of, the various resources 120 allocated to the client account's users, which may be used to support some of the account cloning functionality described below in further detail. In either case, whether a new version is stored or simply provided to the user via one of the interfaces implemented for client interactions, the metadata manager 180 may then proceed to handle the next view or version request that is received (element 805).

Figures 9A, 9B:
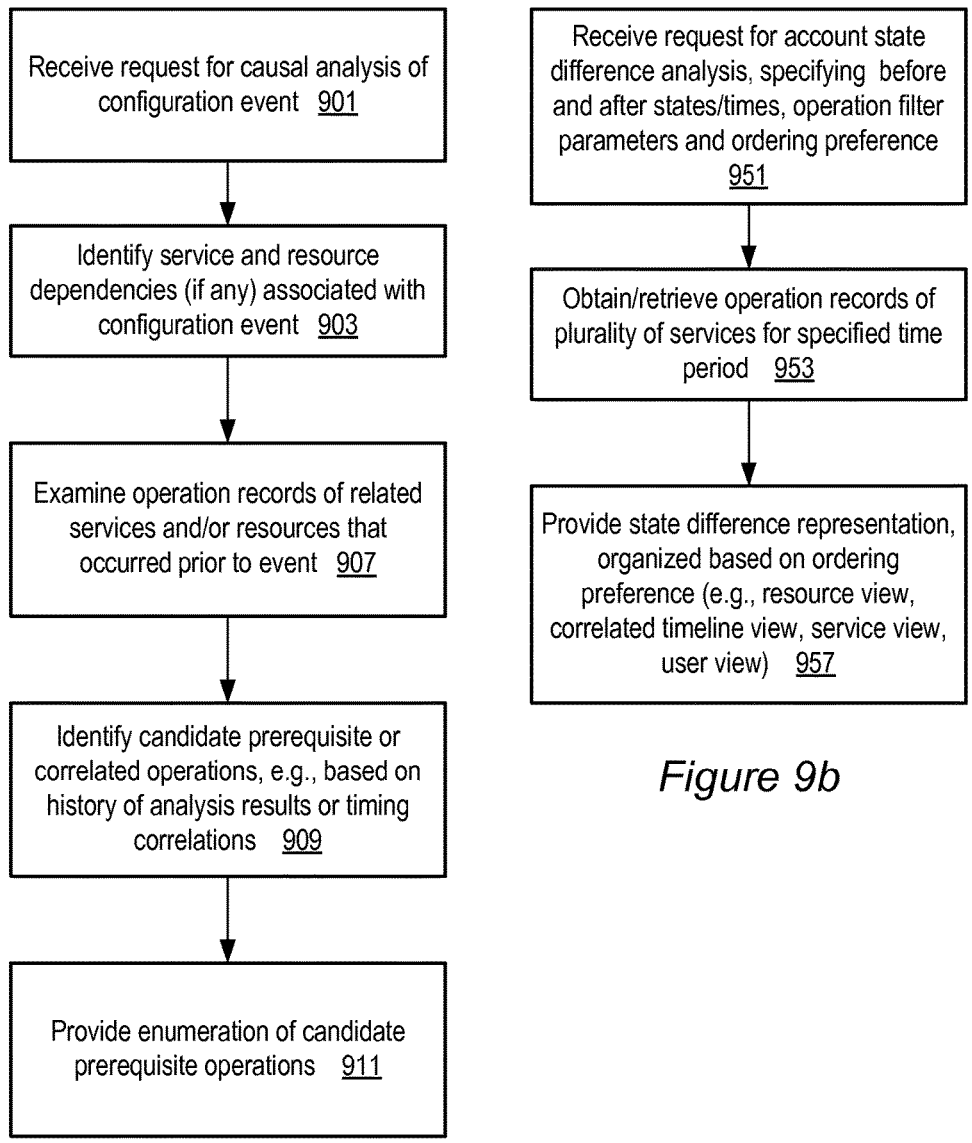
FIG. 9a is a flow diagram illustrating aspects of the functionality of a metadata manager configured to provide causal analysis of a configuration event, according to at least one embodiment.
FIG. 9b is a flow diagram illustrating aspects of the functionality of a metadata manager configured to provide parameterized account state difference analysis, according to at least one embodiment.

FIG. 9*a* is a flow diagram illustrating aspects of the functionality of a metadata manager 180 configured to provide causal analysis of a configuration event, according to at least one embodiment. A client may have encountered an unexpected event such as a failure of a requested configuration change, and may submit a causal analysis request (element 901). The occurrence of the event may have been recorded in operations records collected by the metadata manager 180 in some embodiments. The metadata manager 180 may then identify any service and/or resource dependencies associated with the event (element 903)—for example, the configuration change may have been requested from a service manager of a service S1 that depends on a different service S2.

Having identified a set of services and/or resources to be investigated as possible causes of the event, the metadata manager 180 may examine the operation records for those services and resources, e.g., to try to identify related operations that occurred before the event (element 907). The metadata manager may identify a set of candidate prerequisite operations, potentially associated with a different service, for the event whose cause is being investigated (element 909). A prerequisite operation O for an event E may be defined as an operation whose successful completion prior to E's occurrence is a requirement for E's occurrence. The metadata manager may correlate the timings of operation records associated with multiple services and resources to come up with the candidate operations in some embodiments. In one embodiment, the metadata manager 180 may save histories of previously attempted causal analysis, and may use pattern matching techniques based on past successful causal analyses to narrow down the set of possible causes for the event. If one or more candidate prerequisite operations are found, the metadata manager 180 may provide an enumeration of those operations to the requester of the causal analysis (element 911). In some embodiments, if it is not possible to identify prerequisite events for the event being investigated, the metadata manager 180 may provide an enumeration of events that may simply be correlated with the investigated event (e.g., because they happened at a related service manager shortly before the investigated event). The collection of operational metadata from a variety of services may allow the metadata manager 180 to help in debugging complex problems whose cause may not be easily determinable by analysis of a single service's operation records in some embodiments.

FIG. 9*b* is a flow diagram illustrating aspects of the functionality of a metadata manager 180 configured to provide parameterized account state difference analysis, according to at least one embodiment. A client user 148 may submit an account state difference view request for a specified client account (element 951). The request may specify a "before" state and an "after" state for which the differences in account state are to be determined. The before and after states may be specified in a number of alternative ways in different implementations: e.g., either by indicating time values for the two states, or by referring to a pair of events that have been recorded, or by referring to previously-created saved versions of account state. In addition to the before and after state indicators, in some embodiments the request may specify a number of different service and/or resource filters (similar in concept to the selected attributes of service descriptors and resource category descriptors illustrated in FIG. 7) to limit the kinds of attributes to be considered when computing the state difference. In one embodiment, the difference request may also include an ordering preference indicating how the state difference is to be displayed or arranged. For example, the difference between the before and after states could be displayed on a per-resource basis by listing the resources whose configuration has changed and identifying their respective configuration changes; or a single timeline of operations at various services and resources that changed state may be provided; or changes could be grouped and displayed on a per-service basis; or state changes could be arranged by the specific users who initiated them.

After receiving the state difference analysis request, the metadata manager 180 may extract the relevant records from unified metadata database 190, or obtain metadata from the service data sources and/or resource data sources, pertaining to the time period between the "before" and "after" states (element 953). The metadata manager may then provide a representation of the state difference, organized in accordance with the ordering preference specified in the request (element 955). If no ordering preference was specified, the metadata manager 180 may choose a default ordering to organize the representation of state difference.

Example Web Interface for Unified Account State View

Figure 10:
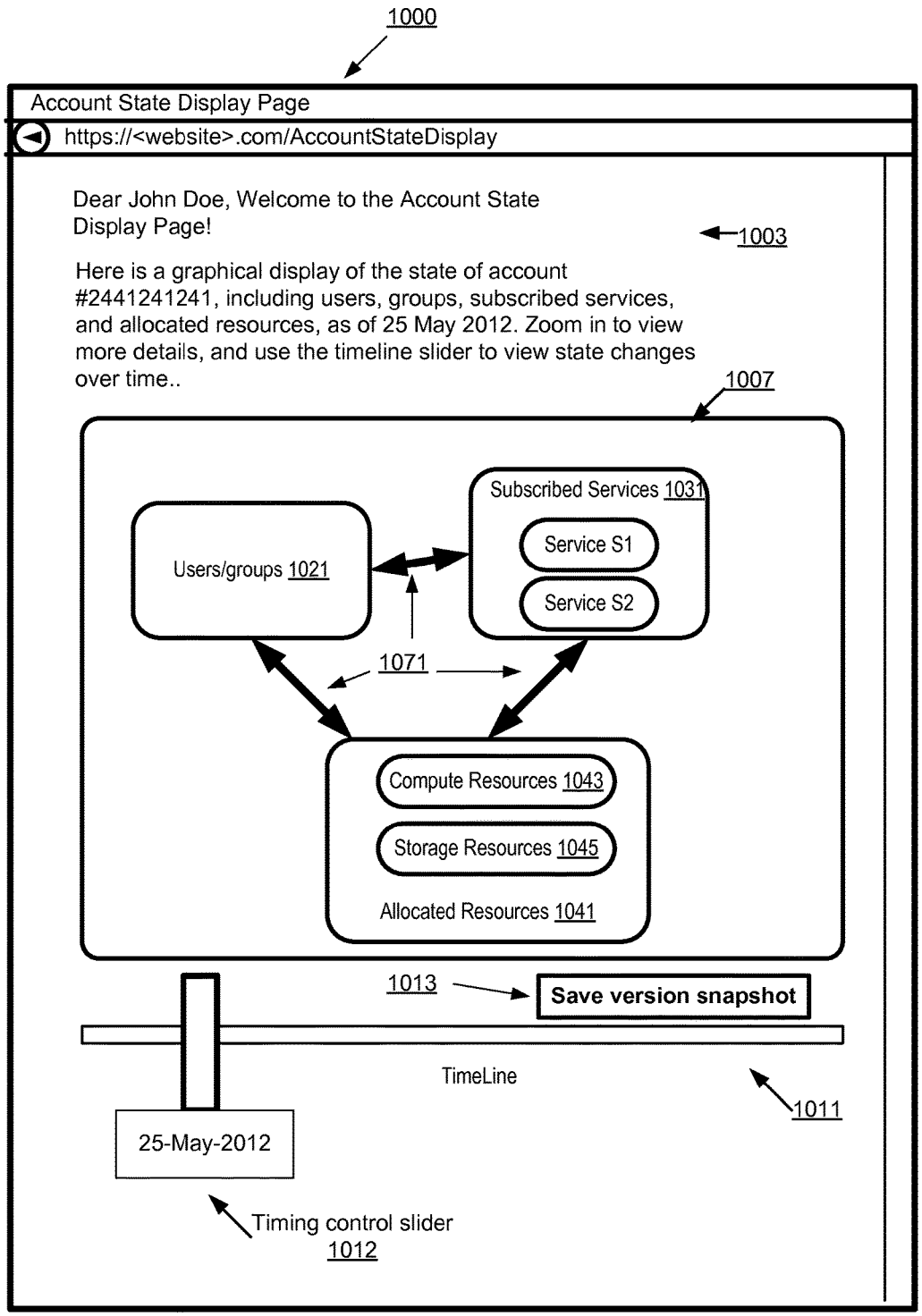
FIG. 10 illustrates a portion of an example web-based interface that may be implemented to allow clients to view the unified client account state representations generated by a metadata manager, according to some embodiments.

FIG. 10 illustrates a portion of an example web-based interface that may be implemented to allow clients 148 to view the unified client account state representations generated by metadata manager 180, according to some embodiments. Such an interface may be implemented by the interface manager component 182 of the metadata manager in some embodiments, or by a standalone interface manager external to the metadata manager 180 in other embodiments. As shown, the interface may include a web page 1000 that includes a message area 1003 and an account state graphical display area 1007.

In the depicted example web page 1000, the graphical display area 1007 includes a high level overview of three types of interrelated entities that when combined, may represent at least a portion of the account state: users/groups 120, subscribed services 1031, and allocated resources 1041. The relationships between the authorization entities (users/groups), the resources allocated to the authorization entities and the services that are accessible to them may be represented by the arrows 1071. By zooming in on the entities or the relationship-indicating arrows 1071, further details may be made visible in the depicted implementation, as indicated in message area 1003. The time for which the state is being displayed may be indicated by the position on timeline 1011 of the timing control slider 1012. The view may be dynamically updated to display the client account state as of a different time, by moving the timing control slider 1012 along the timeline 1011. For example, if a user moves the slider to a position corresponding to a different time T, an account state view request 601 with a timing descriptor indicting T may be transmitted to the metadata manager 180, and the multi-service account state view representation returned by the metadata manager 180 may be displayed in area 1007. A version snapshot corresponding to the currently displayed account state may be saved by clicking on button 1013 in the depicted embodiment.

A number of additional web pages, APIs, command-line tools, or custom graphical user interfaces may be implemented by interface manager 182 in various embodiments, to allow client users 148 to submit state view requests, version generation requests, state difference requests, causal analysis requests and the like. In at least some implementations, a user 148 may have the option of choosing between multiple interfaces—e.g., a version generation request may be sent either via a web page or an API call, depending on the user's preference.

Account Cloning

Figure 11:
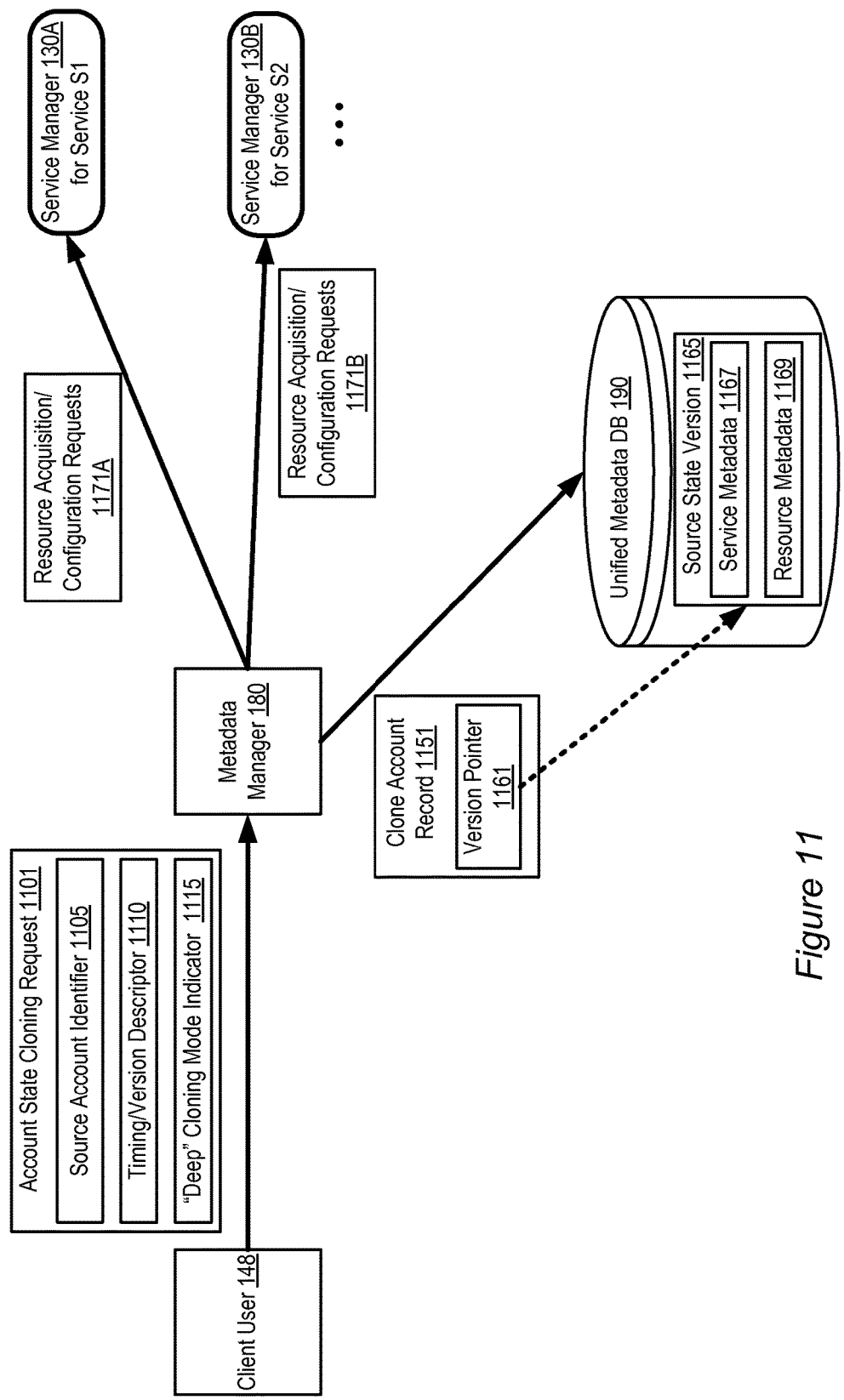
FIG. 11 illustrates metadata manager interactions involved in creating a "deep" clone of a client account, according to at least some embodiments.

In some embodiments, as noted earlier, a metadata manager 180 may provide support for one or more types of account cloning operations. FIG. 11 illustrates metadata manager interactions involved in creating a "deep" clone of a client account, according to at least some embodiments. As shown, a client user 148 (such as an administrator) may submit an account state cloning request 1101 to the metadata manager, including an identifier 1105 of the "source" or original account to be cloned, a timing or version descriptor 1110 indicating the source state version or time (i.e., if the state of account A1 as of 8:00 AM on May 26 2012 is to be replicated in the clone, the version descriptor 1110 could indicate that time), and a cloning mode indicator 1115 specifying that a deep clone is to be created. In implementations in which the default cloning mode is deep cloning, the cloning mode indicator 1115 may be omitted.

In response to the cloning request 1101, the metadata manager may create a clone account (which may for example require interactions with a service manager 130 responsible for client account management, not shown in FIG. 11). The metadata manager may identify or create a source state version 1165 in some embodiments. If the cloning request 1101 is for a version that was saved previously in the unified metadata database 190, the metadata manager may simply retrieve that version; otherwise, a new version 1165 may be created comprising a representation of the administrative state of the source client account 1105 with respect to each service of a set of services accessible to that account, as described earlier. The version 1165 may comprise service metadata 1167, as well as resource metadata 1169 in the depicted embodiment, including configuration settings of an original set of resources configured to provide at least a portion of the functionality of the set of services to the source client account at a time indicated by the version descriptor 1110. The metadata manager may then create a clone account record 1151 that includes a pointer or reference 1161 to the source state version 1165; the clone account record may also be stored in the unified metadata database 190 in some embodiments. In one embodiment, ownership privileges to the clone account record 1151 may be granted to the requesting client user 148.

Figure 15:
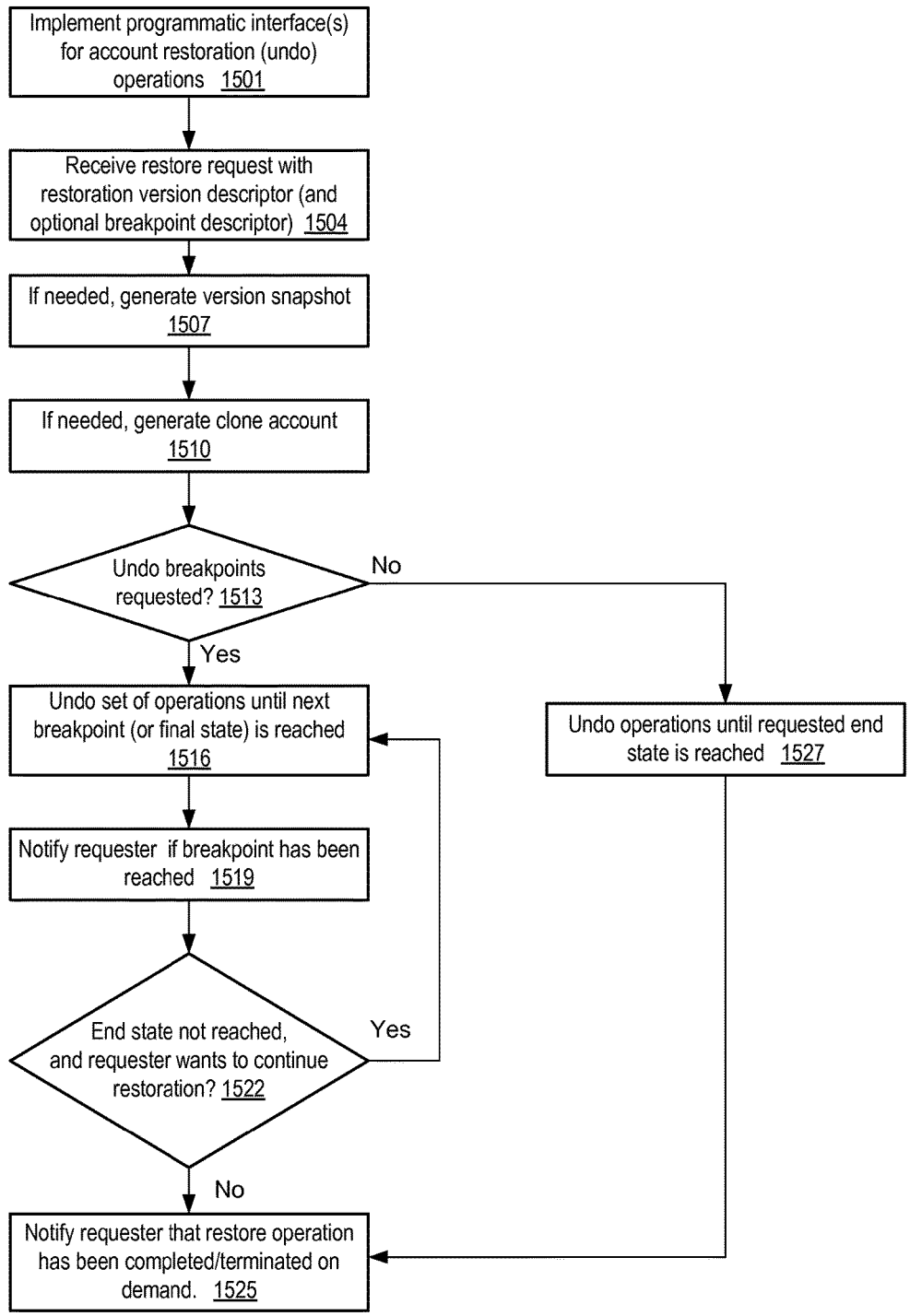
FIG. 15 is a flow diagram illustrating aspects of the operation of a metadata manager configured to support account state restoration, according to at least some embodiments.
Figure 16:
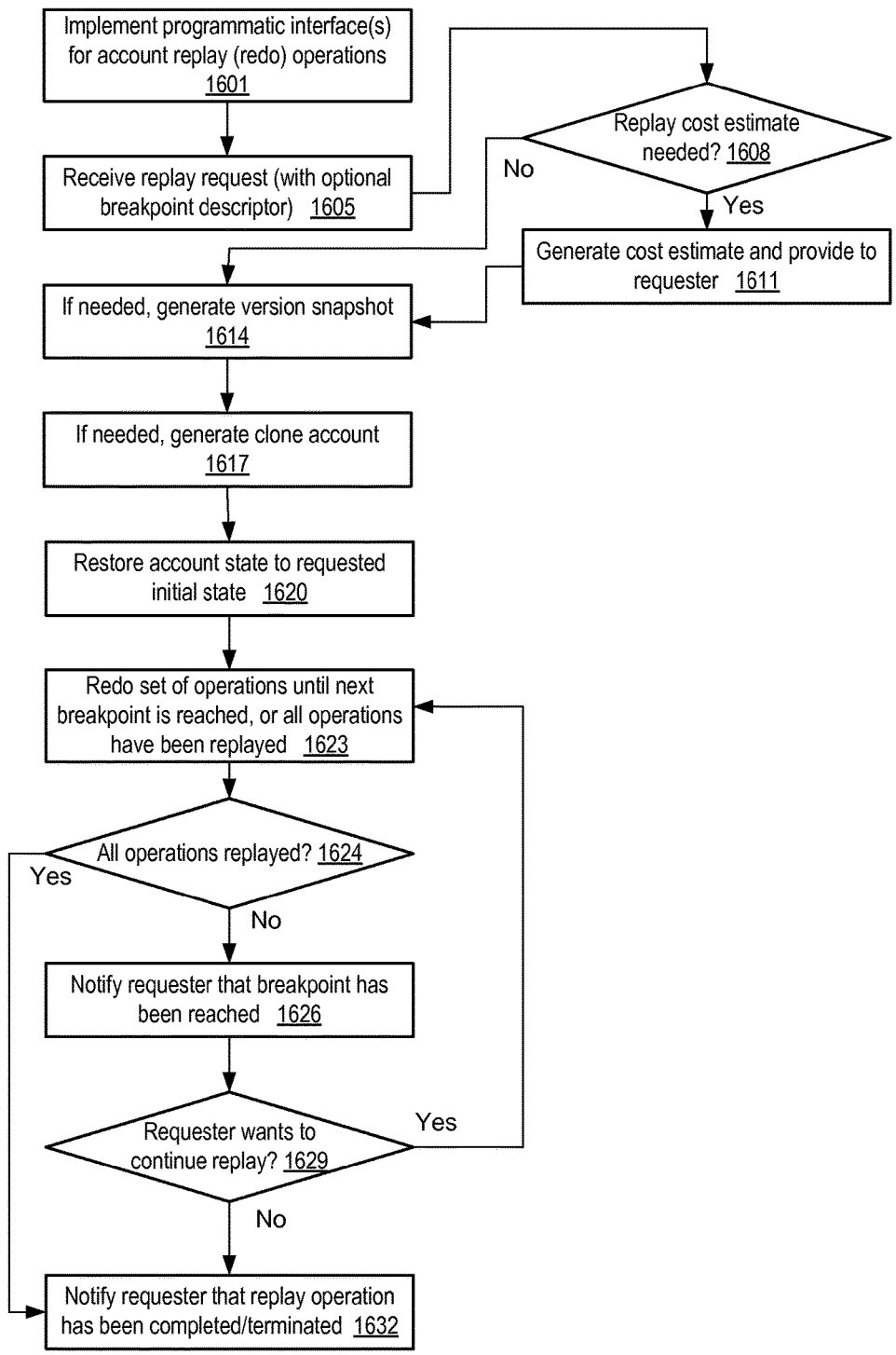
FIG. 16 is a flow diagram illustrating aspects of the operation of a metadata manager configured to support account state change replay operations, according to at least some embodiments.

In the depicted embodiment, the metadata manager 180 may also be responsible for initiating the acquisition of resources on behalf of the clone account, e.g., to replicate the resource environment of the source account as of the specified source state time. Thus, the metadata manager 180 may transmit respective resource acquisition and/or configuration requests 1171A and 1171B to service managers 130A and 130B of services S1 and S2 that were accessible to the source client account at the source state time. For example, if the source client account had two large compute instances CI1 and CI2 hosting implementation modules for services S1 and S2 respectively, the metadata manager 180 may initiate acquisition of two new large compute instances CCI1 and CCI2 for the deep clone account DCA1 and configure implementation modules for services S1 and S2 on the new instances to replicate the original configuration settings on CI1 and CI2. Having acquired and configured the resources for the clone account, the metadata manager 180 may inform the requesting user 148 that a clone was successfully created, and allow the user 148 to use the clone account as needed—e.g., to run tests on the clone resources, to debug problems, and so on. In one implementation, the data state of the resources may also have to be replicated for the deep clone account, in addition to the configuration state. For example, if an application App1 had a data set DS1 in the source state comprising a 1 GB file, a copy of that file may have to be created on behalf of the deep clone account to replicate the state of the application in the clone environment. Whether only configuration state is to be replicated, or whether both configuration and data state is to be replicated, may be indicated in the cloning requests in some embodiments. In embodiments where the types of replay and restoration operations illustrated in FIGS. 15 and 16 are supported, clone accounts may be used to restore accounts to a desired state, or to redo some operations in a controlled environment, as described below in further detail. In some embodiments, deep cloning may include creating a clone set of authorization entities as well—e.g., if the source client account had two affiliated users U1 and U2, the clone account may be set up with cloned user accounts CU1 and CU2. In at least some embodiments, instead of the metadata manager 180 initiating acquisition of the resources, the metadata manager may simply notify the various service managers 130 associated with the source account that a clone account is being created. The service managers 130 in some such embodiments may allocate resources for the clone account, and provide pointers to (or identifiers of) the acquired resources to the metadata manager 180 so that the metadata manager has account state information for both the source account and the clone account.

Figure 12:
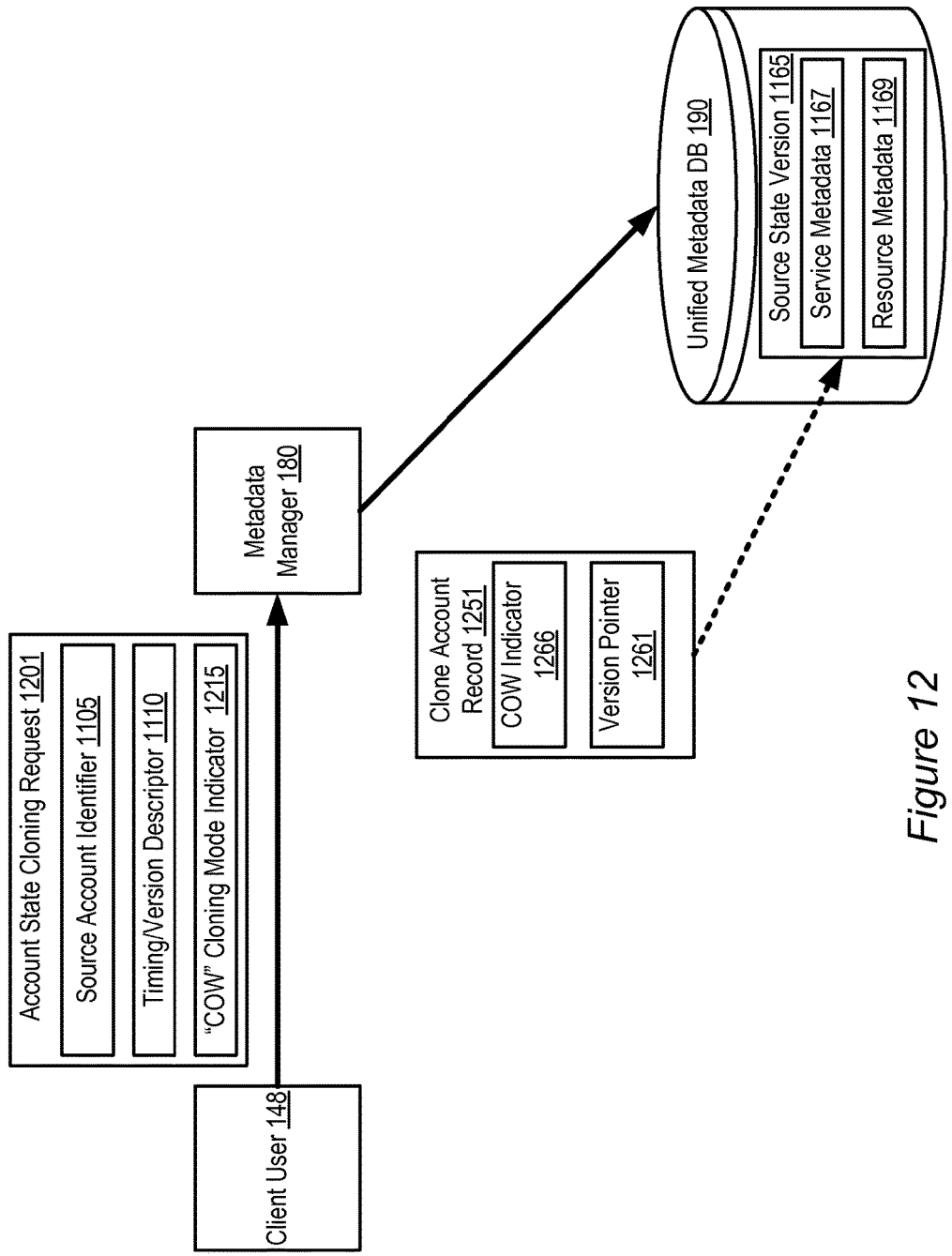
FIG. 12 illustrates metadata manager interactions involved in creating a "copy-on-write" or "COW" clone of a client account, according to at least some embodiments.
Figure 13:
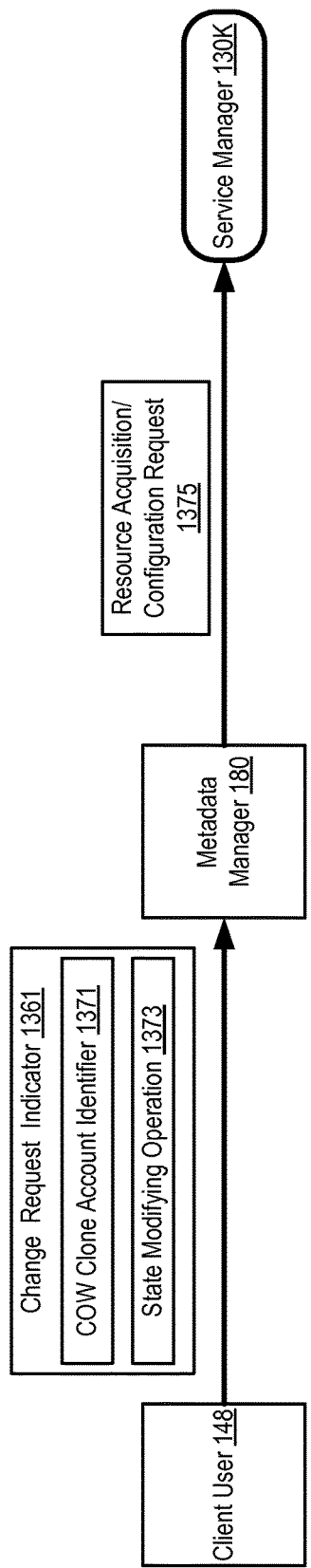
FIG. 13 illustrates deferred initiation of resource acquisition for a "copy-on-write" clone account, according to at least some embodiments.

When a deep clone of a client account is created, as described above, in some embodiments, new resources corresponding to all the resources that were allocated to the source client account may be acquired for the cloned client account at the time that the clone account is created. Especially for client accounts that typically have a lot of resources allocated, this may be an expensive proposition. Accordingly, in some embodiments, the metadata manager 180 may allow accounts to be cloned in "copy-on-write" mode, where resource acquisition for the clone account is deferred until a request to change state (of either the source account or the copy-on-write clone account) is received. FIG. 12 illustrates metadata manager interactions involved in creating a "copy-on-write" or "COW" clone of a client account, according to at least some embodiments. FIG. 13 illustrates deferred initiation of resource acquisition for a COW clone account according to such embodiments. In the embodiment depicted in FIG. 12, a client user 148 submits a client account cloning request 1201 to the metadata manager 180, which differs from the cloning request 1101 of FIG. 11 in that the requested cloning mode is "COW" rather than "deep" cloning, as shown in indicator 1215. In response to the COW cloning request 1201, the metadata manager may create a clone account (e.g., via a request to an account service manager 130). The metadata manager may then retrieve or create a source version object 1165 including service and resource state information, similar to the version 1165 illustrated in FIG. 11. The metadata manager may create a clone account record 1251 that includes a COW indicator 1266 as well as a pointer 1261 to the source state version, and send a response to the requesting user indicating that the COW clone account has been created and is available for use. The source state version may comprise pointers to, or identifiers of, various resources that were allocated to the source client account as of the time of cloning. Resource acquisition on behalf of the COW clone account may be deferred until an operation request is received that modifies the state of some resource referenced in the source state version 1165, where the change could be requested either on behalf of the source account or the COW clone account. In some embodiments the resources associated with the source account may be marked as "copy-on-write" resources, e.g., as a result of the metadata manager informing the service managers responsible for the resources that a COW clone account has been created.

As shown in FIG. 13, when a change request indicator 1361 is received for a state modifying operation 1373 on a COW clone account indicated by a COW clone account identifier 1371, the metadata manager 180 may initiate resource acquisition and/or configuration for the COW clone account by sending a request to the appropriate service manager 130 in some embodiments. For example, if the source client account had two large compute instances CI1 and CI2 hosting implementation modules for services S1 and S2 respectively, the metadata manager 180 may not initiate acquisition of any instances at the time a COW clone account is created for that source client account. The requesting user may be provided access to the source state version 1165, and may perform read operations on that version, including for example examining the configuration settings of instances CI1 and CI2 with respect to services S1 and S2. When and if a user (belonging either to the source client account, or to the COW clone account) wishes to change a configuration setting on CI1, or write some data to a file stored at CI1, the metadata manager 180 may receive an indication 1361 of the desired change, initiate acquisition of a new large compute instances CCI1 and configure the newly-acquired instance to replicate the source state configuration settings. Depending on whether the change was requested on behalf of the source account or the COW clone account, the requested change may be made to either the original resource of the source account, or to the newly-acquired resource of the COW clone account. Similarly, acquisition of a clone compute instance corresponding to CI2 may be deferred until a change request for CI2 is received. The indication 1361 may be received from the requesting client user 148 directly in some embodiments, and from a service manager 130 in other embodiments. For example, in one embodiment, when the user wishes to change a configuration setting of a compute instance, it may send a change request to the service manager 130 responsible for compute instances; the service manager 130 may determine that the request is for a modification of a COW clone account's state, and send an indication 1361 to the metadata manager 180. Alternatively, in some embodiments, the service manager 130 may itself acquire additional resources when it determines that a client user 148 is trying to change the state of a COW account.

In at least some embodiments, a hybrid account cloning approach may also be supported by the metadata manager 180. In such a hybrid approach, a first set of resources for the cloned account may be acquired immediately upon (or shortly after) the clone account is created, while acquisition of a second set of resources may be deferred until a mutation request for those resources is received (where the mutation could be requested either for the clone account or for the source account). The first set of resources may be said to be "deep-cloned" in such an embodiment (i.e., the ones acquired upon clone account creation), while the second set may be referred to as "COW-cloned" resources. The client may specify which resources are to be deep-cloned and which are to be COW-cloned in some embodiments. In other embodiments, the metadata manager may decide which resources are to be deep-cloned and which are to be COW-cloned. In at least one embodiment the metadata manager 180 may make this decision based at least in part on a cloning budget limit indicated by the client; e.g., in the account cloning request, the client may indicate a budget that can be used for acquiring resources, and the metadata manager may use that budget to decide which of the client's resources should be deep-cloned and which should be COW-cloned. The client may provide hints or preferences suggesting which resources should preferably be deep-cloned and which should be COW-cloned in some implementations, and the metadata manager may take such hints into consideration when classifying the client's resources under the specified budget constraints.

Methods for Cloning, State Restoration (Undo) and Replay (Redo) Operations

Figure 14:
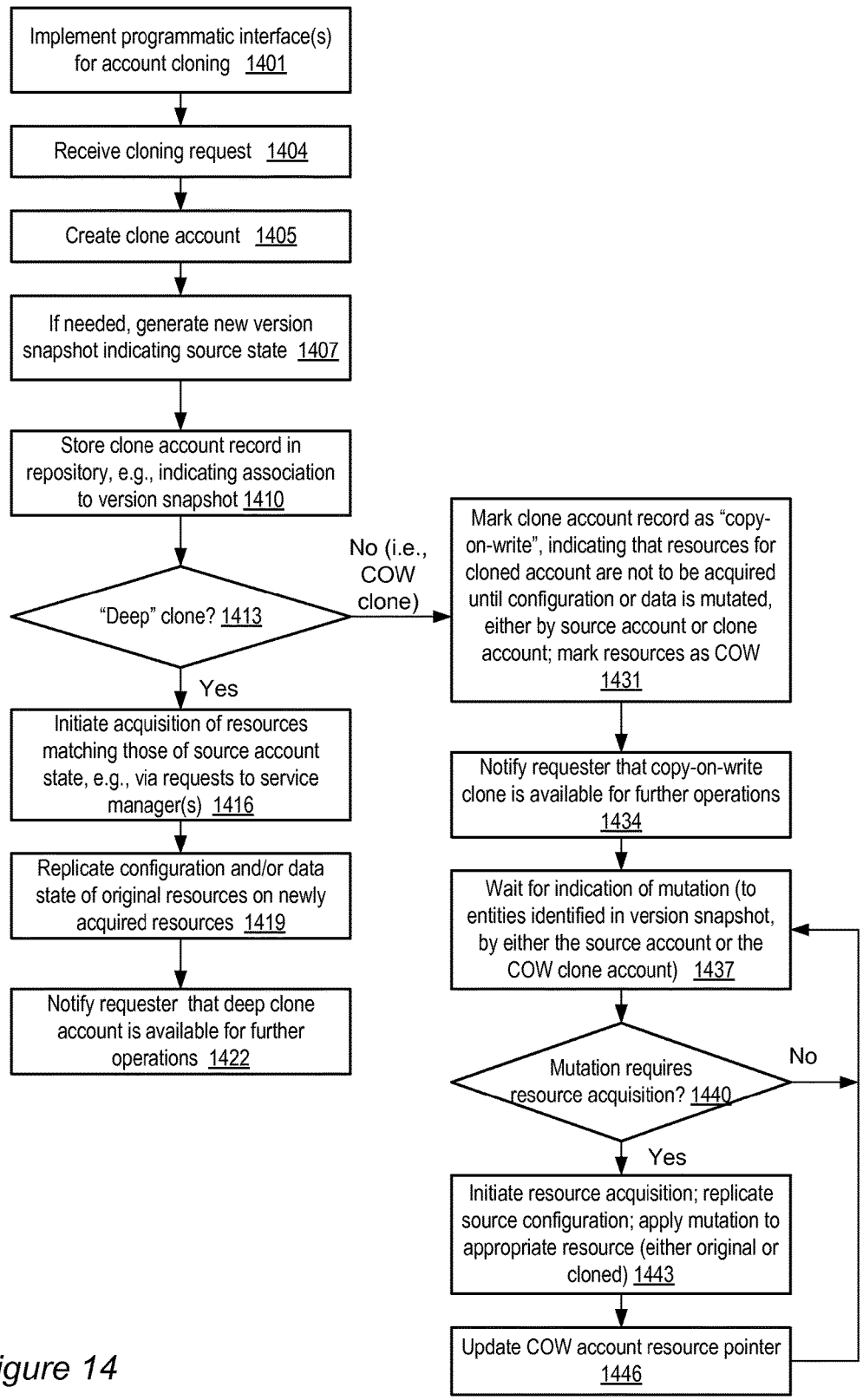
FIG. 14 is a flow diagram illustrating aspects of the operation of a metadata manager configured to support account state cloning, according to at least some embodiments.

FIG. 14 is a flow diagram illustrating aspects of the operation of a metadata manager 180 configured to support account state cloning, according to at least some embodiments. As shown in element 1401, one or more programmatic interfaces such as APIs or web pages may be implemented to support account cloning operations. The metadata manager 180 may receive an account cloning request (element 1404) indicating a source account identifier and a timing or version descriptor. As in the case of account state view requests discussed earlier, in some embodiments either a source account identifier or a timing/version descriptor (or both) may be omitted. In some such embodiments, the metadata manager may deduce the source account to be cloned based on the source of the request (e.g., using the identity of the sender, or the IP address of the sender.) If no cloning time is specified, the metadata manager may in such an embodiment clone the account as of the time the request is received, or as of a time as near to the request time as feasible. The metadata manager 180 may create a new clone client account (as shown in element 1405). In the depicted embodiment, a new version snapshot indicating the source account state to be cloned may be generated and stored in a persistent repository (element 1407). A record of a new clone account may be generated and stored (element 1410), including an indicator of the cloning mode being requested (e.g., "deep" versus "COW" cloning mode), and a record or pointer of the association between the clone account and the source account.

If a "deep" clone was requested, as determined in element 1413, the metadata manager may initiate acquisition of resources for the clone account (element 1416), e.g. by sending resource allocation requests on behalf of the clone account to the appropriate service managers 130 to match the resources that were allocated to the source account in the source account state. The configuration state of the source resources may then be replicated (element 1419). In some embodiments, depending on the clone requester's preferences, the data state of one or more resources of the source account version may also be replicated on the newly acquired resources; e.g., contents of an application data object such as a file, file system, key-value store, database table or the like may be copied from a resource of the source client account may be copied to a corresponding resource of the clone account. After the resource allocations and some or all of the other settings of the source account state have been replicated for the clone account, the requester may be notified that the deep clone account has been created and is available for further operations (1422). For example, credentials for an administrative user of the clone account may be provided to the requesting user in some embodiments.

If, instead of a deep clone, a COW clone was requested (as also determined in element 1413), the clone account record may be marked as COW, indicating that resource acquisition is to be deferred until a mutation (to either the configuration or to application data, on behalf of either the source account or the clone account) is requested (element 1431). In at least some embodiments, the resources of the source account may be marked as being "copy-on-write" resources. The requester may be notified that a COW clone account has been created and is ready for further operations (element 1434). In the depicted embodiment, the metadata manager 180 may then wait until a mutation request for an entity (such as a resource or a user) associated with either the COW clone account or the source account is received (element 1437). If the mutation is to a resource that has already been acquired on behalf of the COW clone account, no new resource acquisition may be needed. If a new resource does have to be acquired for the requested change (as determined in element 1440), the metadata manager 180 may initiate the acquisition of the resource, replicate the source configuration for that resource and then apply the requested changes to the appropriate resource—e.g., to the original resource if the mutation is requested on behalf of the source account, and to the newly acquired resource if the mutation is requested on behalf of the COW clone account (element 1443). In some implementations, when a new resource is allocated to the COW clone client account, the source version snapshot may also be updated—e.g., a pointer to the new resource may be included in the snapshot (element 1446). If more and more resources are modified, the size of the set of new resources allocated to the COW clone account may increase over time, potentially approaching the size of the set of resources of the source account version; however, in many cases, only a small subset of the account's resources may need modification, resulting in substantial cost savings for the COW clone relative to a deep cloning approach. At least in some embodiments, at least a portion of the cloning-related functionality may be implemented by various service managers: for example, the metadata manager 180 may collaborate with the service managers 130 to mark various resources as COW resources, to determine whether a mutation request requires a resource acquisition, and so on.

Using the versioning and cloning capabilities of metadata manager 180, a number of different types of state change operations may be supported in various embodiments. For example, in one embodiment a client may create a clone of a source account in a particular state and then modify the clone account in an attempt to undo state changes (that initially occurred in the source account) until a target restoration state is reached. FIG. 15 is a flow diagram illustrating aspects of the operation of a metadata manager 180 configured to support account state restoration, according to at least some embodiments. As shown in element 1501, one or more programmatic interfaces to support restoration and undo operations may be implemented. The metadata manager 180 may receive a state restoration request specifying a client account to be restored, and a restoration version descriptor indicating a target restoration state or time (element 1504). In some embodiments a breakpoint descriptor may also be specified, indicating for example that the requester wishes the undo operations to be paused at various stages until the requester indicates that further undo operations should continue—e.g., after each configuration change is made, or after a specified set of configuration changes are made.

In one embodiment the restoration request may specify an initial version snapshot to which undo operations are to be applied until the desired restoration time is reached, and/or a clone account that has already been created for the restoration operation may be specified. In other embodiments either an initial state version snapshot, or a clone account, or both, may not yet have been created. The metadata manager 180 may create a version snapshot (element 1507) and/or create a clone account (with a corresponding source version snapshot as described earlier) on which the restoration is to be performed (element 1510). The restoration request may in some embodiments indicate whether the requester wishes to utilize a deep clone account or a COW clone account. In some embodiments the metadata manager 180 may support undo operations and state restorations that are applied to the source client account directly, i.e., account cloning may not be required. Having identified an account (either a clone account or an un-cloned source account), an initial version of the account on which configuration changes are to be undone, and a target restoration time or state, the metadata manager 180 may consult its collected operation records to identify the set of state change operations that are to be undone in order to reach the target restoration state. The metadata manager 180 may then initiate configuration changes for the restoration, e.g., including changes to various configuration settings to eventually match the settings of the restoration version.

If the requester has specified one or more undo breakpoints (as detected in element 1513), the metadata manager 180 may undo the next set of operations, e.g., in reverse chronological order to the order in which they were originally performed, until either the next breakpoint is reached, or the target restoration state is reached (element 1516). If and when a breakpoint is reached, the restoration requester may be notified (element 1519). In one simple implementation, for example, implicit breakpoints may be implemented for each configuration change that the metadata manager performs during the restoration, i.e., feedback may be requested from the client after each undo operation. The requester (e.g., an administrator of the source client account) may be granted access to the account state at each breakpoint, so that for example various configuration settings can be examined or debugged. If, when asked for feedback, the requester indicates that the restoration is to continue (as determined in element 1522), the metadata manager 180 may continue with further undo operations until the next breakpoint is reached or the restoration is completed. If no breakpoints are implemented or requested, the metadata manager 180 may simply perform the undo operations until the desired final restoration state or time is reached (element 1527). In either case (whether breakpoints are used or not), the client may be notified when the restoration reaches the specified end state or end time, or if the client wishes to abandon the restoration operation at some breakpoint (element 1525).

FIG. 16 is a flow diagram illustrating aspects of the operation of a metadata manager configured to support account state change replay operations, according to at least some embodiments. In such an embodiment, an initial state (e.g., a previously-created version or a time for which a version should be created) of a client account may be specified, and a set of completed operations to be replayed in the order in which they originally occurred may be specified. Starting from the initial state (either on a clone account or on an un-cloned account), the metadata manager 180 may replay the operations in order. As shown in element 1601 of FIG. 16, one or more programmatic interfaces to support redo or replay operations may be implemented. An account state change replay request may be received (element 1604), comprising an indication of the client account, an initial state to which the replay operations are to be applied, and the operations to be replayed. A breakpoint descriptor may also be included in the request in some implementations, indicating the stages during the replay operation at which replay is to be paused and feedback from the requester is to be obtained as to whether the replay operation should be continued. In some embodiments, a clone client account and/or a pre-existing version snapshot representing the initial state may be specified in the request. In at least some embodiments, the metadata manager 180 may allow client users 148 to request a cost estimate for replaying the specified set of operations. If a cost estimate is requested (as detected in element 1608), the metadata manager may generate such an estimate and provide it to the requester (element 1611). The cost estimate may, for example, include the costs associated with resource acquisition operations that are to be replayed. In some embodiments, the metadata manager may implement account state change simulation capabilities (described below in further detail and illustrated in FIGS. 17 and 19), which may be used to help determine the cost estimate.

If required, the metadata manager may generate a version snapshot (element 1614) and/or a clone account (element 1617) for the replay operation. As in the case of the restoration operations illustrated in FIG. 16, in some implementations the metadata manager 180 may support replay operations on the original client account, i.e., a clone account may not be required in some replay scenarios. The account state (e.g., of the clone account or of the un-cloned client account) may be restored to the requested initial state (element 1620), using the undo capabilities described above. The metadata manager 180 may then proceed to replay or redo the requested set of operations until the next breakpoint is reached (element 1623) or until all the operations have been replayed. In some implementations implicit breakpoints may be implemented after each redo operation. If all operations have been replayed (as determined in element 1624), the requester may be notified (element 1632). If a breakpoint is reached, the replay may be paused and feedback requested from the requester (element 1626). If the requester wants to continue the replay (as detected in element 1629), the metadata manager 180 may proceed with the next set of operations to redo. If the requester wishes to terminate the replay operation (as also detected in element 1629), the replay may be terminated and the requester may be notified of the termination (element 1632).

Account State Simulation Support

Figure 17:
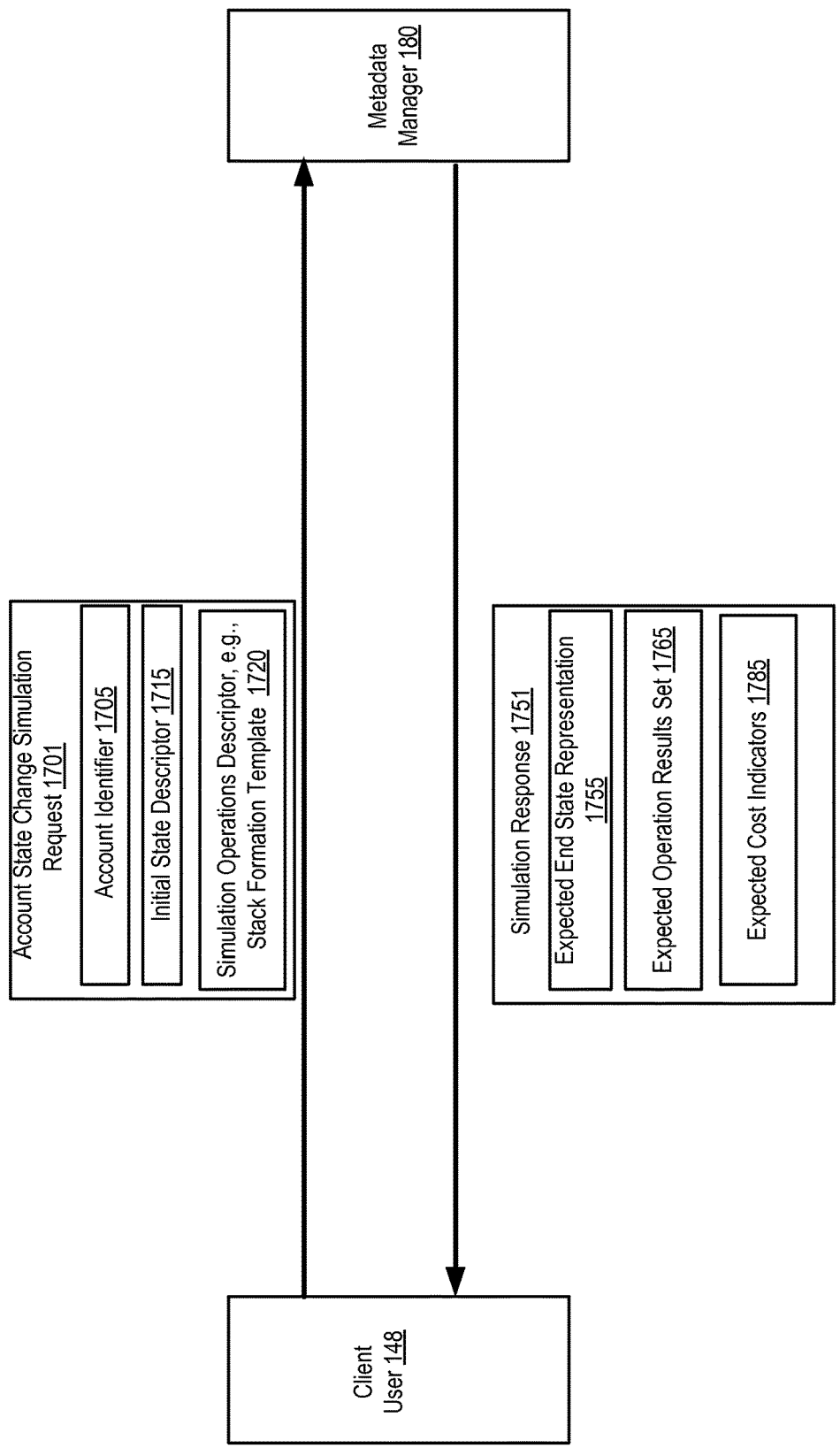
FIG. 17 illustrates an example simulation-related interaction between a client and a metadata manager, according to at least one embodiment.

In some embodiments, the metadata manager may be operable to perform simulations of account state changes, i.e., to make predictions about the expected results of specified operations without applying the operations to an actual client account. Such simulations may be helpful to clients in estimating the likelihood of success of potentially complex sets of operations, without incurring the cost of actually attempting the operations and/or having to debug error situations that may result from the operations. The simulation functionality may be implemented with the help of a rules engine subcomponent of the metadata manager 180 in some embodiments. The rules engine may be configured to consume account state representations as input, and to apply a set of rules to determine whether, for a particular account state, an operation is likely to succeed. If the operation is determined as likely to succeed, the rules engine may determine and save a representation of the resultant account state. In some embodiments the simulated account state information may be stored in a similar format as the account version snapshots described earlier, while in other embodiments a different format (e.g., a format that includes fewer details) may be used for simulation. FIG. 17 illustrates an example simulation-related interaction between a client user 148 and a metadata manager 180, according to at least one embodiment. As shown, a client user 148 may submit an account state change simulation request 1701 to a metadata manager 180. The simulation request may specify an account identifier 1705, an initial state descriptor 1715, and a simulation operations descriptor operations 1720 indicating the set of operations to be simulated starting from the initial state. The initial state descriptor 1715 may for example comprise values of various service attributes and/or resource attributes of the services and resources in use by the source client account as of a particular time or a particular snapshot version. In at least some embodiments, either the account identifier or the initial state descriptor (or both) may be omitted from the simulation request. The metadata manager may in such embodiments determine the account identifier based on the source of the request (e.g., based on the requester's identity or IP address). If the initial state descriptor is not included in the request, the metadata manager may determine that the simulation is to be applied to the current state of the client account (i.e., the initial state for the simulation may be the most recent state that the metadata manager 180 is able to determine).

In response to the simulation request, the metadata manager 180 may in some embodiments create a simulation copy of an account state version snapshot, and then simulate the effects of the operations on that copy. In one such embodiment, as each operation is simulated, an indication of the result (e.g., whether the operation succeeded or failed, and, where applicable, return values of the operation) may be stored for eventual transmission to the requester. In some embodiments, a number of different outcomes may be possible for a given operation being simulated, such as (a) the operation may succeed; (b) the operation may fail, but in such a way that the simulation as a whole may continue; i.e., at least some of the yet-to-be simulated operations are not dependent on the success of the given operation; or (c) the operation may fail in such a way that the simulation has to be terminated. Outcome (b) may be termed a "non-fatal error" scenario herein, and outcome (c) may be termed a "fatal error" scenario. If the metadata manager 180 encounters no fatal errors during the simulation of the entire set of operations indicated in the operations descriptor, the metadata manager 180 may in some embodiments generate a representation 1755 of the end state of the simulation (e.g., a graphical or text view of the expected client account state at the end of the simulation), and may provide that representation to the requester in simulation response 1751. As a result of some of the simulated operations, for example an acquisition of additional compute resources to implement a particular service, the end state representation may include indications of different resources being used for a given service than in the initial state, and/or indications of different expected utilization or performance levels at various resources than in the initial state. In some embodiments, the results set 1765 of the individual operations may also be provided to the requester.

In at least one embodiment, the metadata manager 180 may, in addition to simulating the success or failure of the operations, also estimate the costs of the operations—e.g., if one of the operations being simulated is the acquisition of a compute instance from a particular instance marketplace, the metadata manager may add an estimated cost of acquiring an instance from the marketplace to the total estimated cost of the simulated operations. The simulation response 1751 may include expected cost indicators 1785 in such an embodiment, including for example a total cost of all the operations, or an enumeration of the respective billing amounts for the various simulated operations. In one embodiment, a simulation request may be submitted simply as a logical equivalent of the question: "Starting with the current state of my account, can you provide an estimate of how much it might cost me to perform the operations O1,O2, . . . ?". In such an embodiment, the simulation request may not include an initial state indicator (i.e., the metadata manager 180 may start with the current state as the implicit initial state) or an account identifier (the metadata manager may deduce the account based on the source of the request), and the response to the simulation request may comprise the estimated cost (e.g., no description or indication of an end state, or of results of various operations, may be required.)

If a fatal error is encountered during the simulation, in the depicted embodiment the metadata manager may notify the requester that the simulated set of operations specified in the operations descriptor is expected to fail. In some embodiments, e.g., based on the requester's preferences for error handling, even a non-fatal error may result in premature termination of the simulation as a whole. In one implementation, even if the simulation is terminated before all the operations are simulated, the results of those operations that succeeded may be provided to the requester in simulation response 1751.

The operations descriptor 1720 may be formatted according to any of several protocols in different embodiments. In one embodiment, at least some of the service managers 130 of the provider network 110 may have respective supported operations specifications, such as respective API sets listing API calls that the service managers are configured to accept. In such an embodiment, the operations descriptor may include the API calls for operations of the supported operations specifications of one or more service managers 130. For example, if the service manager responsible for allocating virtual compute instances supports APIs "StartInstances" and "TerminateInstances", the operations descriptor 1720 may include invocations of StartInstances and TerminateInstances with appropriate parameter sets. In one embodiment, as discussed in conjunction with the description of FIG. 2, a stack specification and implementation service 220C may be implemented within the provider network. Such a service may allow clients to specify a collection of related resources of the provider network and provision them in an orderly and predictable manner. In some embodiments the stack specification service may support a template language for specifying platform and application configuration, allowing clients to describe a topology and interconnections of a desired set of resources and the operations to be performed to configure the resources for various services. In one implementation, in which stack templates are specified in JavaScript Object Notation (JSON), a template may be organized in a high-level structure similar to the following:

```
{
    "Description": "A text description for the template",
    "Parameters": {
        //A set of inputs used to customize the template per
            deployment
    },
    "Resources": {
        //The set of provider network resources and relationships
            between them
    },
    "Outputs": {
        //A set of values to be made visible to the stack creator
    },
    "TemplateFormatVersion": "<VersionId>"
}
```

In such an implementation, a template similar to the following may be used to create a simple virtual compute instance with a specified machine image, to be accessible via the secure shell protocol (ssh):

```
{
    "Description" : "Create a compute instance running the operating system
        OS1 32-bit machine image."
    "Parameters" : {
        "KeyPair" : {
            "Description" : "The Key Pair to allow secure shell (ssh) access to
                the instance",
            "Type" : "String"
        }
    },
    "Resources" : {
        "Instance" : {
            "Type" : "ProviderNetworkPM1::ServiceNameSN1::Instance",
            "Properties" : {
                "KeyName" : { "Ref" : "Keypair" },
                "ImageId" : "<machineImageId>"
            }
        }
    },
    "Outputs" : {
        "InstanceId" : {
            "Description" : "The InstanceId of the newly created instance",
            "Value" : { "Ref" : "Instance" }
        }
    },
    "TemplateFormatVersion" : "2010-09-09"
}
```

The template language may be used to specify arbitrarily complex configurations in some embodiments. For example, if a client wishes to set up a multi-tier configuration with an Internet-facing load balancer, a collection of web servers, an internal load balancer between the web servers and an application server cluster, and a back-end database server tier, a template may be set up to acquire all the needed compute, storage, and network resources, and to apply the desired configuration settings at each resource in each tier. The template may then be provided to the service manager of service 220C for implementation. In such an embodiment, the operations descriptor may comprise one of the stack specification templates supported by service 220C or a similar service.

Figure 18:
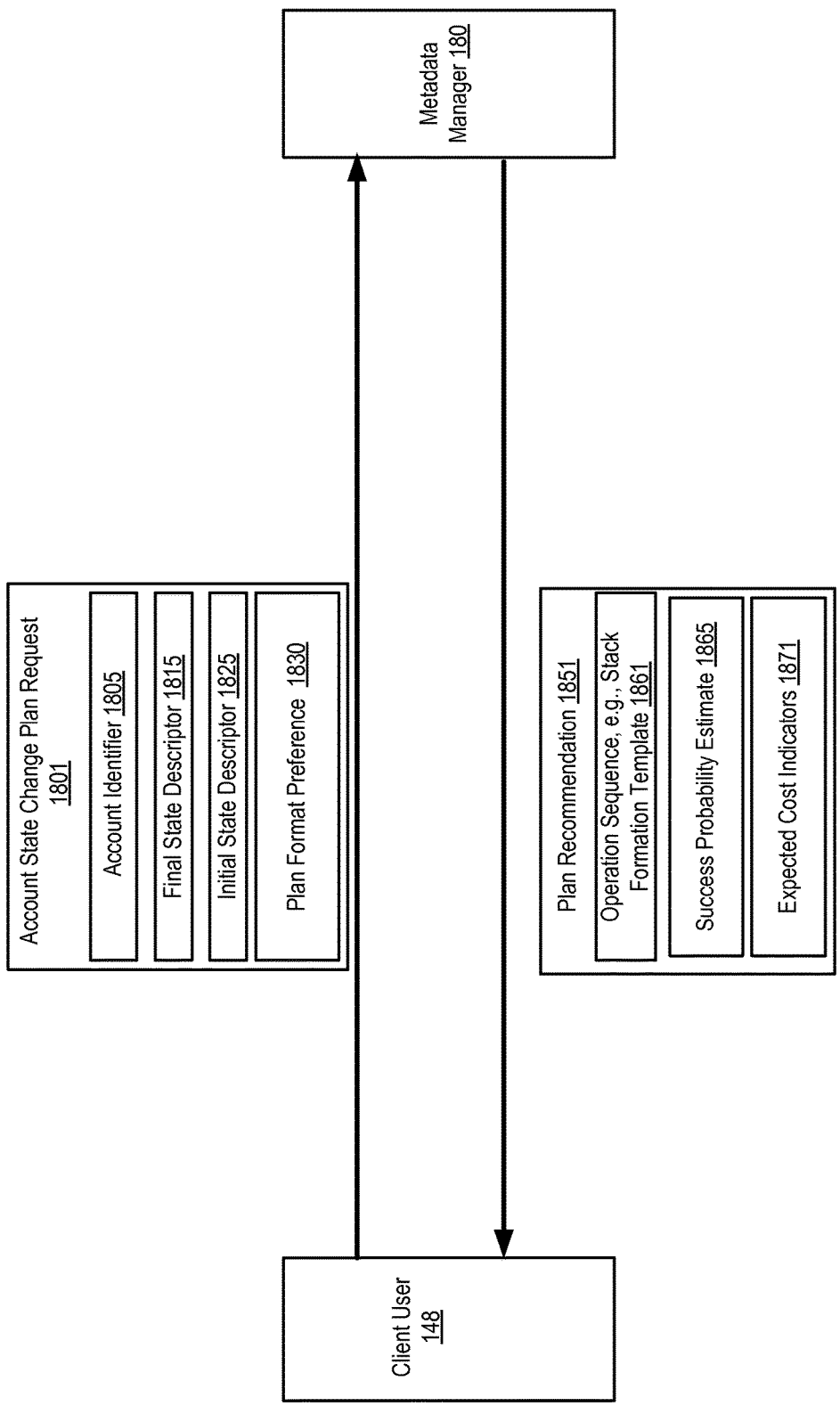
FIG. 18 illustrates a submission of a plan generation request by a client to a metadata manager configured to simulate configuration operations to determine a feasible set of operations to accomplish a goal indicated in the request, according to at least some embodiments.

In addition to simulating specified operations, in some embodiments the metadata manager may be operable to use its simulation functionality to generate a recommended set of operations to attain a desired end state of an account. FIG. 18 illustrates a submission of a plan generation request by a user 148 to a metadata manager 180 configured to simulate configuration operations to determine a feasible set of operations to accomplish a goal indicated in the request, according to at least some embodiments. The client 148 may submit an account state change plan request 1802, comprising an account identifier 1805, a final state descriptor 1815 (indicating one or more characteristics of the desired state), an initial state descriptor 1825 (which may for example reference a saved version of account state, or simply indicate a point in time for which the metadata manager 180 may generate a state version snapshot), and a plan format preference 1830 indicating how the plan is to be displayed or formatted.

In response to the plan request, the metadata manager 180 may generate a state difference representation (e.g., using functionality similar to that illustrated in FIG. 9b) between the desired end state and the initial state, and then generate an enumeration of configuration operations that, if applied to the account in the initial state, are expected to lead to the desired final state. The metadata manager 180 may provide a plan recommendation 1851 to the requester, including an operation sequence 1861 intended to achieve the desired state. In some embodiments, the metadata manager 180 may also include an estimate 1865 of the probability of success of the recommended sequence of operations, and/or expected cost indicators 1871 for the operation sequence.

Figure 19:
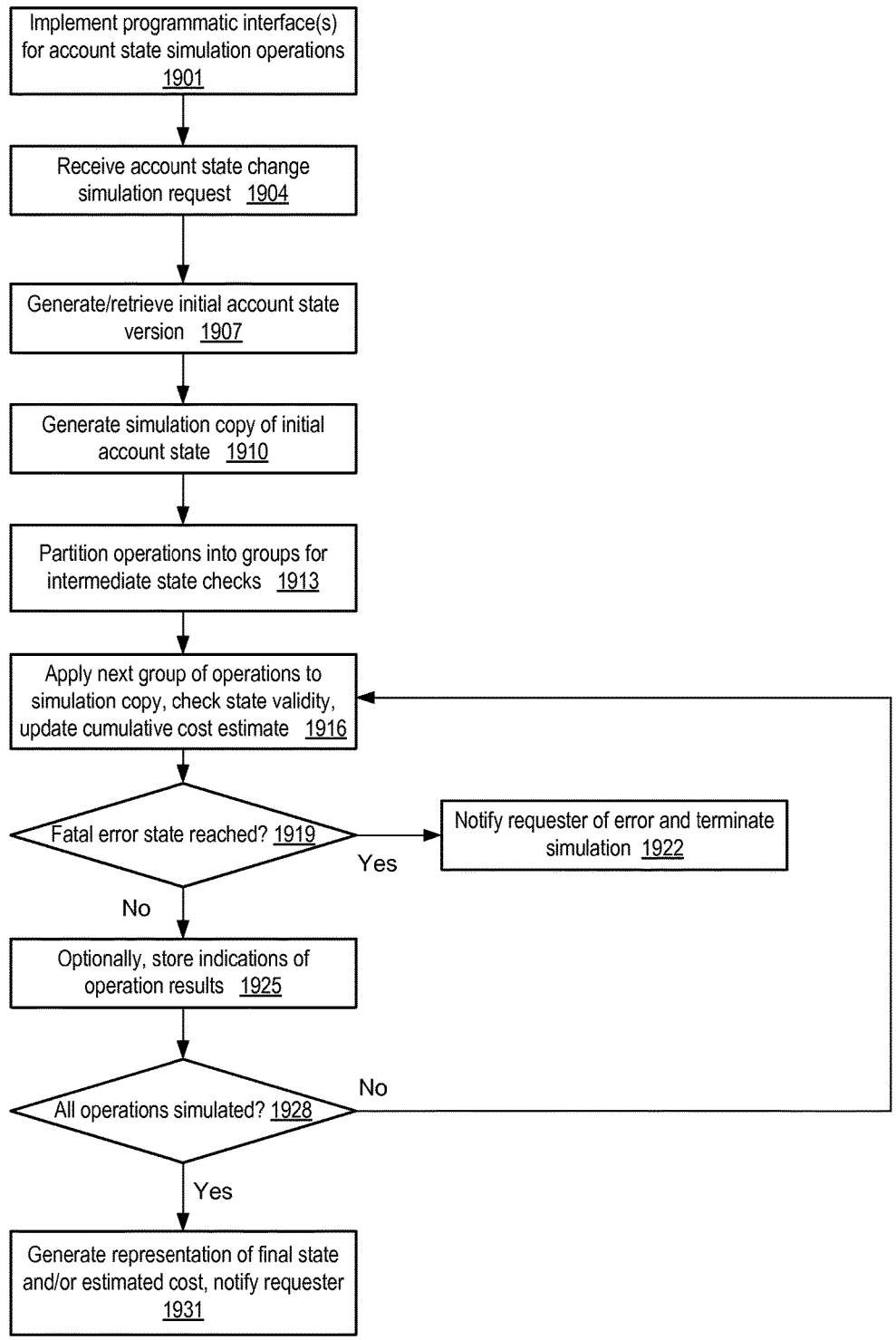
FIG. 19 is a flow diagram illustrating simulation-related operations of a metadata manager, according to at least some embodiments.

FIG. 19 is a flow diagram illustrating simulation-related operations of a metadata manager 180, according to at least some embodiments. As shown in element 1901, one or more programmatic interfaces such as APIs or web pages may be implemented to support account state simulation operations. An account state change simulation request may be received by the metadata manager 180, e.g., specifying a client account, an initial account state and a set of operations (which may include configuration/administration operations, data manipulation operations, or both administrative and data operations) to be simulated (element 1904). The set of operations, and/or the initial state, may be provided in the form of one or more templates of a distributed resource stack representation language in some implementations, such as a template formatted in accordance with the specifications of a stack representation service 220C of FIG. 2. In the depicted embodiment, the metadata manager 180 may retrieve an account state version corresponding to the initial state if such a version can be found in its repository of saved versions, or a new version snapshot may be created (element 1907). The metadata manager may generate a new copy of the account's initial state version in some embodiments (element 1910), e.g., so that the original version can be retained unchanged while the simulation version is modified as a result of the operations.

In some embodiments, depending on the total number of operations to be simulated, the metadata manager 180 may partition the set of operations into smaller groups, so that after each group is simulated, the state of the account can be verified for correctness before proceeding with further operation simulations (element 1913). In some implementations, account state verifications may be performed after every simulated operation. The metadata manager 180 may apply the next group of operations to the simulation copy of account state (element 1916), check the validity of the resultant account state, and update the cumulative cost estimate for the simulation, e.g., based on estimated costs (if any) of the simulated operations. State validity checking may comprise a number of different techniques in various embodiments, including for example checking that none of the simulated operations resulted in an error, or that the projection of the time taken to perform an operation does not exceed a threshold value. If any of the simulated operations results in a fatal error (as determined in element 1919), the requester may be notified that the operation failed (element 1922) and the simulation may be terminated. Indications of the results of some or all of the operations (e.g., whether the operation succeeded or failed, return values of API calls or function calls, or outputs generated as a result of the operation simulation) may be collected and/or stored (element 1925) in some embodiments. If operations remain to be simulated (as detected in element 1928), the metadata manager 180 may proceed to simulate the next group of operations (element 1916 onwards). After all the operations have been simulated (as also detected in element 1928), the metadata manager may in some embodiments generate a representation of the final state and provide it to the requester (element 1931). If a cost estimate of the operation set was requested, the metadata manager may provide its estimate to the requester. The representation of the final state may be provided or displayed in a format selected by the requester, e.g., in a graphical display similar to that shown in FIG. 10 in some embodiments. In some embodiments the simulated operations may include data modifications as well as administrative operations, so that the representation of the final state may include a representation of changed contents of an application data object, such as a file or database table modified by one of the simulated operations.

Figure 20:
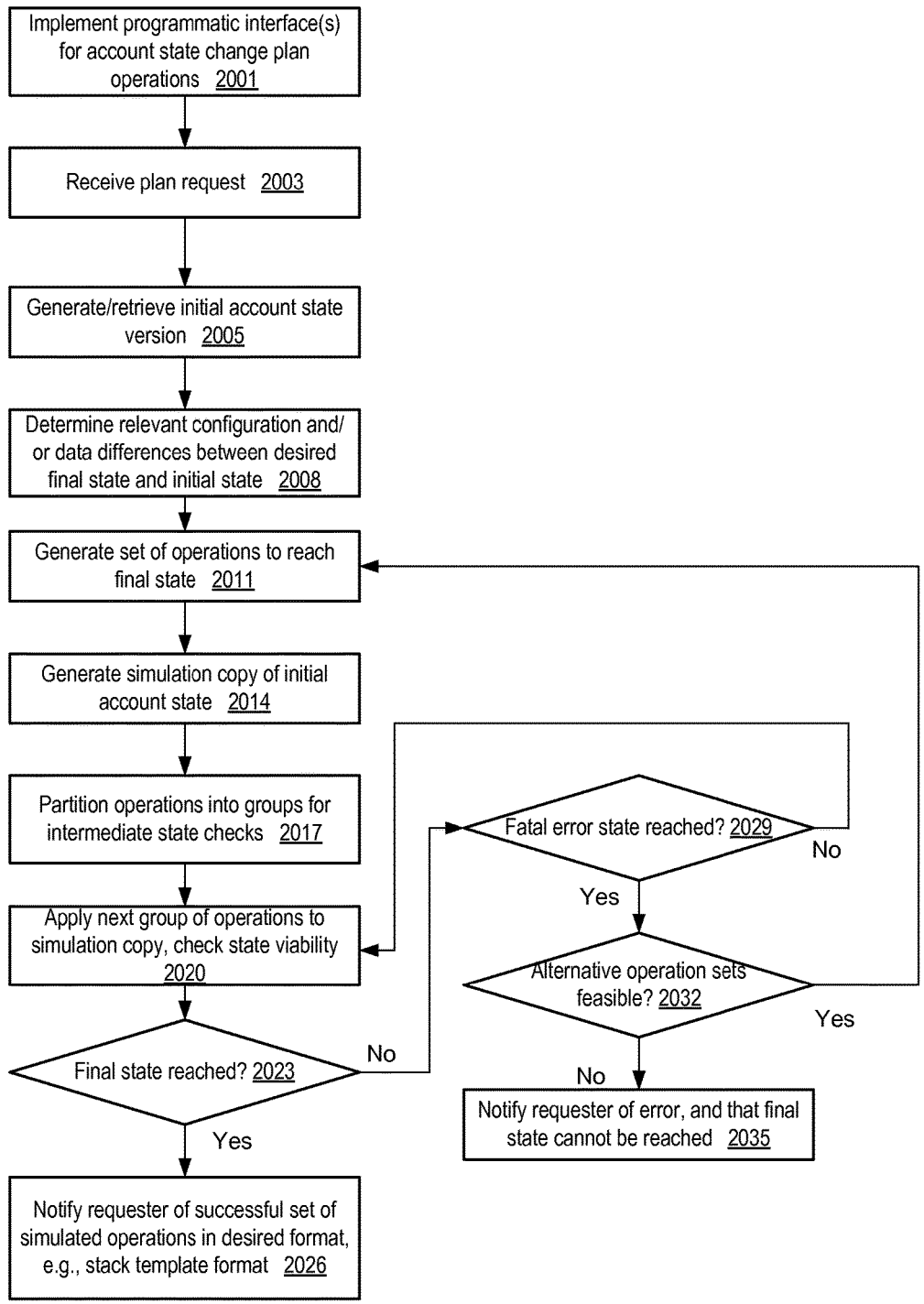
FIG. 20 is a flow diagram illustrating plan generation operations of a metadata manager, according to at least some embodiments.

FIG. 20 is a flow diagram illustrating plan generation operations of a metadata manager, according to at least some embodiments. One or more programmatic interfaces for account state change plan requests and responses may be implemented (element 2001). A plan request may be received by the metadata manager 180, indicating an account identifier, a set of characteristics of a desired final state of the account, and an initial state of the account (element 2003). The metadata manager 180 may either retrieve or generate an account state version snapshot corresponding to the initial state (element 2005). A difference analysis may then be conducted between the desired final state and the initial state, e.g., to identify configuration differences and/or data state differences between the initial and desired final states (element 2008). Based on the difference analysis, a candidate set of operations to be applied to reach the desired final state may be identified (element 2011).

The metadata manager 180 may then generate a simulation copy of the initial state, i.e., a copy on which a simulation may be conducted (element 2014). The set of candidate operations may be partitioned into groups, such that after each group a state validity check may be conducted (element 2017). The next group of operations may be applied to the simulation copy of the account state (element 2020) and the validity of the resultant state may be verified. If, after the group of operations is simulated, the final desired state has not been reached (as detected in element 2023), and no fatal error was encountered (as detected in element 2029), the next group of operations may be simulated (element 2020).

If a fatal error was encountered, in the depicted embodiment the metadata manager 180 may check to see whether there are any alternative candidate operation sets that can be simulated to achieve the same desired end state (element 2032). For example, there may be more than one approach available to achieve a desired level of network connectivity between two resources, achievable via different sets of network configuration operations. If an alternative set of candidate operations is found, that set may be simulated using the steps illustrated in elements 2011 onwards. If no alternatives are found, the requester may be notified of the fatal error, and informed that the metadata manager 180 could not find a plan that would result in the desired final state (element 2035). If no fatal errors are encountered, and one of the candidate sets of operations results in a final state with the desired characteristics (as determined in element 2023), the requester may be provided a plan indicating the sequence of operations to be performed (element 2026). The format of the plan may be indicated by the requester in the plan request in some embodiments, e.g., in one embodiment the plan may be provided in the form of one or more stack specification templates similar to those discussed with reference to service 220C of FIG. 2. In some embodiments, the metadata manager may also provide success probability estimates for the candidate operation set whose simulation was successful, and/or an expected cost associated with implementing the candidate set of operations.

Client-Specified Schema Extensions

As described above, the metadata manager may collect values for a wide variety of attributes of the provider network's services and resources from a number of different data sources in some embodiments. The collected metadata of the provider network may be organized using a baseline schema that enumerates various entity types (e.g., "virtual compute instance" or "relational database instance") used to represent the objects of the provider network, a set of attributes of each entity (e.g., "compute instance size", "compute instance reservation mode", "database version", "database storage device"), and the relationships/interdependencies between different entities and/or attributes. The baseline schema itself may be stored within the unified metadata database 190 in some such embodiments, together with the collected attribute values. In some environments, clients may wish to add new types of information to the metadata manager's baseline schema, such as, for example, client-defined labels indicating the business purpose of a given application, performance metrics from client devices or client applications, additional information to be used to make authorization decisions for user requests, or configuration information for a resource that is implemented at a client data center. In order to allow clients to add such information to the provider network-specific metadata, in some embodiments the metadata manager may support schema extension functionality. For example, in one embodiment a client may wish to add an authorization-related attribute indicating the cost center or department (within the client's organization) for which compute resources of the provider network are acquired, and the schema extension functionality may allow the client to add the authorization attribute to the baseline set of attributes maintained for compute resources. If, in this example scenario, a request to terminate a particular compute resource is received after the authorization-related attribute is added, the service manager of the compute resource service may use the value of the authorization attribute to verify that the termination request is from a user associated with the appropriate cost center or department, before allowing the requested termination.

Figure 21:
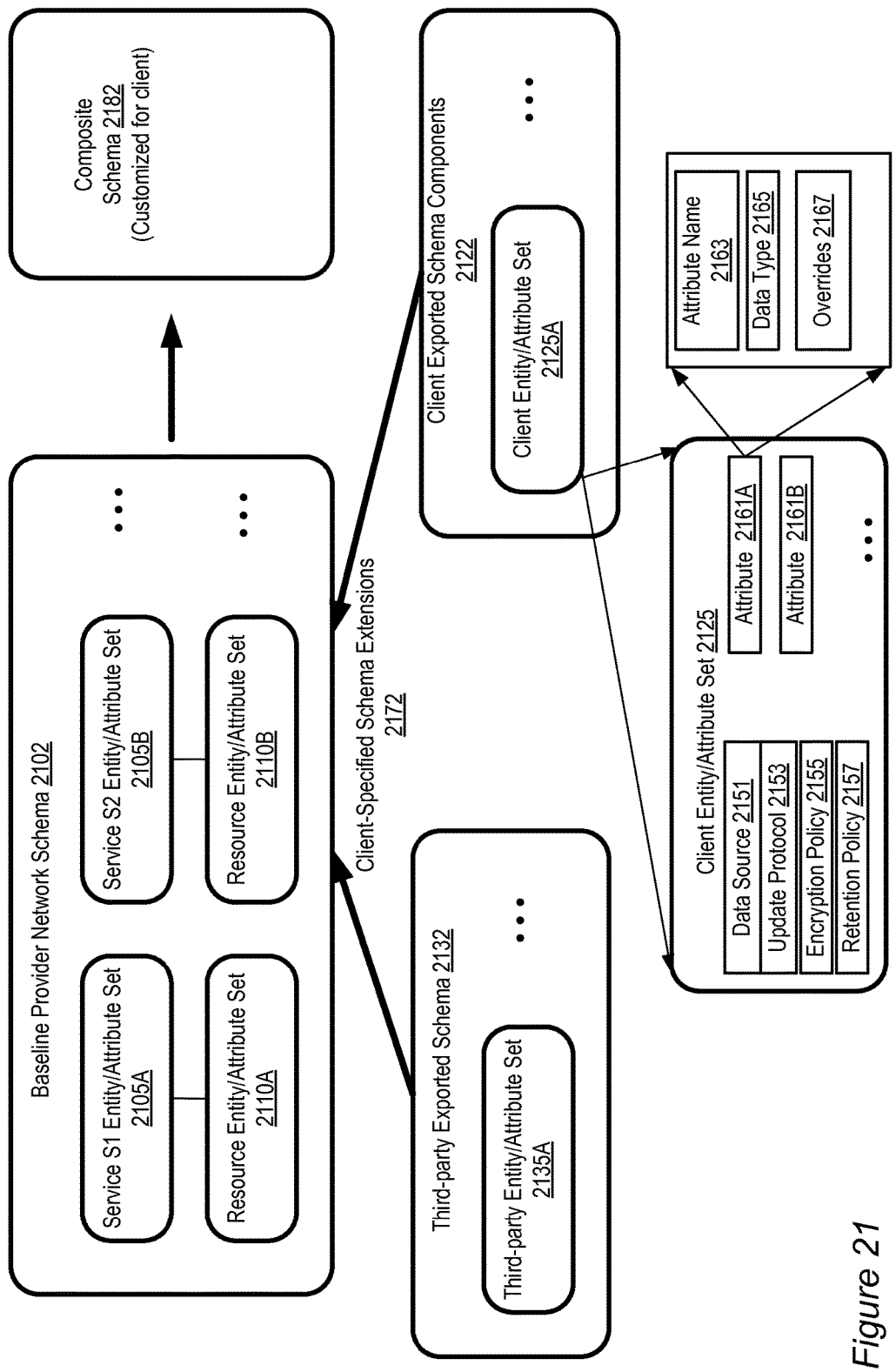
FIG. 21 illustrates a combination of client-specified schema extensions with a baseline provider network schema to generate a composite schema customized for the client, according to at least one embodiment.

FIG. 21 illustrates a combination of client-specified schema extensions with a baseline provider network schema to generate a composite schema customized for the client, according to at least one embodiment. A baseline provider network schema 2102 may have been established by the metadata manager 180 (not shown in FIG. 21) in the depicted embodiment, including entity and/or attribute sets for a variety of services implemented in the provider network using various resources of the provider network. For example, an entity/attribute set 2105A may have been created in the baseline schema 2102 for service S1, and an entity/attribute set 2105B may have been created for service S2. Each service-related entity/attribute set 2105 may have an associated resource entity/attribute set 2110, indicative of the set of resources that are used directly or indirectly in implementing the service: for example, resource entity/attribute set 2110A is associated with service S1, and resource entity/attribute set 2110B is associated with service S2. Values for each attribute defined in the baseline schema 2102 may be collected from a corresponding data source (which may be defined at the service level or at the resource level) by the metadata manager 180 in some embodiments. The contents of the service descriptors 705 and/or resource descriptors 735 shown in FIG. 7 may be organized and/or stored using the baseline schema 2102 in some implementations.

A given client user 148, such as an administrator of a particular client account, may be allowed to export client schema components 2122 to extend the baseline schema 2102 in some embodiments. The client schema components 2122 may include various client-defined entity/attribute sets 2125, such as set 2125A. Each client entity/attribute set 2125 may include information about a set of attributes 2161 (e.g., 2161A and 2161B). Each set of client-specified entities and/or attributes may have its own data source 2151 (e.g., a Uniform Record Locator or URL from which the values of the client attributes may be obtained), an update protocol 2153 (indicating for example whether a pull protocol or a push protocol is to be used for the attribute values, and how frequently attribute values are to be provided or updated), an encryption policy 2155 for the attribute values, and a retention policy 2157 indicating the duration for which the attribute values are to be retained. For each attribute 2161, the attribute name 2163, data type 2165 (e.g., whether the attribute values are integers, real numbers, arrays of numbers, strings, or binary objects), and optional overrides 2167 (e.g., providing an attribute-specific replacement for the attribute set's data source, update protocol, encryption policy or retention policy) may be specified in some embodiments. The types of information that the client may provide for the schema extension components 2122 may thus be similar in some embodiments to the types of information associated with baseline provider network schema components such as service and resource attribute sets. In some embodiments some of the extension attributes may include data obtained from client applications running within the provider network. For example, a custom client application being run on a compute resource 120 allocated to the client may provide application performance data and application configuration settings, typically viewed, understood, and/or used by the client's administrators. Prior to the schema extension request, the metadata manager 180 may not even be aware of the fact that the application performance or configuration data exists, much less its data type or data source. The schema extension request may allow such client application metadata to be included in a composite client account state representation after the schema has been extended. Client attributes 2161 may also include performance metrics and/or configuration settings of computing, storage or networking devices and applications implemented within client premises or client-managed networks in some embodiments. In addition, in some embodiments, clients may wish to add metadata attributes indicating a functional objective or purpose associated with one or more resources—e.g., one client may wish to designate a set of computing devices as a "cluster issue debug environment" by including a purpose attribute with that value to those resources, and another set of computing devices as a "nightly build environment". In at least some embodiments, the client may wish to include client attributes in the composite schema, representing cost estimates associated with executing various client applications, e.g., to help the metadata manager make optimization recommendations as described in further detail below.

In response to a request for a schema extension request from a client, specifying components 2122, the metadata manager may in some embodiments be operable to run validation tests, e.g., to ensure that the client-defined attribute values can in fact be obtained from the specified client data sources 2151. Having validated the client data sources, the metadata manager 180 may generate a composite schema 2182, customized for the client, and store the composite schema in a persistent store such as unified metadata database 190. Different client accounts may have different composite schemas 2182 in such embodiments. When a client wishes to utilize the account state management capabilities of the metadata manager 180, such as version snapshot generation or state change simulation, the client account state representation may include values of the client attribute sets that have been included in the composite schema, thereby providing a richer and more complete view than if only the provider network baseline components had been included. In some embodiments, the requests for schema extensions may be handled by control-plane components of the metadata manager, while the state view and versioning features may be implemented by separate data-plane components, e.g., different computer servers may be responsible for the changes to the schema than are responsible for displaying attribute values of the schema.

In at least one embodiment, a client may also request an inclusion of third-party schema components—e.g., values of attributes of services and/or resources that are managed and/or owned by parties other than the client and the provider network operator. For example, in one embodiment a client may be utilizing a third-party application that is implemented in part on resources resident at a facility outside the provider network. The client may provide a set of third-party entities and/or attribute sets for inclusion in the extended composite schema customized for the client. Such third-party extensions of the client account state schema may be particularly useful in situations in which, for example, applications being run on behalf of a client are dependent in some way on third-party services or third-party resources. In one such scenario, a multi-phase client application (being run partly on provider network resources) may rely on a phase of numerical analysis of intermediate application data, where the numerical analysis is performed on a high-end third-party server outside the provider network. In order to get a more complete view of the client's account state, and thereby more efficiently analyze potential problems in the application, it may be helpful to include metadata about the third-party server in the composite schema 2182. In some embodiments similar information may be provided by the client regarding third-party schema extensions as are provided for client schema extensions—e.g., for a given set of third-party attributes, a data source, update protocol, encryption policy, and retention policy may be specified in addition to the name and data type of each third-party attribute. In at least one implementation, a third-party service manager (such as service manager 130D of FIG. 1) may have to participate in the process of extending the baseline schema with third-party attributes—e.g., the third-party service manager may be contacted by the metadata manager 180 or the client 148 to approve the export of the third-party attribute set, and the metadata manager 180 may extend the client's composite schema only after validating that the third-party service manager has approved the extensions and is capable of providing the values of the third-party attributes that the client has requested for inclusion in the extended schema.

In some environments, a client may wish to extend the provider network baseline schema without necessarily revealing raw data values of the client attributes (or third-party attributes) to be added to the baseline schema. For example, even though the client may wish to include, in its unified client account state, a value of a client-side attribute such as the size of the user set of an application running on a particular client device, the value may comprise confidential or business-proprietary information that is not intended to be visible outside the client's own network. Accordingly, in some embodiments, an encryption policy 2155 may comprise encrypting the sensitive data such that only the client's administrative users can decrypt the data. Thus, in one such embodiment, the metadata manager 180 may collect encrypted attribute values that it (the metadata manager) cannot decrypt, and may include the values in their encrypted state within account state views provided to the client user 148. The client user 148 may decrypt the attribute values as desired, e.g. using a key that is not made available to the metadata manager. In some embodiments the schema extension requests may include references to procedures and/or keys to be used to decrypt the encrypted attribute values by client users. For example, when a schema is extended to include an encrypted attribute, the submitter of the schema extension request may indicate how (e.g., using keys obtained from which sources, and/or using which client-side decryption libraries) the attribute is to be decrypted. This information may be passed back to an account state view requester later, so that the attribute values can be decrypted easily and transparently, without the state view requester having to do any additional operations to determine exactly how to decrypt the attribute values.

Figure 22:
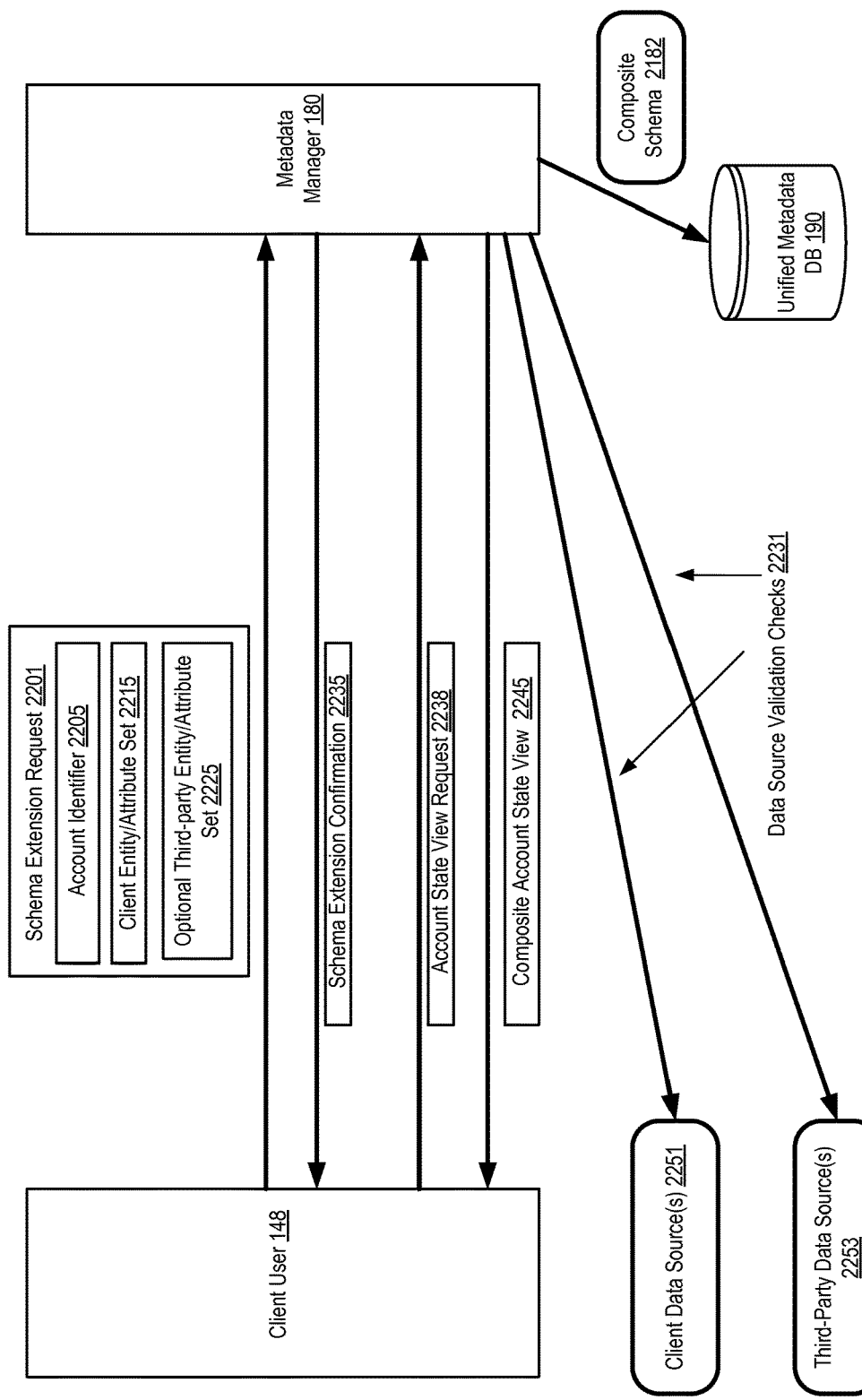
FIG. 22 illustrates schema extension-related interactions between a client and a metadata manager, according to at least one embodiment.

FIG. 22 illustrates schema extension-related interactions between a client and a metadata manager, according to at least one embodiment. As shown, a client user 148 may submit a schema extension request 2201 to the metadata manager 180, specifying the account identifier 2205 of the client account for which a custom extended schema is to be created, a client entity/attribute set 2215, and an optional third-party entity/attribute set 2225. For the attributes included in the client and/or third-party attribute sets, in at least one embodiment the request may indicate some combination of a data source 2151, an update protocol 2153, an encryption policy 2155 and a retention policy 2157. In some embodiments a service manager 130 (or other entity) within the provider network may be specified as the data source for a client attribute or a third-party attribute; e.g., it may be possible for such a service manager to collect the values of the extended attribute and provide the values for inclusion in account state views, snapshots and the like. In other embodiments, values of client attributes may be obtained from a client data source (such as client resource manager 170 of FIG. 1) outside the provider network, and values of third-party attributes may be obtained from third-party data sources (such as service manager 130D of FIG. 1) outside the provider network.

In response to receiving the schema extension request 2201, the metadata manager 180 may in some embodiments contact the client data source(s) 2251 and/or the third-party data source(s) 2253 to perform one or more validation checks 2231. The validation checks may include, for example, verifying that the data sources are able to provide attribute values of the indicated data types for the various client and/or third-party attributes indicated in the schema extension request 2201, and that the policies (e.g., the update policy or encryption policy) can be implemented as indicated. If the data source validation checks succeed, in one embodiment the metadata manager 180 may store a composite schema 2182 that includes the client entity/attribute set 2215 and/or the third-party entity/attribute set, together with the entities and attributes of the baseline provider network schema 2102. The composite schema, customized for the client account with identifier 2205, may be stored in the unified metadata database 190 in some embodiments. The metadata manager 180 may send a schema extension confirmation 2235 to the client in one embodiment, indicating that the composite schema has been generated as requested. In response to a subsequent account state view request 2238, the metadata manager 180 may provide a composite account state view 2245 that includes representations of the metadata for client attributes (obtained from or provided by the client data sources 2251) as well as provider network service and resource attributes (e.g., obtained from service managers within the provider network). Depending on whether the schema was extended with third-party attributes or nor, the composite account state view 2245 may also include third-party attributes that may be obtained from third-party data sources. Similarly, in embodiments where various other features described earlier are supported, such as account version snapshots, cloning, simulation, or account state difference analysis, the client attribute sets and third-party attribute sets may be included in the implementations of those features. A persistent representation of a composite account state view 2245 may be stored as a version snapshot, for example, or a COW clone account may be created that includes pointers to client-side resources. In at least some embodiments, the values of composite schema attributes may be obtained by a client user in response to simple queries (i.e., queries which may not require generating account state views) in addition to account state view requests.

Figure 23:
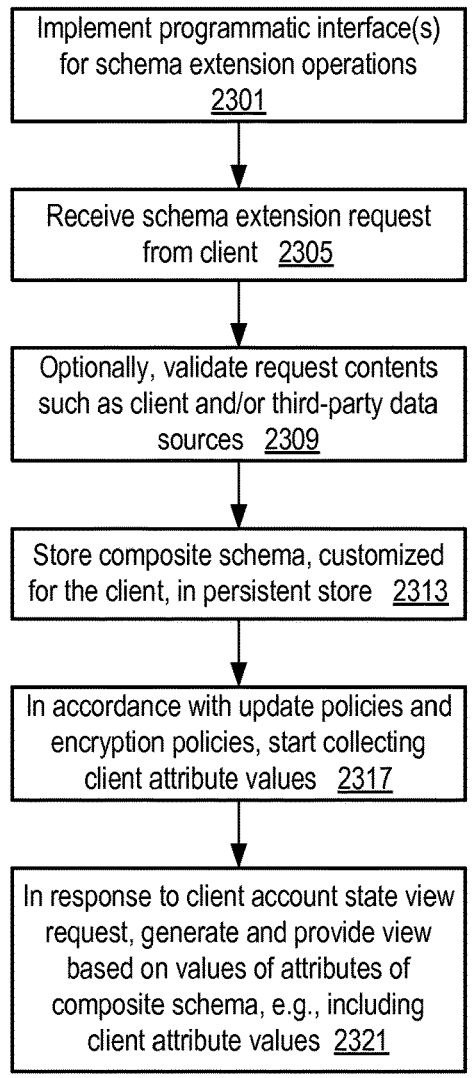
FIG. 23 is a flow diagram illustrating aspects of the operation of a metadata manager operable to extend a baseline provider network metadata schema in response to a client request, according to at least one embodiment.

FIG. 23 is a flow diagram illustrating aspects of the operation of a metadata manager 180 operable to extend a baseline provider network schema in response to a client request, according to at least one embodiment. As shown in element 2301, one or more programmatic interfaces such as a set of APIs or web pages may be implemented for schema extension interactions. The metadata manager 180 may receive a schema extension request 2201 from a client (element 2305), indicating (implicitly or explicitly) the client account for which the composite or extended schema is desired, and providing various details about the attributes to be added to the baseline schema, such as their names, data types, data sources that are to provide the values of the attributes, and the update policy (e.g., whether pull, push or a combination of pull and push policies are to be used to obtain the values, and at what intervals or frequencies the values are to be obtained). In some implementations the request may also indicate whether encryption is to be used for the attribute values, and if so, the encryption details (e.g., which devices or entities are responsible for encrypting/decrypting the attribute values, the specific encryption algorithm to use, and so on). In at least some embodiments a retention policy indicating how long the metadata manager 180 is expected to keep attribute values before they may be discarded may also be provided in the schema extension request. The schema extension request may indicate client attributes, such as configuration settings or performance metrics of client-owned devices on client premises, as well as third-party attributes of resources or services provided by third-parties owned by entities other than the provider network operator in some embodiments.

Upon receiving a schema extension request, the metadata manager 180 may in some embodiments validate contents of the request (element 2309). For example, in one embodiment where a client data source is indicated as a source of the values of a set of client attributes, the metadata manager 180 may contact the data source to ensure that the specified attribute values can in fact be obtained. Similarly, connectivity to, and functionality of, third-party data sources identified in the schema extension request may also be validated in some embodiments. After validating the information provided in the request, the metadata manager 180 may combine the attributes indicated in the request with the attributes of the baseline provider network schema, to generate a composite schema customized for the client account. The composite schema may be saved in a persistent store (element 2313) in the illustrated embodiment.

Having established the composite schema, the metadata manager 180 may then being implementing data collection from the various data sources of the attributes included in the composite schema, in accordance with the various update policies and/or encryption policies in effect for the different attributes (element 2317). For example, according to one particular set of update and encryption policies in effect for a composite schema, the metadata manager may pull encrypted attribute values from a client data source, while unencrypted attribute values for a set of provider network resource attributes may be pushed to the metadata manager from a service manager 130 of the provider network. In response to a client account state view request, the metadata manager 180 may generate and provide a composite view based on values of the attributes included in the composite schema (element 2321). The composite view may be displayed in a format (e.g., a graphical format or a text format) specified by the client. In some implementations, the client may be responsible for decrypting some of the information provided in the composite account state view—e.g., using an encryption key in accordance with an encryption protocol in effect for a client-side attribute, the client may be able to view attribute values that may have been collected by the metadata manager but may not have been intelligible to the metadata manager.

Figure 24:
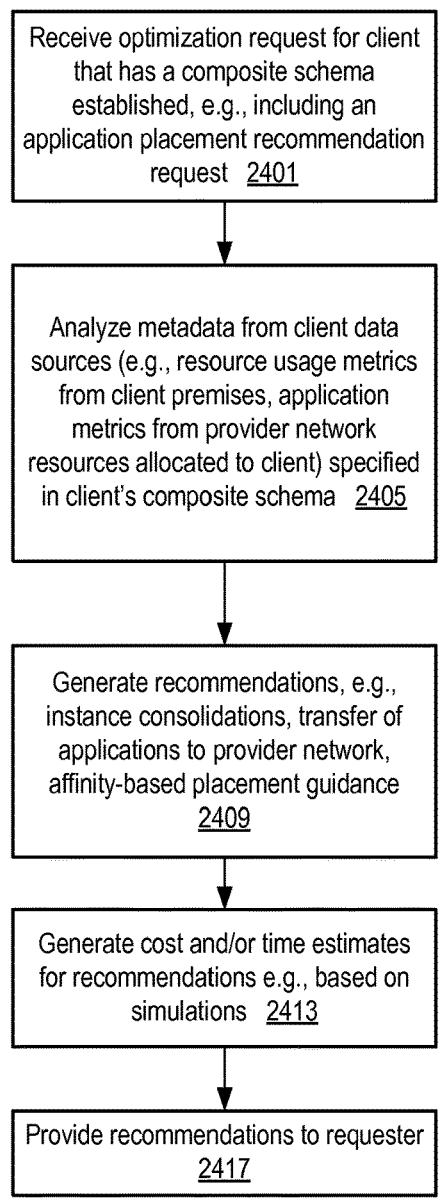
FIG. 24 is a flow diagram illustrating aspects of the operation of a metadata manager operable to generate resource recommendations for a client based at least in part on attribute values collected from a client data source associated with a client-requested schema extension, according to at least one embodiment.

In some embodiments, clients may be motivated to extend the baseline provider network schema in order to benefit from the analysis capabilities of a metadata manager 180 operable to provide recommendations of various types based on the metadata collected for the client-extended attributes included in composite schemas. FIG. 24 is a flow diagram illustrating aspects of the operation of a metadata manager operable to generate resource recommendations for a client based at least in part on attribute values collected from a client data source associated with a client-requested schema extension, according to at least one embodiment. As shown in element 2401, the metadata manager 180 may received an optimization request from a client user affiliated with a client account for which a composite schema has been established. In some embodiments a resource optimization request may comprise any combination of several different types of more specific requests, such as application placement recommendation requests, resource consolidation requests, and the like. A client may for example wish to receive a recommendation about potential benefits of transferring a client application from the resources that it is currently using (e.g., one or more compute devices in the client network) to a different set of resources (e.g., compute instances within the provider network). The metadata manager 180 may be able to analyze metadata (such as resource performance and utilization metrics) collected from client data sources (which may include resource managers and/or service managers in the client's network, or within the provider network) specified in the client's composite schema to determine whether a more efficient mapping of applications to resources is possible (element 2405). For example, the metadata manager 180 may be able to recommend that some client applications could be run on different, cheaper resources (either within the client data center or within the provider network) than are currently being used, without any significant impact on responsiveness or throughput of the applications. The metadata manager 180 may also be able to recommend changes (such as transfers of applications from one resource to another within the client network, or within the provider network) to reduce network traffic in at least some portions of the client network, or in the links connecting the client network to the provider network. In another example, for one particular set of client applications, the metadata manager may determine that because of the amount of application network traffic between two resources R1 and R2 being used for those applications in the client network, it may be worthwhile to continue to use R1 and R2 instead of moving the applications to the provider network, where the total network transfer costs may be high enough to offset any benefits from cheaper compute instances.

Using attribute values collected for the client account using the composite schema, from data sources within and external to the provider network, the metadata manager 180 may in some embodiments be able to recommend actions that may have been more difficult to identify if only the baseline provider network schema were used, or only the client attribute set values were used. The metadata manager 180 may generate one or more recommendations in one such embodiment, such as instance consolidations (e.g., replacing several compute instances with a single more powerful instance), transfer of client applications to provider network resources, affinity-based placement of applications (e.g., moving an application from one resource to another to reduce total network bandwidth usage or cost), and so on (element 2409). Estimates of the costs and/or time required to implement the recommendations may be provided in some embodiments (element 2413), for example, using the account state change simulation functionality described earlier. The recommendation(s) may then be provided to the requester (element 2417).

Composite Authorization Metadata

As noted earlier, in some embodiments, the techniques being used to control user access to various resources may vary from one service of the provider network to another in at least some embodiments, resulting in a mixed-mode authorization environment. In some environments, for example, some of the services may have been implemented by different development groups at different times, or even by different acquired companies, and as a result authorization models used by the different service managers may differ in their design and/or implementation approaches. One service manager may support one set of authorization APIs usable to grant permissions to perform operations of the service in one embodiment, while another service manager may implement a different set of authorization APIs for authorizing its operations. In some cases authorization information may be associated with individual resources—e.g., separate access control lists (ACLs) may be set up for each storage object in some implementations. An ACL may, in one implementation, comprise a list of specific permissions attached to an object. For example, a storage object may have an ACL that contains the elements (user1, read), (user2, read/write/delete), indicating that while user1 may read the storage object without modifying it, user2 is permitted to read, write to, or delete the storage object. The set of users to whom various permissions are granted via ACLs may differ from one service to another in some embodiments, and the types of operations to which permissions can be granted may also differ depending on the service. In addition, in some embodiments an identity manager may be implemented within the provider network, allowing the creation of group and user hierarchies with associated roles and/or capabilities for various applications and/or services. For example, with respect to a content management service, a particular user X may be assigned a "content contributor" role with capabilities such as "add content", "modify content" and so on. In some embodiments the set of distributed network-accessible services may include an identity service, i.e., the identity manager may be the service manager of one of the provider network's services (such as the service manager 220D shown in FIG. 2). The roles and capabilities defined by the identity manager may not be applicable to all the services available in the provider network in some embodiments. In addition, in a provider network where ACL-based authorization is combined with identity-based capabilities, it may be possible for an ACL setting to negate or nullify a capability assigned by the identity manager—e.g., when a user with a "content contributor" with "add content" capability tries to update a content item resident on a particular storage object, the update may be denied if the ACL associated with the object does not list that user as having write permission.

Figure 25:
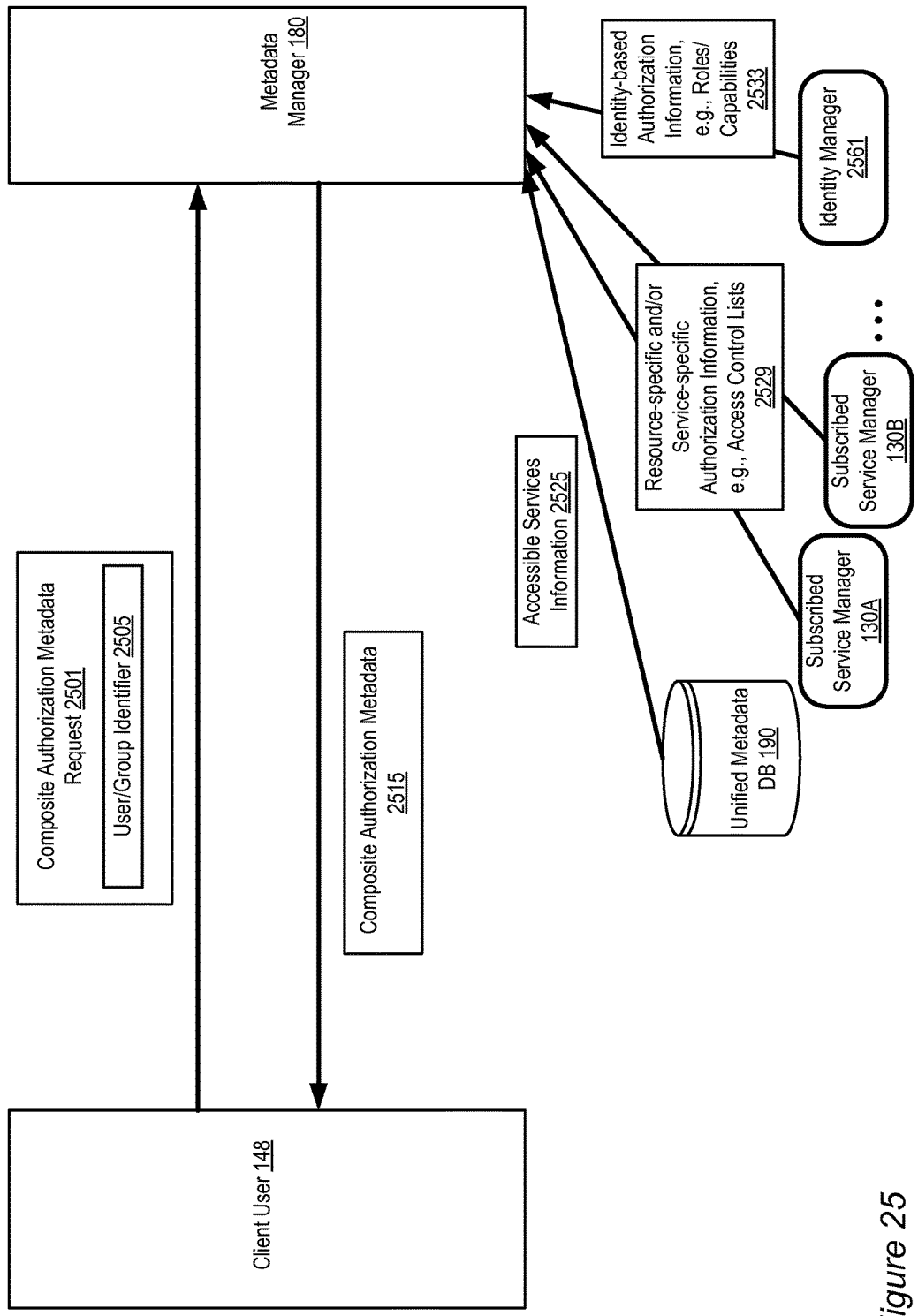
FIG. 25 illustrates a metadata manager operable to collect resource-specific and service-specific authorization information from a plurality of service managers of a provider network to generate composite authorization metadata for a given user or group affiliated with a client account, according to at least one embodiment.

Given the different authorization policies that may be in effect for the various services and resources of the provider network 110, identifying exactly which operations a given user is authorized to perform, and on exactly which resources and services, at a given point in time, may not be easy in such a mixed-mode authorization environment. In some embodiments, therefore, the metadata manager 180 may be configured to provide a number of cross-service or multi-service authorization functions. FIG. 25 illustrates a metadata manager 180 operable to collect resource-specific and service-specific authorization information from a plurality of service managers 130 (e.g., 130A and 130B) of the provider network 110 to generate composite authorization metadata for a given user or group affiliated with a client account, according to at least one embodiment. A client user 148 may submit a composite authorization metadata request 2501 identifying a user or group affiliated with a client account to the metadata manager 180. In response, the metadata manager may identify a plurality of provider network services 2525 accessible to the client account, e.g., by consulting the metadata collected for the client account and stored within the unified metadata database 190 in some embodiments. From each of a plurality of service managers associated with the accessible services 2525, the metadata manager 180 may collect resource-specific and/or service-specific authorization information 2529 for the specified user or group, e.g., a set of ACLs of resources 120 associated with the corresponding service may be obtained. In addition, the metadata manager 180 may also collect identity-based authorization information from an identity manager 2561, such as various roles and/or capabilities granted to the user or group. In some embodiments the metadata manager may collect records of invocations of the authorization APIs implemented by various service managers and the APIs implemented by the identity manager for assigning identity-based capabilities and roles. Using the authorization metadata collected from at least these two types of sources, the metadata manager may in some embodiments generate a representation of the composite authorization metadata 2525 of the user or group, and provide the representation to the requester 148 in a format selected by the requester. Especially in large provider networks where operation requests (e.g., "is user X allowed to perform this requested update operation on this resource R for service S?") that require authorization decisions to be made at very high rates, such as tens of thousands of operations per second, having an intermediary collect authorization metadata from the various service managers and identity managers may be the only feasible way to get a big-picture view of the authorizations granted to a given user, without imposing too high a performance overhead on production systems. In some implementations, the view of composite authorization information provided by a metadata manager 180 may indicate the point in time for which it is valid, e.g., using a validity timestamp indicating when the corresponding metadata was last collected. In some implementations, a client may request composite authorization metadata as of a specified time, e.g., the request may comprise the logical equivalent of "please display user X's authorization metadata as of 9 AM EST May 25 2012".

Figure 26:
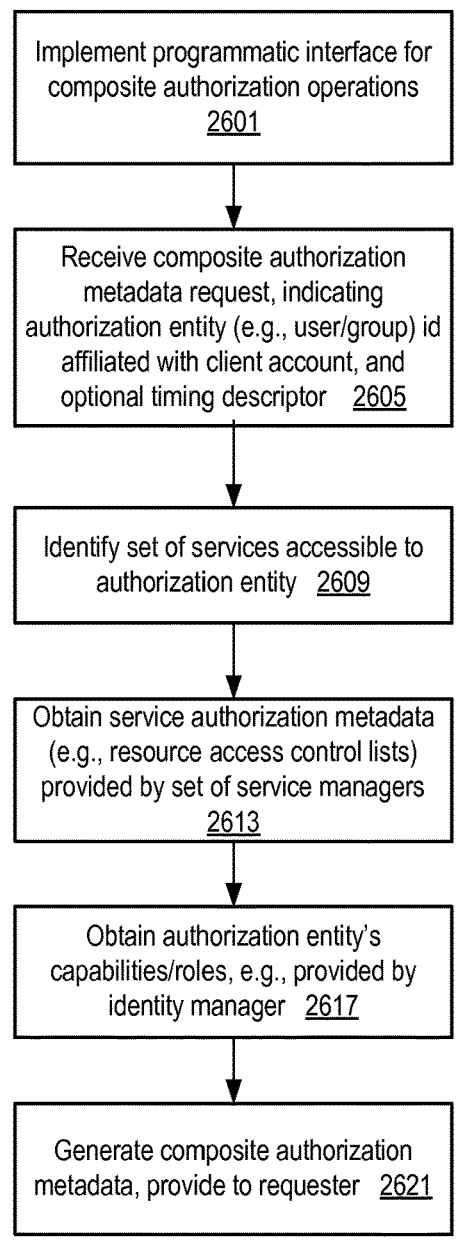
FIG. 26 is a flow diagram illustrating aspects of the operation of a metadata manager operable to generate composite authorization metadata for an authorization entity, according to at least one embodiment.

FIG. 26 is a flow diagram illustrating aspects of the operation of a metadata manager 180 operable to generate composite authorization metadata for an authorization entity, according to at least one embodiment. As shown in element 2601, the metadata manager may implement one or more programmatic interfaces, such as a set of APIs and/or web pages, for authorization-related operations. The metadata manager 180 may receive a composite authorization metadata request (element 2605), identifying the particular authorization entity (e.g., user or group) of a given client account for which information is being requested. In some implementations, as noted above, the request may include a timing descriptor indicating the point in time, or time period, for which the information is desired. In response to the request, the metadata manager 180 may in some embodiments first determine the set of services accessible to users/groups affiliated with the client account (and more specifically in some implementations, the particular services to which the specified user/group has access), as shown in element 2609. The metadata manager 180 may then obtain service-specific and/or resource-specific authorization metadata, such as a set of ACLs of resources being used for the service, from each of a plurality of service managers of services accessible by the user/group (element 2613). Identity-based authorization metadata such as roles and capabilities may be obtained from an identity manager in some embodiments (element 2617). The metadata manager 180 may then combine the authorization information from the plurality of service managers and the identity manager, and provide a representation of the composite authorization information to the requester (element 2621). In some embodiments, depending for example on the frequency with which authorization configuration operation records are collected and on the time for which the metadata is desired, the metadata manager 180 may be able to refer to already-collected records in its database to generate the composite authorization information, without having to obtain new authorization metadata after the request is received.

Figure 27:
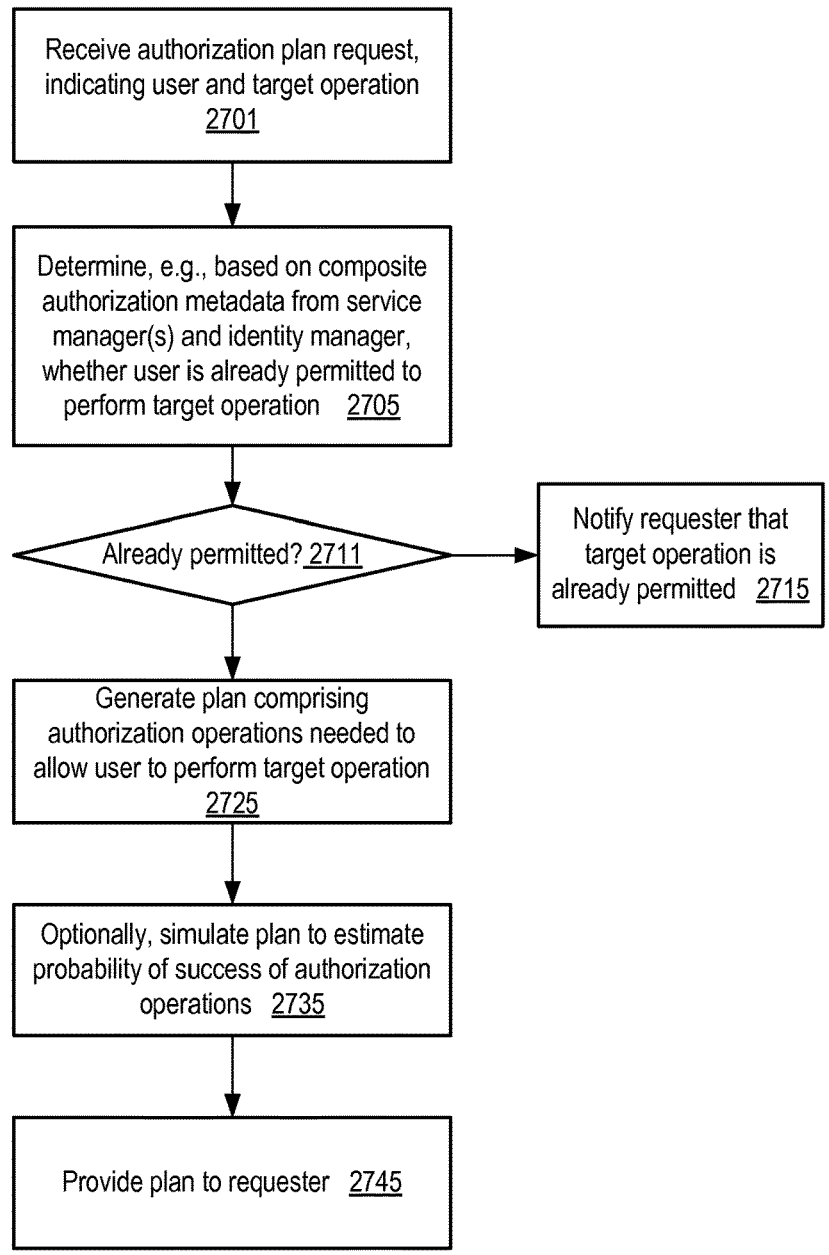
FIG. 27 is a flow diagram illustrating aspects of the operation of a metadata manager operable to generate an authorization plan to enable a specified user to obtain authorization to perform a particular operation, according to at least one embodiment.

FIG. 27 is a flow diagram illustrating aspects of the operation of a metadata manager 180 operable to generate an authorization plan to enable a specified user to obtain authorization to perform a particular operation, according to at least one embodiment. As shown in element 2701, a plan request specifying a particular user associated with a client account may be received, indicating a target operation for which the user is to be authorized. In response, in the depicted embodiment the metadata manager 180 may first determine, using the composite authorization metadata it has already collected from various service managers and the identity manager, whether the user already has the desired authorization (element 2705). In some embodiments, when a plan request is received, the metadata manager may refresh its authorization metadata, e.g., by pulling more recent authorization information from the identity manager and/or various service managers. If the user already has the desired permission (as determined in element 2711), the requester may be informed that no additional authorization requests are needed (element 2715). Otherwise, if the user is not currently authorized for the targeted operation according to the collected authorization information, the metadata manager 180 may generate a set of authorization operations to obtain the needed permissions (element 2725), e.g., identifying the specific API calls to be made to various service managers or the identity manager, the parameters of the calls, and/or the sequence in which the calls should be made. In some embodiments the metadata manager may simulate the set of authorization operations of the plan (element 2735), e.g., to estimate the probability of success of the authorization operations and provide the estimate to the requesting client. The metadata manager may provide the plan to the requester (element 2745), The authorization plan generation functionality may be especially useful when there may be several different alternative ways of achieving the desired authorization—for example, it may be easier and quicker to modify a set of ACLs of the resources affected by the target operation in some embodiments, than to change the user's capabilities in the identity manager's database and then propagate the new capabilities to the various service managers and resources. The metadata manager may be able to point out the most efficient way of authorizing the user in such an embodiment. Similar plans may be generated and provided for user groups instead of, or in addition to, for individual users in some embodiments.

In at least some embodiments, the metadata manager 180 may implement the types of functions described earlier, such as version snapshot creation, cloning, or causal analysis, specifically in the context of authorization configuration. For example, a client may submit a causal analysis request to the metadata manager specifying a particular result of an authorization-related request (e.g., a failure of a request to set permissions allowing a particular user to perform a particular operation, or a denial of access to a particular resource). In response, the metadata manager 180 may examine records of service authorization configuration operations from the various service managers and/or records of identity authorization configuration operations from the identity manager to identify records of candidate prerequisite configuration operations that could have led to the result being investigated. The metadata manager 180 may provide an enumeration of the candidate prerequisite operations to the client. In response to a client request to save a snapshot version of a particular user's or group's authorization information, the metadata manager 180 may save the configuration settings for that user or group as of a particular time as an authorization snapshot in its unified metadata database 190 in some embodiments. Similarly, in response to an authorization state cloning request for a specified user, the metadata manager 180 may set up a clone user account with the authorization settings of the specified user. In one embodiment the metadata manager 180 may support difference analysis of composite authorization metadata, e.g., for two specified users A and B, the metadata manager may be able to provide the differences in permissions, roles and capabilities granted.

In one embodiment, the metadata manager 180 may provide one or more programmatic interfaces allowing a client to specify filters to restrict the types of authorization information to be collected, or the types of information to be included in an authorization metadata representation. For example, the interface may allow a client user to specify that only the authorization operation records of a specified set of users should be included in the composite information (or collected), or that authorization operation records associated with only a specified set of services or a specified set of resources should be collected or included. In a manner similar to the scheme extension techniques described earlier, the metadata manager may support the inclusion of client-side authorization information in the composite authorization metadata in some embodiments. In one such embodiment, authorization records for various users and groups may be collected from client data sources (such as identity managers or service managers resident on computing devices within the client network) and combined with the authorization records from the provider network to provide a more complete picture of a given user's authorization status. In some implementations, a given user "John Doe" may have one user identifier in the client-side environment (e.g., "jdoe") and another user identifier in the provider network (e.g., "john.doe"); in such scenarios a combination of client-side and provider network authorization information may require a mapping step in which the user identifiers in the two domains (client-side and provider network) are matches with each other. The metadata manager 180 may perform this mapping step in some embodiments, e.g., using other user attributes such as email addresses or real names included for the users in the authorization settings in both domains.

Use Cases

The functionality related to account state management across multiple heterogeneous services and large sets of resources may be extremely helpful in a variety of environments. Administrators and/or executives of large corporate client accounts may be very interested in obtaining a high-level consolidated view of their subscribed services and allocated resources. Such views and saved snapshots may be useful, for example, in identifying resource and service usage trends over time and in anticipating future costs. Administrators and/or customer support teams may be able to use the metadata manager's versioning and cloning functions to perform a variety of tasks more efficiently—e.g., to debug complex error states, to try to replicate problems encountered in a production environment without disturbing the production environment, and so on.

The simulation functionality of the metadata manager described above may be useful in trying out potentially expensive sets of intended operations affecting several different services, before actually incurring the costs of attempting the operations. For example, using the simulation capabilities, it may become much quicker and easier to debug multi-tier configuration setups. The schema extension capabilities may be beneficial to clients that currently implement a substantial subset of their applications within their own premises or networks outside the provider network, and are interested in exploring the potential benefits of moving more of the applications into the cloud environment of the provider network. Client administrators may be able to use the consolidated authorization features of the metadata manager to determine, for example, the set of users that may have been responsible (either knowingly or inadvertently) for problematic configuration changes. In some cases the composite authorization information may also be helpful in cutting costs—for example, such information may lead an administrator to realize that access to some services may be curtailed for some users who no longer need the services or have not had to use the services in a long time.

Illustrative Computer System

Figure 28:
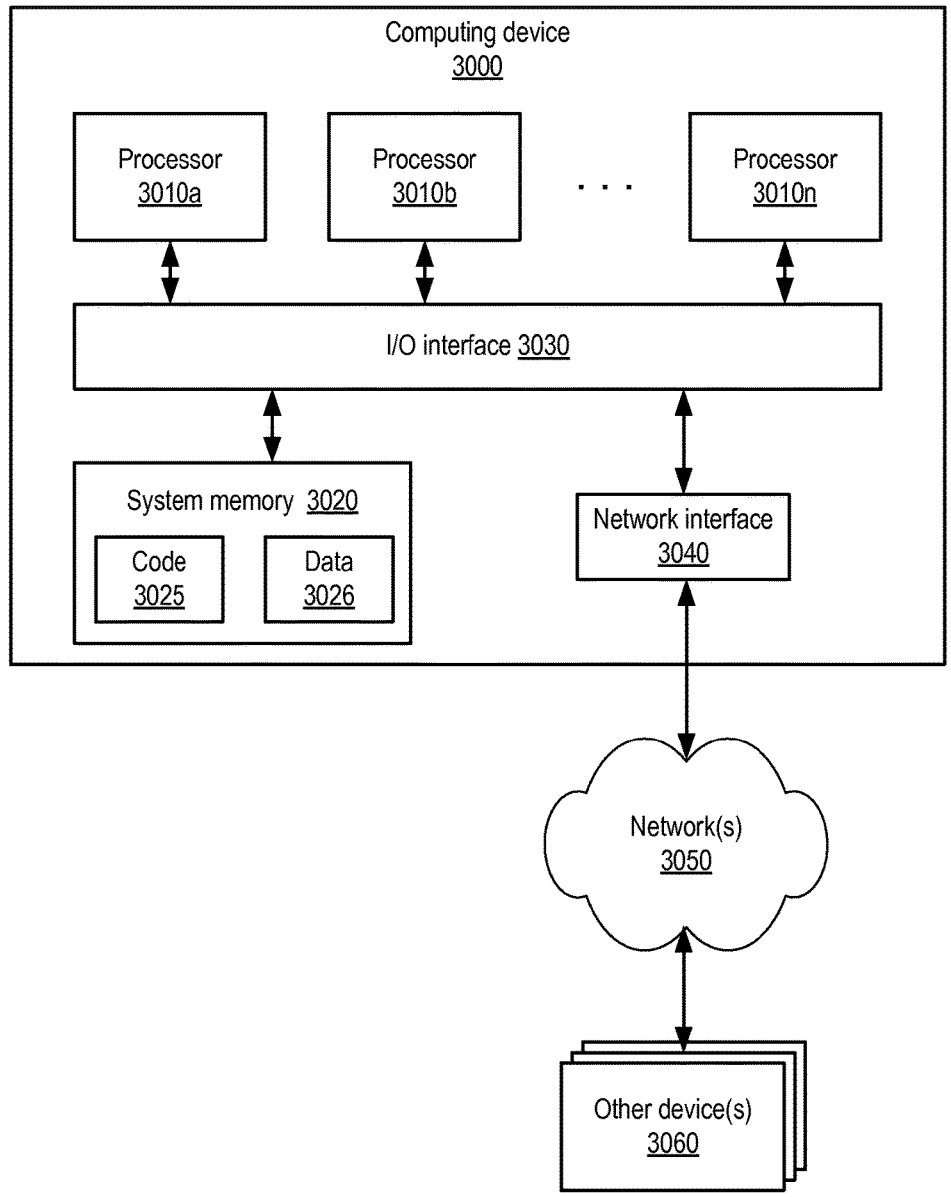
FIG. 28 is a block diagram illustrating an example computing device that may be used in some embodiments.

In at least some embodiments, a server that implements a portion or all of one or more of the technologies described herein, including the techniques to implement the functionality of metadata manager 180 (including interface manager 182) and service managers 130, may include a general-purpose computer system that includes or is configured to access one or more computer-accessible media. FIG. 28 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIGS. 1 through 27, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIGS. 1 through 28 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 28 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing platform", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
 a plurality of computing devices including respective hardware processors and memory and configured to implement:
  a plurality of resources of a provider network that provides each of a plurality of types of distributed services to a plurality of clients, wherein the plurality of types of distributed services comprises at least a virtualized compute service and a virtualized storage service that are both provided to the plurality of clients, wherein virtual compute and virtual storage resources of the plurality of types of distributed services are assignable to a client account of a client of the plurality of clients of the provider network;
  a plurality of service managers, wherein each service manager of the plurality of service managers is configured to coordinate a respective multitenant network-accessible service of the distributed services implemented at least in part using the virtual compute or the virtual storage resources of the provider network; and
  a metadata manager configured to:
   obtain metadata from the plurality of service managers, wherein the metadata describes virtual resource type and virtual resource assignment to a client account for at least some of the plurality of virtual resources of the provider network that provide the distributed services to the plurality of clients;
   implement a programmatic interface that allows a client user of a particular client account to submit a multi-service account state view request for a unified view of an administrative state of the particular client account across the plurality of types of distributed services that comprises at least the virtualized compute service and the virtualized storage service, the request specifying a timing descriptor;
   in response to receipt of a multi-service account state view request from the client user of the particular client account via the programmatic interface, wherein the particular client account of one of the plurality of clients of the provider network is indicated by the request,
    generate, based at least in part on the obtained metadata, a representation of an administrative state of the particular client account with respect to each of the virtualized compute service and the virtualized storage service, as of a point in time determined at least in part using the timing descriptor,
    wherein the administrative state of the particular client account with respect to a particular distributed service of the plurality of types of distributed services comprises an indication of an assignment to the particular client account of one or more virtualized resources participating in implementation of the particular distributed service, and
    wherein the representation of the administrative state of the particular client account provides a unified view of the administrative state of the particular client account across at least the virtualized compute service and the virtualized storage service; and transmit the representation to the client user of the particular client account, where the representation provided to the client user provides the unified view of the administrative state of the particular client account across at least the virtualized compute service and the virtualized storage service as of the point in time determined at least in part using the timing descriptor.

2. The system as recited in claim 1, wherein the metadata manager is further configured to:
in response to an indication of a persistence preference for the representation of the administrative state of the particular client account, assign a version identifier to the representation and store the representation in a persistent repository.

3. The system as recited in claim 1, wherein the metadata manager is further configured to:
in response to a determination that the request does not identify the plurality of services accessible by the particular client account, determine that metadata for each service to which the particular client account has been granted access is to be included in the representation.

4. The system as recited in claim 1, wherein the request comprises an indication specifying, for a particular category of resources used to implement the particular service, a set of resource state attributes to be included in the representation of the administrative state.

5. The system as recited in claim 1, wherein, to generate the representation, the metadata manager is further configured to collect records of administrative operations associated with a particular service manager.

6. The system as recited in claim 1, wherein, to provide the representation to the client user, the metadata manager is further configured to:
present a graphical view of the administrative state, wherein the graphical view comprises a timing control element, and wherein the graphical view allows a submission of a request to update the graphical view to display the administrative state as of a time specified via the timing control element.

7. A method, comprising:
obtaining metadata that describes a virtualized resource type and a virtualized resource assignment to a client account for at least some of a plurality of virtualized resources of a provider network that provides each of a plurality of types of distributed services to a plurality of clients, the plurality of types of distributed services comprising a virtualized compute service and a virtualized storage service;
receiving, from a client user of a particular client account and via an interface, a multi-service account state view request for a unified view of an administrative state of the particular client account across multiple types of the distributed services comprising at least the virtualized compute service and the virtualized storage service, as of a point in time specified by a timing descriptor of the request, wherein the request comprises an indication of a particular client account of a client of the provider network;
generating, based at least in part on the obtained metadata, a representation of an administrative state of the particular client account with respect to each of at least the virtualized compute service and the virtualized storage service in accordance with the point in time specified by the timing descriptor of the request,
wherein the administrative state of the particular client account with respect to a particular distributed service of the plurality of types of distributed services comprises an indication of an assignment to the particular client account of one or more virtualized resources of the provider network participating in implementation of at least a portion of the functionality of the particular distributed service; and
transmitting the representation to the client user of the particular client account, wherein the representation of the administrative state of the particular client account provides a unified view of the administrative state of the particular client account across each of at least the virtualized compute service and the virtualized storage service in accordance with the point in time specified by the timing descriptor of the request.

8. The method as recited in claim 7, further comprising:
in response to an indication of a persistence preference for the representation of administrative state of the particular client account, storing the representation in a persistent repository.

9. The method as recited in claim 7, further comprising:
determining a set of services, including the plurality of services, for which metadata is to be included in the representation based at least in part on a services descriptor associated with the request.

10. The method as recited in claim 9, wherein the services descriptor comprises one or more resource descriptors indicating, for each of one or more categories of resources used to implement the service, a set of resource state attributes to be included in the representation of the administrative state.

11. The method as recited in claim 7, further comprising:
collecting a set of records of administrative operations performed on behalf of the particular client account.

12. The method as recited in claim 7, further comprising:
presenting a graphical view of the administrative state, wherein the graphical view comprises a timing control element, and wherein the graphical view allows a submission of a request to update the graphical view to display the administrative state as of a time specified via the timing control element.

13. The method as recited in claim 7, further comprising:
determining the particular point in time based at least in part on a reference in the timing descriptor to an operation requested from a service manager of the particular service.

14. The method as recited in claim 7, further comprising:
storing an indication of a metadata retention policy for a particular resource of the one or more resources of the provider network participating in implementation of at least a portion of the functionality of the particular service, wherein the policy specifies a duration for which the indication of the assignment of the particular resource is to be retained.

15. The method as recited in claim 7, wherein the administrative state of the particular client account with respect to the particular service comprises an indication of a completion of a particular configuration change of the particular service, further comprising:
in response to a causal analysis request for the particular configuration change, providing a record of a candidate prerequisite operation of the particular configuration change that (a) was performed prior to the particular configuration change and (b) was performed as a result of an operation requested from a service manager of a different service of the plurality of services.

16. A non-transitory computer-accessible storage medium storing program instructions that when executed on one or more processors:

obtain metadata that describes a virtualized resource type and a virtualized resource assignment to a client account for at least some of a plurality of virtualized resources of a provider network that provides each of a plurality of types of distributed services to a plurality of clients, wherein the plurality of types of distributed services comprise a virtualized compute service and a virtualized storage service;

receive, from a client user of a particular client account and via an interface, an account state view request for a unified view of an administrative state of the particular client account, across multiple types of the distributed services that comprise at least the virtualized compute service and the virtualized storage service, as of a point in time specified by a timing descriptor of the request, wherein the account state view request indicates a particular client account of a client of the provider network; and generate, based at least in part on the obtained metadata, a representation of an administrative state of a particular client account of a client of a provider network with respect to each of at least the virtualized compute service and the virtualized storage service in accordance with the point in time specified by the timing descriptor of the request, wherein the administrative state of the particular client account with respect to a particular distributed service of the plurality of types of distributed services comprises an indication of an assignment to the particular client account of one or more virtualized resources of the provider network participating in implementation of at least a portion of the functionality of the particular distributed service, and transmit the representation to the client user of the particular client account, wherein the representation of the administrative state of the particular client account provides a unified view of the administrative state of the particular client account across each of at least the virtualized compute service and the virtualized storage service in accordance with the point in time specified by the timing descriptor of the request.

17. The storage medium as recited in claim 16, wherein the instructions when executed on the one or more processors:

store the representation of the administrative state in a persistent repository.

18. The storage medium as recited in claim 16, wherein the instructions when executed on the one or more processors:

determine a set of services, including the plurality of services, for which metadata is to be included in the representation based at least in part on a services descriptor associated with the request.

19. The storage medium as recited in claim 16, wherein the request comprises an indication of one or more resource descriptors specifying, for each of one or more resources used to implement the service, a set of resource state attributes to be included in the representation of the administrative state.

20. The storage medium as recited in claim 16, wherein the instructions when executed on the one or more processors:

collect records of administrative operations performed on behalf of the particular client account.

21. The storage medium as recited in claim 16, wherein the instructions when executed on the one or more processors:

present a graphical view of the administrative state, wherein the graphical view comprises a timing control element, and wherein the graphical view allows a submission of a request to update the graphical view to display the administrative state as of a time specified via the timing control element.

22. The storage medium as recited in claim 16, wherein the instructions when executed on the one or more processors:

store an indication of a data source configured to provide metadata for a particular resource of the one or more resources of the provider network participating in implementation of at least a portion of the functionality of the particular service.

23. The storage medium as recited in claim 16, wherein the instructions when executed on the one or more processors:

in response to the account state view request, generate a representation of a data state of an application executing on behalf of the particular client account on a particular resource of the provider network, wherein the representation includes metadata of one or more storage objects modified by the application.

24. The storage medium as recited in claim 16, wherein the account state view request includes an indication of a preferred point in time for which the representation of the administrative state is to be generated, wherein the particular point in time for which the representation is generated differs from the preferred point in time.

25. The storage medium as recited in claim 16, wherein the instructions when executed on the one or more processors:

prior to generating the representation, determine the particular client account based at least in part on a source from which the account state view request is received.

* * * * *